US011325991B2

(12) United States Patent
Mays et al.

(10) Patent No.: US 11,325,991 B2
(45) Date of Patent: May 10, 2022

(54) ALL-ACRYLIC MULTIGRAFT COPOLYMER SUPERELASTOMERS

(71) Applicant: University of Tennessee Research Foundation, Knoxville, TN (US)

(72) Inventors: Jimmy W. Mays, Knoxville, TN (US); Wei Lu, Knoxville, TN (US); Nam-Goo Kang, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 16/608,614

(22) PCT Filed: Apr. 25, 2018

(86) PCT No.: PCT/US2018/029357
§ 371 (c)(1),
(2) Date: Oct. 25, 2019

(87) PCT Pub. No.: WO2018/200671
PCT Pub. Date: Nov. 1, 2018

(65) Prior Publication Data
US 2021/0108018 A1 Apr. 15, 2021

Related U.S. Application Data

(60) Provisional application No. 62/489,776, filed on Apr. 25, 2017.

(51) Int. Cl.
*C08F 290/04* (2006.01)
*C09J 151/00* (2006.01)
*C08F 2/38* (2006.01)
*C08F 212/14* (2006.01)

(52) U.S. Cl.
CPC .............. *C08F 2/38* (2013.01); *C08F 212/22* (2020.02); *C08F 212/26* (2020.02); *C08F 290/046* (2013.01); *C09J 151/003* (2013.01); *C08F 2438/03* (2013.01)

(58) Field of Classification Search
CPC .................................................. C09J 151/003
See application file for complete search history.

(56) References Cited

U.S. PATENT DOCUMENTS

| | | | |
|---|---|---|---|
| 3,786,116 A | 1/1974 | Milkovich et al. | |
| 3,832,423 A | 8/1974 | Milkovich et al. | |
| 3,842,059 A | 10/1974 | Milkovich et al. | |
| 4,335,723 A | 1/1982 | Patel | |
| 4,481,323 A | 11/1984 | Sterling | |
| 4,886,062 A | 12/1989 | Wiktor | |
| 5,026,780 A | 6/1991 | Takizawa et al. | |
| 5,079,090 A | 1/1992 | Joseph et al. | |
| 5,210,147 A | 5/1993 | Southwick et al. | |
| 5,225,470 A * | 7/1993 | Mancinelli .......... | C08F 290/046 524/271 |
| 5,741,857 A | 4/1998 | Esneault et al. | |
| 5,837,008 A | 11/1998 | Berg | |
| 5,843,172 A | 12/1998 | Yan | |
| 5,851,217 A | 12/1998 | Wolff et al. | |
| 5,873,904 A | 2/1999 | Ragheb et al. | |
| 6,008,317 A | 12/1999 | Lai et al. | |
| 6,344,035 B1 | 2/2002 | Chudzik et al. | |
| 6,368,658 B1 | 4/2002 | Schwarz et al. | |
| 7,049,373 B2 | 5/2006 | Matyjaszewski et al. | |
| 7,163,555 B2 | 1/2007 | Dinh | |
| 7,435,255 B1 | 10/2008 | Rao | |
| 7,619,036 B2 | 11/2009 | Mays et al. | |
| 7,794,491 B2 | 9/2010 | Von Oepen | |
| 8,061,533 B2 | 11/2011 | Mays et al. | |
| 9,708,434 B2 | 7/2017 | Mays et al. | |
| 10,202,478 B2 | 2/2019 | Mays et al. | |
| 2002/0103295 A1 | 8/2002 | Eichenauer | |
| 2003/0180488 A1 | 9/2003 | Lim et al. | |
| 2003/0220418 A1 | 11/2003 | Horie et al. | |
| 2004/0019145 A1 | 1/2004 | Imoto et al. | |
| 2004/0242791 A1 | 12/2004 | Kaneko et al. | |
| 2005/0245645 A1 | 11/2005 | Howie, Jr. | |
| 2008/0193818 A1 | 8/2008 | Mays | |
| 2008/0194450 A1 | 8/2008 | Yamamoto et al. | |
| 2008/0194716 A1 | 8/2008 | Sasagawa et al. | |
| 2009/0028356 A1 | 1/2009 | Ambrose et al. | |
| 2009/0285974 A1 | 11/2009 | Kerrigan et al. | |
| 2010/0190671 A1 | 7/2010 | Stoehr et al. | |
| 2010/0210745 A1 | 8/2010 | McDaniel et al. | |
| 2014/0161858 A1 | 6/2014 | Mays et al. | |
| 2016/0009969 A1* | 1/2016 | Kumar ................... | B32B 15/00 428/425.1 |
| 2017/0183440 A1 | 6/2017 | Mays et al. | |
| 2018/0030223 A1* | 2/2018 | Kodera ............... | C08F 297/026 |
| 2018/0201773 A1* | 7/2018 | Mclennaghan ......... | C08L 23/12 |
| 2018/0258324 A1* | 9/2018 | Tochihira .............. | B32B 27/281 |
| 2019/0055337 A1 | 2/2019 | Mays et al. | |
| 2019/0203085 A1 | 7/2019 | Liu et al. | |

FOREIGN PATENT DOCUMENTS

| | | |
|---|---|---|
| CN | 1495209 A | 5/2004 |
| EP | 0235482 | 9/1987 |

(Continued)

OTHER PUBLICATIONS

International Search Report corresponding to International Application No. PCT/US2018/029357 dated Aug. 13, 2018.

(Continued)

*Primary Examiner* — Jeffrey C Mullis
(74) *Attorney, Agent, or Firm* — Jenkins, Wilson, Taylor & Hunt, P.A.

(57) ABSTRACT

Thermoplastic elastomer compositions comprising acrylic multigraft copolymers are described. The multigraft copolymers comprise a rubbery polyacrylate backbone and a plurality of randomly spaced glassy polyacrylate side chains. The multigraft copolymers can be prepared using a facile grafting through method that can provide copolymers with enhanced purity. The acrylic multigraft copolymers exhibit microphase separated morphologies and "superelastomeric" properties, including an elongation at break, stress at break, and/or strain recovery behavior that exceeds that of conventional triblock copolymer polyacrylate thermoplastic elastomers.

40 Claims, 23 Drawing Sheets

(56) References Cited

FOREIGN PATENT DOCUMENTS

| | | | |
|---|---|---|---|
| EP | 2218753 A1 | 8/2010 | |
| GB | 2008140 A | 5/1979 | |
| JP | 4930462 A | 3/1974 | |
| JP | 6264814 A | 3/1987 | |
| JP | 2004509182 A | 3/2004 | |
| JP | 2004509214 A | 3/2004 | |
| RU | 2483083 C2 | 5/2013 | |
| SU | 712027 | 1/1980 | |
| WO | WO 2002/022689 A2 | 3/2002 | |
| WO | WO 2002/022755 A2 | 3/2002 | |
| WO | WO 2012/045006 A1 | 4/2012 | |
| WO | WO 2015/196093 A1 | 12/2015 | |
| WO | WO 2017/136565 A1 | 8/2017 | |

OTHER PUBLICATIONS

IPRP and Written Opinion corresponding to International Application No. PCT/US2018/029357 dated Oct. 29, 2019.

Seki et al. "Crossed aldo reaction using cross-linked polymer-bound lithium dialkylamide," Tetrahedron, vol. 60, pp. 5001-5011 (2004).

Zeng et al. "Synthesis of styrenic-terminated methacrylate macromonomers by nitroanion-initiated living anionic polymerization," Macromolecular Rapid Communications, vol. 22, No. 17, pp. 1399-1404 (2001).

Zeng et al. "Synthesis of comb-branched polyacrylamide with cationic poly[(2-dimethylamino)ethyl methacrylate dimethylsulfate] Quat," Journal of Polymer Science, Part A: Polymer Chemistry, vol. 40, No. 14, pp. 2394-2405 (2002).

Supplementary Written Opinion corresponding to Singapore Patent Application No. 10201508163U dated May 17, 2021.

Auriemma et al., "New Concepts in Thermoplastic Elastomers: The Case of Syndiotactic Polypropylene, an Unconventional Elastomer with High Crystallinity and Large Modulus," J. Am. Chem. Soc., vol. 125, pp. 13143-13147, (2003).

Boutillier at al., "Self-Assembling Acrylic Block Copolymers for Enhanced Adhesives Properties," ASI Adhesives & Sealants Industry 2013, 3 pages (2013), retrieved online Sep. 10, 2021.

Drobny, Handbook of Thermoplastic Elastomers, Second Edition, Elsevier, (2014).

Dubois et al., "New Polybutadiene-Based Thermoplastic Elastomers: Synthesis, Morphology And Mechanical Properties," Rubber chemistry and Technology, vol. 70, pp. 714-726, (1997).

Giebeler et al., "ABC triblock polyampholytes containing a neutral hydrophobic block, a polyacid and a polybase," Macromol. Chem. Phys. vol. 198, pp. 3815-3825, (1997).

Goodwin et al., "All-Acrylic Multigraft Copolymers: Effect of Side Chain Molecular Weight and Volume Fraction on Mechanical Behavior," Ind. Eng. Chem. Res., vol. 54, pp. 9566-9576, (2015).

Ito et al., "Synthesis of well-controlled graft polymers by living anionic polymerization towards exact graft polymers," Ploy. Chem., vol. 5, pp. 5523-5534, (2014).

Kraus et al., "Dynamic viscoelastic behavior of ABA block polymers and the nature of the domain boundary," J. Polym. Sci., Part B: Polym. Phys., vol. 14, pp. 1133-1148. (1976).

Lai et al., "Functional Polymers from Novel Carboxyl-Terminated Trithiocarbonates as Highly Efficient RAFT Agents," Macromolecules, vol. 35, pp. 6754-6756, (2002).

Li et al., "Shape-Memory Effects in Polymer Networks Containing Reversibly Associating Side-Groups," Adv. Mater., vol. 19, pp. 2851-2855, (2007).

Liu and Eisenberg, "Synthesis of Poly(tert-butyl acrylate)-block-Polystyrene-block-Poly(4-vinylpyridine) by Living Anionic Polymerization," Ang. Chem. Int. Ed. (2003), 42(12), 1404-1407.

Loykulnant et al., "Protection and Polymerization of Functional Monomers, 31. Living Anionic Polymerization of Styrene Derivatives m,m'-Disubstituted with Acetal-Protected Monosaccharide Residues," Macromolecular Chemistry and Physics vol. 202(9), pp. 1791-1798, (2001).

Lu et al., "All-Acrylic superelastomers: facile synthesis and exceptional mechanical behavior," Polym. Chem. vol. 9, pp. 160-168, (2018).

Lu et al., "Solution properties, unperturbed dimensions, and chain flexibility of poly(1-adamantyl acrylate)," J. Polym. Sci., Part B: Polym. Phys., vol. 55, pp. 1526-1531, (2017).

Lu et al., "Poly(1-adamantyl acrylate): Living Anionic Polymerization, Block Copolymerization, and Thermal Properties," Macromolecules, vol. 49, pp. 9406-9414, (2016).

Lu et al., "Proposed Routes on Difunctioinal Initiator for Double-tailed Macromonomer," 2016.

Lu et al., "All acrylic-based thermoplastic elastomers with high upper service temperature and superior mechanical properties," Polym. Chem., vol. 8, pp. 5741-5748, (2017).

Mays et al., "Synthesis and structure—Property relationships for regular multigraft copolymers," Macromol. Symp., vol. 215, Iss. 1, pp. 111-126, (2004).

Mijovic et al., "Effect of Molecular Architecture on Dynamics of Multigraft Copolymers: Combs, Centipedes, and Barbwires," Macromolecules, vol. 36, pp. 7640-7651, (2003).

Milner, "Chain Architecture and Asymmetry in Copolymer Microphases," Macromolecules vol. 27, pp. 2333-2335, (1994).

Moineau et al., "Synthesis and Characterization of Poly(methyl methacrylate)-block-poly(n-butyl acrylate)-block-poly(methyl methacrylate) Copolymers by Two-Step Controlled Radical Polymerization (ATRP) Catalyzed by NiBr2(PPh3)2," Macromolecules, vol. 32, pp. 8277-8282, (1999).

Notice of Grant corresponding to Singapore Patent Application No. 10201508163U dated Aug. 23, 2021.

Qin et al., "Block Copolymerization of tert-Butyl methacrylate with a, ω-Difunctionalized Polystyrene Macroiniferter and Hydrolysis to Amphiphilic Block Copolymer," J. Polym. Sci., Part A: Polym. Chem., vol. 39(9), pp. 1450-1455, (2001).

Radke et al., "Acrylic thermoplastic elastomers and comb-shaped poly(methyl methacrylate) via the macromonomer technique," Macromol. Symp., vol. 101, pp. 19-27, (1996).

Roos et al., "Copolymerization of n-Butyl Acrylate with Methyl Methacrylate and PMMA Macromonomers: Comparison of Reactivity Ratios in Conventional and Atom Transfer Radical Copolymerization," Macromolecules vol. 32, pp. 8331-8335, (1999).

Spontak et al., "Thermoplastic elastomers: fundamentals and applications," Current opinion in colloid & interface science, vol. 5, pp. 334-341, (2000).

Staudinger et al., "Mechanical Properties and Hysteresis Behavior of Multigraft Copolymers," Marcomolecular symposia, vol. 233, pp. 42-50, (2006).

Tobolsky et al. "Ionic Clusters in High-Strength Carboxylic Rubbers," Macromolecules vol. 1(6), pp. 515-519, (1968).

Tong et al., "Dependence of the Ultimate Tensile Strength of Thermoplastic Elastomers of the Triblock Type on the Molecular Weight between Chain Entanglements of the Central Block," Macromolecules, vol. 33, pp. 1479-1481, (2000).

Tong et al., "Synthesis of poly(methyl methacrylate)-b-poly(n-butyl acrylate)-b-poly(methyl methacrylate) triblocks and their potential as thermoplastic elastomers," Polymer, vol. 41, pp. 2499-2510, (2000).

Uhrig et al., "Multigraft copolymer superelastomers: Synthesis morphology, and properties," Eur. Polym. J., vol. 47, pp. 560-568, (2011).

Uhrig et al., J. Polym. Sci., Part A: Polym. Chem., vol. 43, pp. 6179-6222 (2005).

Urhig et al., "Synthesis of well-defined multigraft copolymers," Polym. Chem., vol. 2, pp. 69-76, (2011).

Wang et al., "Synthesis and Characterization of Comb and Centipede Multigraft Copolymers PnBA-g-PS with High Molecular Weight Using Miniemulsion Polymerization," Macromolecules vol. 47, pp. 7284-7295, (2014).

Zhu et al., "Morphology and Tensile Properties of Multigraft Copolymers with Regularly Spaced Tri-, Tetra-, and Hexafunctional Junction Points," Macromolecules vol. 39, pp. 4428-4436, (2006).

ACM-Polyacrylic Rubber (2015) Downloaded from http://polymerdatabase.com/Eiastomers/ACM.html Dec. 20, 2017 1-2.

(56) References Cited

OTHER PUBLICATIONS

Advisory Action corresponding to U.S. Appl. No. 13/877,229 dated May 8, 2015.

Ajaz, "Hydroxyl-Terminated Polybutadiene Telechelic Polymer (HTPB): Binder for Solid Rocket Propellants," Rubber Chemistry and Technology, vol. 68, Issue 3, pp. 481-506 (1995).

Al-Muallem, and Knauss, "Graft Copolymers from Star-Shaped and Hyperbranched Polystyrene Macromonomers," J. Polym. Scie. Polym. Chem. Ed. vol. 39 pp. 3547-3555 (2001).

Alward et al., "Effect of Arm Number and Arm Molecular Weight on the Solid-State Morphology of Poly(styrene-isoprene) Star Block Copolymers," Macromolecules, vol. 19, pp. 215 (1986).

Balsara et al., "Anisotrophy of Lamellar Block Copolymer Grains," Physical Review E. vol. 66 Article # 052802 (2002).

Beyer et al., "Graft Copolymers with Regularly Spaced, Tetrafunctional Branch Points: Morphology and Grain Structure," Macromolecules, vol. 33, pp. 2039-2048 (2000).

Beyer et al., "Morphological Behavior of A2B2 Star Block Copolymers," J. Polymer Sci.: Part B, Polymer Physics, 37, 3392 (1999).

Beyer et al., "Morphological Behavior of A5B Miktoarm Star Block Copolymers," Macromolecules, 32, 6604 (1999).

Beyer et al., "Morphology of Vergina Star 16-Arm Block Copolymers and Scaling Behavior of Interfacial Area with Graft Point Functionality," Macromolecules, 30, 2373 (1997).

Bi and Fetters, "Synthesis and Properties of Block Copolymers. 3. Polystyrene-Polydiene Star Block Copolymers," Macromolecules. vol. 9 pp. 732-742 (1976).

Burgaz et al., "T-Junction Grain Boundaries in Block Copolymer-Homopolymer Blends," Macromolecules, 33, 8739-8745 (2000).

Cameron, and Qureshi, "Grafting of Polybutadiene Functionalised with Chlorosilane Groups," Makromol. Chem., Rapid Commun. vol. 2 pp. 287-291 (1981).

Certificate of Grant corresponding to Singapore Patent Application No. 10201508163U dated Nov. 15, 2021.

Chang et al., "Analysis of Grain Structure in Partially Ordered Block Copolymers by Depolarized Light Scattering and Transmission Electron Microscopy," Macromolecules. Vol. 35 pp. 4437-4447 (2002).

Cheong et al., "Synthesis and cross-linking of polyisoprene latexes," Polymer, vol. 45, pp. 769-781 (2004).

Cohn et al., "Designing biodegradable multibloack PCL/PLA thermoplastic elastomers," Biomaterials, vol. 26, pp. 2297-2305 (2005).

Communication of the Extended European Search Report corresponding to European Application No. 11830015.1 dated Jun. 27, 2014.

Communication under Rule 71(3) EPC corresponding to co-pending European Patent Application No. 11 830 015.1 dated Jun. 23, 2015.

Crawford et al., "Structure/property relationships in polystyrene-polyisobutylene-polystyrene block copolymers," Thermochimia acta. pp. 125-134 (2001).

Datta et al., "Methacrylate/acrylate ABA triblock copolymers by atom transfer radical polymerization; their properties and application as a mediator for organically dispersible gold nanoparticles," Polymer, vol. 50, pp. 3259-3268 (2009).

David et al., "Core-Shell Cylinder Morphology in Poly(styrene-b-1,3-cyclohexadiene) Diblock Copolymers" Macromolecules. vol. 32 pp. 3216-3226 (1999).

Decision to Grant a European Patent pursuant to Article 97(1) EPC corresponding to European Patent Application No. 11830015.1, dated Nov. 19, 2015.

Driva et al., "Anionic homo- and copolymerization of double-tailed macromonomers: A route to novel macromolecular architectures," Journal of Polymer Science Part A: Polymer Chemistry. vol. 43, No. 18 pp. 4070-4078 (2005) Abstract.

Duan et al., "Deformation Behavior of Sphere-Forming Trifunctional Multigraft Copolymer," Macromolecules, vol. 41 pp. 4565-4568 (2008).

Duan et al., "Morphology and Deformation Mechanisms and Tensile Properties of Tetrafunctional Multigraft Copolymers," Macromolecules. vol. 42 pp. 4155-4164 (2009).

Dufour et al., "Polar Three-Arm Star Block Copolymer Thermoplastic Elastomers Based on Polyacrylonitrile," Macromolecules, vol. 41, No. 7, pp. 2451-2458 (2008).

Examination Report corresponding to Singapore Patent Application No. 2013021464 dated Feb. 27, 2015.

Falk et al., "New Thermoplastic Elastomers, Styrene Grafts on Lithiated Polydienes and Their Hydrogenated Counterparts," Rubber Chem. Technol. vol. 46 pp. 1044-1054 (1973).

Feng et al., "Well-defined graft copolymers:from controlled synthesis to multipurpose applications," Chemical Society Reviews, vol. 40, pp. 1282-1295 (2011).

Frick et al., "Methyl Group Dynamics in Glassy Polyisoprene: A neutron Backscattering Investigation," Macromolecules, vol. 27, No. 4, pp. 974-980 (1994).

Gacal et al., "Anthracene- Maleimide-Based Diels- Alder 'Click Chemistry' as a Novel Routre to Graft Copolymers," Macromolecules, vol. 39, pp. 5330-5536 (2006).

Gamlish et al., "Copolymerization of isoprene and hydroxyl containing monomers by controlled radical and emulsion methods," Polymer Chemistry, vol. 3, pp. 1510-1516 (2012).

Gido et al., "Interfacial Curvature in Graft and Diblock Copolymers and Implications for Long-Range Order in Cylindrical Morphologies," Macromolecules, vol. 30, pp. 6771 (1997).

Gido et al., "Lamellar Diblock Copolymer Grain Boundary Morphology. 1. Twist Boundary Characterization," Macromolecules, vol. 26, pp. 4506 (1993).

Gido et al., "Synthesis, Characterization, and Morphology of Model Graft Copolymers with Trifunctional Branch Points," Macromolecules, vol. 29, pp. 7022-7028 (1996).

Gilman et al., "The analysis of organolithium compounds," J. Organomet. Chem., vol. 2, pp. 447-454 (1964).

Hadjichristidis et al., "Anionic Polymerization: High Vacuum Techniques," J. Polym. Sci., Polym. Chem. Ed., vol. 38, pp. 3211-3234 (2000).

Hadjichristidis et al., "Conformation of Poly(isoprene-g-Styrene) in Dilute Solution," Journal of Polymer Science: Polymer Physics Edition. vol. 16, pp. 851-858 (1978).

Hadjichristidis et al., "Macromolecular architectures by living and controlled/living polymerizations," Prog. Polym. Sci, vol. 31, pp. 1068-1132 (2006).

Hadjichristidis et al., "Morphology and miscibility of miktoarm styrene-diene copolymers and terpolymers," Macromolecules. vol. 26 pp. 5812-5815 (1993).

Hawker et al., "'Living' free radical polymerization of macromonomers: preparation of well defined graft copolymers," Macromolecular Chemistry and Physics, vol. 198, pp. 155-166 (1997).

Hong et al., "1,3-Cyclohexadiene Polymers. II. Near-Monodisperse Star and Star-Block Polymers Based on Poly(1,3-cyclohexadiene)," Macromolecules, vol. 34, pp. 2482-2487 (2001).

Hong, K. et al., "1,3-Cyclohexadiene Polymers. I. Anionic Polymerization," Macromolecules, vol. 34, pp. 782-786 (2001).

Hong, K. et al., "1,3-Cyclohexadiene Polymers. III. Synthesis and Characterization of Poly(1,3-cyclohexadiene-block-styrene)," Macromolecules, vol. 34, pp. 3540-3547 (2001).

Iatrou et al., "Regular Comb Polystyrenes and Graft Polyisoprene/ Polystyrene Copolymers with ouble Branches ("Centipedes"). Quality of (1,3-Phenylene)bis(3-methyl-1-phenylpentylidene)dilithium Initiator in the Presence of Polar Additives," Macromolecules, vol. 31, pp. -6701 (1998).

Iatrou et al., "Hydrodynamic properties of model 3-miktoarm star copolymers," J. Polym. Sci., Polym. Phys. Ed. vol. 33 pp. 1925-1932 (1995).

International Preliminary Report on Patentability corresponding to International application No. PCT/US2017016236 dated Aug. 7, 2018.

Interview Summary corresponding to U.S. Appl. No. 13/877,229 dated Feb. 26, 2016.

Interview Summary corresponding to U.S. Appl. No. 13/877,229 dated Nov. 29, 2016.

(56) References Cited

OTHER PUBLICATIONS

Invitation to Response to Written Opinion (Supplementary Examination) Corresponding to Singapore Patent Application No. 10201508163U dated May 18, 2021.
Ishimoto, et al., "Biobased polymers: synthesis of graft copolymers and comb polymers using lactic acid macromonomer and properties of the product polymers," ACS Publications, Biomacromolecules, vol. 13, pp. 3757-3768 (2012).
Jeusette et al., "New 'all-acrylate' block copolymers: synthesis and influence of the architecture on the morphology and the mechanical properties," Macromolecules, vol. 40, pp. 1055-1065 (2007).
Ji et al., "Characterization of hydroxyl-end-capped polybutadiene and polystyrene produced by anionic polymerization technique via TLC/MALDI TOF mass spectrometry," Polymer, vol. 43, pp. 7119-7123 (2002).
Jiang et al., "A novel architecture toward third-generation thermoplastic elastomers by a grafting strategy," Macromolecules, vol. 46, pp. 4772-4780 (2013).
Juhari et al., "Star-like poly(n-butyl acrylate)-b-poly($\alpha$-methylene-$\gamma$-butyrolactone) block copolymers for high temperature thermoplastic elastomers applications," Polymer, vol. 51, pp. 4806-4813 (2010).
Knauss et al., "Polystyrene with Dendritic Branching by Convergent Living Anionic Polymerization," Macromolecules. vol. 33 pp. 3557-3568 (2000).
Kongsinlark et al., "Syntheis of nanosized ethylene-propylene rubber latex via polyisoprene hydrogenation," Journal of Applied Polymer Science, vol. 127, pp. 3622-3632 (2013).
Koromilas et al., "Synthesis and self-association in dilute aqueous solution of hydrophobically modified polycations and polyampholytes based on 4-vinylbenzyl chloride," European Polymer Journal, vol. 54, pp. 39-51 (2014).
Lee et al., "(-Shaped double-graft copolymers: effect of molecular architecture on morphology," Polymer. vol. 39, pp. 4631-4638 (1998).
Lee et al., "Asymmetric Single Graft Block Copolymers: Effect of Molecular Architecture on Morphology," Macromolecules, vol. 30, pp. 3732-3738 (1997).
Lee et al., "H-shaped double graft copolymers: Effect of molecular architecture on morphology," J. Chem. Phys., vol. 107, pp. 6460-6469 (1997).
Li et al., "Linear-, Cyclic-, and Multiblock Amphiphilic Polyelectrolytes as Surfactants in Emulsion Polymerization: Role of Topological Structure," Macromolecules, vol. 46, pp. 2808-2817 (2013).
Liu et al. (1997) Synthesis of Monodisperse Polystyrene Microlatexes by Emulsion Polymerization Using a Polymerizable Surfactant. Langmuir 13:4988-4994.
Liu et al., "Precision synthesis of w-Branch, End-Functionalized Comb Polystyrenes Using Living Anionic Polymerization and Thiol-Ene 'Click' Chemistry," Macromolecules, vol. 45, pp. 9233-9242 (2012).
Lübke et al., "Imprinted polymers prepared with stoichiometric template-monomer complexes: efficient binding of ampicillin from aqueous solutions," Macromolecules, vol. 33, pp. 5098-5105 (2000).
Luo et al., "Polystyrene-block-poly(n-butyl acrylate)-block-polystyrene Triblock Copolymer Thermoplastic elastomer Synthesized via RAFT Emulsion Polymerization," Macromolecules, vol. 43, pp. 7472-7481 (2010).
Mamodia et al., "Effect of Microdomain Structure and Process Conditions on the Mechanical Behavior of Cylindrical Block Copolymer Systems," Macromolecules. vol. 40 pp. 7320-7328 (2007).
Matyjaszewski et al., "Simple and effective one-pot synthesis of (Meth)Acrylic block copolymers through atom transfer," Journal of Polymer Science Part A: Polymer Chemistry, vol. 38, pp. 2023-2031 (2000).
Mays et al., "Synthesis and Structure—Property Relationships for Regular Multigraft Copolymers," Macromol. Symp. vol. 215, pp. 111-126 (2004).
Mays, J.W., "Synthesis of "simple graft" poly(isoprene-g-styrene) by anionic polymerization," Polymer Bulletin. Vol. 23 pp. 247-250 (1990).
Memo Concerning the Official Action Reported in the Covering Letter Corresponding to Mexican Patent Application No. MX/a/2016/017033 dated Aug. 26, 2021.
Minari et al., "Emulsion polymerization of isoprene. Estimation of the branching exponent with the help of a mathematical model," Journal of Applied Polymer Science, vol. 116, pp. 590-601 (2010).
Minoura and Harada, "Anionic Graft Copolymerization of Diene Polymers with Vinyl Monomers," J. Poly. Sci. Part A-1, vol. 7 pp. 3-14 (1969).
Minoura et al., "Lithiation of Diene Polymers," J. Polym. Sci. Part A-1, vol. 6 pp. 559-573 (1968).
Morton et al., "Preparation and properties of monodisperse branched polystyrene," J. Polym. Sci. Vol. 57 pp. 471-482 (1962).
Napandensky et al., "Characterization of Highly Sulfonated SIBS Polymer Partially Neutralized with Mg+2 Cations" Army Research Laboratory. (2008).
Neises et al., "Simple method of the estrification of carboxylic acids," Angewandte Chemie International Edition in English, vol. 17, No. 7, pp. 522-524 (1978).
Nese et al., "Synthesis, characterization, and properties of starlike Poly(n-butyl acrylate)-b-poly(methyl methacrylate) block copolymers," Macromolecules, vol. 43, pp. 1227-1235 (2010).
Nicolas et al., "Nanostructure latex particles synthesized by nitroxied-mediated contrlled/living free-radical polymerization in emulsion," Polymer, vol. 48, pp. 7029-7040 (2007).
Nikopoulou et al., "Anionic homo- and copolymerization of styrenic triple-tailed polybutadiene macromonomers," Journal of Polymer Science Part A: Polymer Chemistry. Vol. 45, No. 16 pp. 3513-3523 (2007) Abstract.
Notice of Allowance corresponding to U.S. Appl. No. 13/877,229 dated Jan. 26, 2017.
Notice of Allowance corresponding to U.S. Appl. No. 13/877,229 dated Apr. 20, 2017.
Notice of Allowance corresponding to U.S. Appl. No. 15/320,530 dated Aug. 10, 2018.
Notification Concerning Availability of the Publication of the International Application corresponding to international application No. PCT/US2017/016236 dated Aug. 10, 2017.
Notification Concerning Transmittal of Copy of International Preliminary Report on Patentability corresponding to International application No. PCT/US2011/054345, dated Apr. 11, 2013.
Notification Concerning Transmittal of Copy of International Preliminary Report on Patentability corresponding to International application No. PCT/US2015/036727 dated Dec. 29, 2016.
Notification of Transmittal of the International Search Report and Written Opinion corresponding to International application No. PCT/US2011/054345 dated Feb. 14, 2012.
Notification of Transmittal of the International Search Report and the Written Opinion of the International Searching Authority corresponding to International application No. PCT/US 2015/036727 dated Nov. 26, 2015.
Notification of Transmittal of the International Search Report and the Written Opinion of the International Searching Authority corresponding to International Application No. PCT/US2017/016236 dated Apr. 14, 2017.
Office Action (Restriction Requirement) corresponding to U.S. Appl. No. 16/077,319 dated Feb. 20, 2020.
Office Action corresponding to Canadian Patent Application Serial No. 2,813,249 dated May 18, 2017.
Office Action corresponding to Canadian Patent Application Serial No. 2,813,249 dated Jan. 25, 2018.
Office Action corresponding to Canadian Patent Application Serial No. 2,952,624 dated May 29, 2018.
Office Action corresponding to Chinese Patent Application Serial No. 201580044271.X dated Aug. 7, 2018.
Office Action corresponding to Japanese Patent Application Serial No. 2016-574111 dated Sep. 3, 2018.
Office Action corresponding to Korean Patent Application Serial No. 10-2017-7001912 dated May 10, 2018.

(56) References Cited

OTHER PUBLICATIONS

Office Action corresponding to U.S. Appl. No. 13/877,229 dated Aug. 19, 2014.
Office Action corresponding to U.S. Appl. No. 13/877,229 dated Mar. 4, 2015.
Office Action corresponding to U.S. Appl. No. 13/877,229 dated Nov. 18, 2015.
Office Action corresponding to U.S. Appl. No. 13/877,229 dated Jul. 18, 2016.
Office Action corresponding to U.S. Appl. No. 15/320,530 dated Dec. 27, 2017.
Office Action corresponding to U.S. Appl. No. 16/077,319 dated May 1, 2020.
Office Action corresponding to Mexican Patent Application No. MX/a/2016/017033 dated Sep. 7, 2021.
Pantazis et al., "Anionic Polymerization of Styrenic Macromonomers," Macromolecules. Vol. 36 pp. 3783-3785 (2003).
Paraskeva et al., "Synthesis of an exact graft copolymer of isoprene and styrene with two branches," Journal of Polymer Science Part A: Polymer Chemistry, vol. 38, pp. 931-935 (2000).
Park et al., "Utility of Interaction Chromatography for Probing Structural Purity of Model Branched Block Copolymers," Macromolecules. Vol. 36 pp. 5834-5838 (2003).
Peleshanko et al., "Synthesis and Interfacial Behavior of Amphiphilic Hyperbranched Polymers: Poly(ethylene oxide)—Polystyrene Hyperbranches," Macromolecules, vol. 39, pp. 4756-4766 (2006).
Pochan et al. "Morphological Transitions in an I2S Simple Graft Block Copolymer: From Folded Sheets to Folded Lace to Randomly Oriented Worms at Equilibrium," Macromolecules. Vol. 29 pgs.: 5099-5105 (1996).
Pochan et al., "Morphologies of Microphase-Separated A2B Simple Graft Copolymers," Macromolecules, vol. 29, p. 5091 (1996).
Pochan et al., "Morphologies of Microphase-Separated Conformationally Asymmetric Diblock Copolymers," J. Polymer Sci.: Part B, Polymer Physics, vol. 35, p. 2629 (1997).
Poongavalappil et al., "Study on the influence of electron beam irradiation on the thermal, mechanical, and rheological properties of ethylene-octene copolymer with high comonomer content," Journal of Applied Polymer Science, vol. 128, pp. 3026-3033 (2013).
Pramanik et al., "Organic-inorganic hybrid tinphosphonate material with mesoscopic void spaces: an excellent catalyst for the radical polymerization of styrene," Catalysis Science & Technology, vol. 2, pp. 613-620(2012).
Prince et al., "Synthetic rubber production," Industrial & Engineering Chemistry, vol. 52, pp. 235-238 (1960).
Quirk et al., "Efficient synthesis of w-(p. Vinylbenzyl)polystyrene by direct fuctionalization of Poly(styryl)lithium with p. Vinylbenzyl chloride in hydrocarbon solvent with lithium 2,3-dimethyl-3-pentoxide," Macromolecules, vol. 39, pp. 1681-1692 (2006).
Rahman et al., "Synthesis and Dilute Solution Properties of Well-Defined H-Shaped Polybutadienes," Macromolecules. Vol. 41 pp. 8225-8230 (2008).
Rajatapiti et al., "In-Situ Synthesis Of PBA-graft-PMMA Copolymers To Be Used as Compatibilizing Agents in Pbaipmma Composite Latex Particles Via the Macromonomer Method," Journal of Macromolecular Science, Part A, vol. 32(889), pp. 1445-1460 (1995).
Retsos et al., "Interfacial Tension in Binary Polymer Blends in the Presence of Block Copolymers: Effects of Additive Architecture and Composition," Macromolecules. Vol. 37 pp. 524-537 (2004).
Roovers et al., "Microheterogeneity in Miscible Blends of 1,2-Polybutadiene and 1,4-Polyisoprene, Macromolecules vol. 25, No. 13, pp. 3454-3461 (1992).
Schiavon et al., "Synthesis and molecular weight characterization of end-functionalized N-vinyl-2-pyrrolidone oligomers," Macromol. Chem. Phys., vol. 196, pp. 763-774 (1995).
Schlegel et al., "Investigations on mechanical properties of PI-PS multigraft copolymers," European Polymer Journal. Vol. 45 pp. 2902-2912 (2009).
Schlegel et al., "Stress softening of mulitgraft copolymers," Polymer. Vol. 50 pp. 6297-6304 (2009).
Singapore Search Report and Written Opinion for co-pending Singapore Patent Application No. 201302146-4 dated Jul. 11, 2014.
Singh et al., "Effect of molecular weight on the mechanical and electrical properties of block copolymer electrolytes," Macromolecules, vol. 40, pp. 4578-4585 (2007).
Spontak et al., "Thermoplastic elastomers:fundamentals and applications," Current Opinion in Colloid & Interface Science, vol. 5, pp. 333-341 (2000).
Staudinger et al., "Interpretation of hysteresis behaviour of PI-PS multigraft copolymers of adapting to the dynamic flocculation model," European Polymer Journal. Vol. 44 pp. 3790-3796 (2008).
Suppaibulsuk et al., "Synthesis of styrene-g-polyisoprene nanoparticles by emulsion polymerization and its effect on properties of polyisoprene composites," Polymers for Advanced Technologies, vol. 23, pp. 1473-1483 (2012).
Tate et al., "Metallation of Unsaturated Polymers and Formation of Graft Copolymers," Journal of Polymer Science: Part A-1. Vol. 9 pp. 139-145 (1971).
Theryo et al., "Tough Polylactide Graft Copolymers," Macromolecules, vol. 43, pp. 7394-7397 (2010).
Thomas et al., "Ordered Packing Arrangements of Spherical Micelles of Diblock Copolymers in Two and Three Dimensions," Macromolecules, vol. 20, p. 2934 (1987).
Thomas, B. L., "Ordered Bicontinuous Double-Diamond Structure of Star Block Copolymers: A New Equilibrium Microdomain Morphology," Macromolecules, vol. 19, p. 2197 (1986).
Tsoukatos et al., "Model Linear Block Co-, Ter-, and Quaterpolymers of 1,3-Cyclohexadiene with Styrene, Isoprene, and Butadiene," Macromolecules, vol. 35, pp. 7928-7935 (2002).
Uhrig et al., "Synthesis of Combs, Centipedes, and Barbwires: Poly(isoprene-graft-styrene) Regular Multigraft Copolymers with Trifunctional, and Hexafunctional Branch Points," Macromolecules, vol. 35, pgs.: 7182-7190 (2002).
Wang et al., "Synthesis and Characterization of Graft Copolymers Poly(isoprene-g-styrene) of High Molecular Weight by a Combination of Anionic Polymerization and Emulsion Polymerization," Ind. Eng., Chern. Res., vol. 54(4), pp. 1292-1300 (Jan. 14, 2015).
Wang et al., Synthesis of poly (methyl methacrylate)-b-polystyrene with high molecular weight by DPE seeded emulsion polymerization and its application in proton exchange membrane, Journal of Colloid and Interface Science, vol. 406, pp. 154-164 (2013).
Wang, "The Modern Methods and Technology of Polymer Synthesis," Tongji University Press, pp. 16-17 (Jul. 31, 2013).
Wei et al., "Styrene-Butadiene-Styrene Triblock Copolymer Latex via Reversible Addition-Fragmentation Chain Transfer Miniemulsion Polymerization," Industrial & Engineering Chemistry Research, vol. 51, p. 15530-15535 (2012).
Weidisch et al., "Tetrafunctional Multigraft Copolymers as Novel Thermoplastic Elastomers," Macromolecules, vol. 34, pgs.: 6333-6337 (2001).
Winey et al., "Ordered morphologies in binary blends of diblock copolymer and homopolymer and characterization of their intermaterial dividing surfaces," J. Chern. Phys., vol. 95, p. 9367 (1991).
Wisse et al., "Segmental Orientation in Well-Defined Thermoplastic Elastomers Containing Supramolecular Fillers," Macromolecules, vol. 42, pp. 524-530 (2008).
Wu et al., "Investigation of Thermodynamic Properties of SIS, SEBS, and Naphthenic Oil by Inverse Gas Chromatography, "Journal of Elastomers and Plastics, vol. 43, pp. 369-386 (2011).
Xenidou et al., "Morphology of Model Graft Copolymers with Randomly Placed Trifunctional and Tetrafunctional Branch Points," Macromolecules, vol. 31, p. 7659 (1998).
Xenidou et al., "Synthesis of Model Multigraft Copolymers of Butadiene with Randomly Placed Single and Double Polystyrene Branches," Macromolecules, vol. 31, pp. 5690-5694 (1998).
Yang et al., "I5S Miktoarm Start Block Copolymers: Packing Constraints on Morphology and Discontinuous Chevron Tilt Grain Boundaries," Macromolecules. Vol. 34 pp. 9069-9073 (2001).
Yang et al., "Phase Behavior of I2S Single Graft Copolymer/Homopolymer Blends," Macromolecules. Vol. 34 pp. 4235-4243 (2001).

(56) References Cited

OTHER PUBLICATIONS

Yongxin et al., "Deformation Behavior of Sphere-Forming Trifunctional Multigraft Copolymer, "Macromolecules. Vol. 41 pp. 4565-4568 (2008).

Yoshizaki et al., "Transport Coefficients of Helical Wormlike Chains. 4. Intrinsic Viscosity of the Touched-Bead Model, " Macromolecules, 21, pp. 165-171 (1988).

Zhang et al., "Synthesis and surface properties of PDMS-containing latexes by emulsion polymerization using AIBN as the initiator," European Polymer Journal, vol. 49, pp. 2327-2333 (2013).

Zhu et al., "Effect of Junction Point Functionality on the Lamellar Spacing of Symmetric (PS)n(PI)n Miktoarm Star Block Copolymers," Macromolecules, vol. 36, pp. 5719-5724 (2003).

Zhu et al., "Microphase-Separation of Cyclic Block Copolymers of Styrene and Butadiene and of Their Corresponding Linear Triblock Copolymers," Maromolecules, vol. 36, pp. 148-152 (2003).

Zhu et al., "Morphologies and Mechanical Properties of a Series of Block-Double-Graft Copolymers and Terpolymers," Macromolecules. Vol. 35 pp. 5903-5909 (2002).

Notice of Allowance corresponding to Mexican Patent Application No. 2016017033 dated Jan. 24, 2022 [Machine translation].

\* cited by examiner

ALL-ACRYLIC MULTIGRAFT COPOLYMER SUPERELASTOMERS

RELATED APPLICATIONS

This application is a 35 U.S.C. Section 371 national phase application of PCT International Application Serial No. PCT/US2018/029357, filed Apr. 25, 2018, which claims the benefit of U.S. Provisional Patent Application Ser. No. 62/489,776, filed Apr. 25, 2017; the disclosure of which is incorporated herein by reference in its entirety.

GOVERNMENT INTEREST

This invention was made with government support from under Grant No. DEACO5-000R22725 awarded by the U.S. Department of Energy. The government has certain rights in the invention.

TECHNICAL FIELD

Acrylic multigraft copolymers comprising a rubbery acrylic main chain and glassy acrylic side chains are described. For example, the multigraft copolymer can comprise a poly(alkyl acrylate) main chain and randomly spaced, glassy poly(alkyl methacrylate) or partially hydrolyzed poly (alkyl methacrylate) side chains. Methods of preparing the acrylic multigraft copolymers are also described. The acrylic multigraft copolymers have improved mechanical strength and/or other elastomeric properties compared to prior acrylic copolymer thermoplastic elastomers and can be used as "superelastomers" in a variety of applications.

ABBREVIATIONS

° C.=degrees Celsius
%=percent
$\varepsilon_B$=elongation at break
$\omega$=frequency
$\sigma_B$=stress at break
AIBN=2,2-azobis(isobutyronitrile)
BA=n-butyl acrylate
CTA=chain transfer agent
DSC=differential scanning calorimetry
g=grams
G'=storage modulus
G"=loss modulus
h=hours
iPrNH$_2$=isopropylamine
kg=kilogram
M=Molar
$M_e$=molecular weight between chain entanglements
MeOH=methanol
min=minutes
MMA=methyl methacrylate
$M_n$=number-average molecular weight
mol=mole
MPa=megapascal
$M_w$=weight average molecular weight
NMR=nuclear magnetic resonance
Pa=pascals
PBA=poly(n-butyl acrylate)
PDI=polydispersity index
PMMA=poly(methyl methacrylate)
ppm=parts per million
PtBMA=poly(tert-butyl methacrylate)
PVBA=N-isopropyl-4-vinylbenzylamine
rad=radian
RAFT=reversible addition-fragmentation chain-transfer
rt=room temperature
s=seconds
SEC=size exclusion chromatography
seC-BuLi=sec-butyl lithium
tBMA=tert-butyl methacrylate
$T_g$=glass transition temperature
TPE=thermoplastic elastomer
UST=upper service temperature
vol=volume

BACKGROUND

Thermoplastic elastomers (TPEs) represent an important segment of the worldwide elastomer market due to their combination of mechanical properties (which are comparable to vulcanized rubbers) and straightforward processing (which is similar to that of thermoplastics). See Legge et al., Thermoplastic Elastomers, Munich: Hanser, 1987. TPEs are also of interest because of their capacity to self-assemble to form ordered phase separated structures having nanoscale dimensions, with morphologies and properties tunable by controlling the volume fractions of hard and soft segments. See Rader, C. P., in Modern Plastics Encyclopedia, Volume 72, New York: McGraw-Hill, 1996. TPEs have been widely used in applications such as shape memory, adhesives, footwear, food packaging, and road surface dressings. See Holden, G., in Kirk-Othmer Encyclopedia of Chemical Technology, John Wiley & Sons, Inc., 2000; Auriemma and De Rosa (2003) J. Am. Chem. Soc., 125, 13143-13147; and Li et al. (2007) Adv. Mater., 19, 2851-2855.

As compared to the more widely used styrenic TPEs, all-acrylic TPEs offer potential to address issues such as limited upper service temperature (UST) (see Kraus and Rollmann (1976) J. Polm. Sci., Part B: Polym. Phys., 14, 1133-1148; Lu et al. (2016) Macromolecules, 49, 9406-9414; and Lu et al. (2017) J. Polym. Sci., Part B: Polym. Phys., 55, 1526-1531) and susceptibility to oxidation and photolysis. See Drobny, J. G., Handbook of Thermoplastic Elastomers, Elsevier, 2014. However, the higher molecular weight between chain entanglements ($M_e$) in acrylic TPEs typically leads to poorer mechanical strength, elongation at break, and elastic recovery than styrenic TPEs. See Tong and Jerôme (2000) Polymer, 41, 2499-2510; Lu et al. (2017) Polym. Chem., 8, 5741-5748; and Tong and Jerôme (2000) Macromolecules, 33, 1479-1481. Acrylic TPEs can also be more expensive than styrenic TPEs.

Accordingly, there is an ongoing need for additional acrylic-based TPEs, including additional acrylic TPEs that have higher tensile strength while still maintaining good elongation at break and elastic recovery and/or that have mechanical properties that can be readily fine-tuned for particular end uses. There is also a need for additional and/or improved methods of synthesizing acrylic-based TPEs, particularly those that can provide acrylic TPEs less expensively and/or with higher purity.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned;

likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter provides a thermoplastic elastomer comprising an acrylic multigraft copolymer comprising: a rubbery polymeric backbone comprising a plurality of randomly spaced branch points, wherein the rubbery polymeric backbone comprises a poly(alkyl acrylate), optionally wherein the poly(alkyl acrylate) is a poly(n-alkyl acrylate) or a copolymer thereof; and a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points; and wherein the acrylic multigraft copolymer is substantially free of free glassy acrylic polymeric chains and/or has a number-average molecular weight ($M_n$) of at least about 200 kilograms per mole (kg/mol) and/or has a stress at break ($\sigma_B$) of at least about 1 megapascals (MPa).

In some embodiments, each of the plurality of glassy polymeric grafts has a structure of the formula:

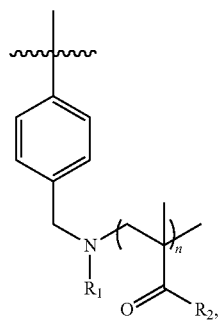

wherein: n is an integer of about 10 or greater; $R_1$ is selected from the group consisting of alkyl, optionally $C_1$-$C_6$ alkyl, aralkyl, and aryl, optionally phenyl, wherein p is an integer of about 10 or greater, and each $R_2$ is independently selected from hydroxyl, alkoxy, cycloalkoxy, aralkoxy, aryloxy and an oxyanion, optionally wherein when $R_2$ is a an oxyanion, it can be bonded to a cation of an alkali metal via an ionic bond or to a metal compound via a coordination bond. In some embodiments, $R_2$ is —$OR_3$, wherein $R_3$ is selected from the group comprising methyl, ethyl, propyl, butyl, isobornyl, 1-adamantyl, cyclohexyl, menthyl, phenyl, naphthyl, benzyl, diphenylmethyl, and trityl, optionally wherein $R_3$ is methyl or tert-butyl. In some embodiments, $R_1$ is isopropyl.

In some embodiments, the poly(alkyl acrylate) is selected from poly(methyl acrylate), poly(ethyl acrylate), poly(n-propyl acrylate), poly(n-butyl acrylate), poly(n-pentyl acrylate), poly(n-hexyl acrylate), and copolymers thereof, optionally wherein the poly(alkyl acrylate) is poly(n-butyl acrylate).

In some embodiments, the acrylic multigraft copolymer has a volume fraction of glassy polymeric grafts of between about 8% and about 35%. In some embodiments, each glassy polymeric graft has a number-average molecular weight ($M_n$) of at least about 7.5 kilograms per mole (kg/mol), optionally wherein the $M_n$ is between about 8 kg/mol and about 30 kg/mol. In some embodiments, the acrylic multigraft copolymer has a $M_n$ of at least about 245 kilograms per mole (kg/mol), optionally wherein the $M_n$ is between about 245 kg/mol and about 445 kg/mol.

In some embodiments, the acrylic multigraft copolymer has a stress at break ($\sigma_B$) of at least about 1.9 MPa, optionally wherein the $\sigma_B$ is between about 1.9 MPa and about 15.1 MPa. In some embodiments, the acrylic multigraft copolymer has an elongation at break ($\varepsilon_B$) of 490% or more, optionally a $\varepsilon_B$ of 1500% or more. In some embodiments, the acrylic multigraft copolymer has a residual strain of about 15% or less at an applied strain of about 1460%.

In some embodiments, the acrylic multigraft copolymer comprises a poly(n-butyl acrylate) (PBA) main chain and a plurality of poly(methyl methacrylate) (PMMA) grafts. In some embodiments, the acrylic multigraft copolymer has a volume fraction of PMMA of between about 8% and about 34%, optionally between about 8% and about 10%. In some embodiments, the acrylic multigraft copolymer has a stress at break of at least about 1.9 MPa and/or an elongation at break of about 1700% or more.

In some embodiments, the acrylic multigraft copolymer comprises a poly(n-butyl acrylate) (PBA) main chain and a plurality of grafts comprising poly(tert-butyl methacrylate) (PtBMA) or a copolymer of PtBMA and poly(methacrylic acid) or a salt or coordination complex thereof. In some embodiments, the acrylic multigraft copolymer has a volume fraction of PtBMA or copolymer of PtBMA and poly (methacrylic acid) or salt or coordination complex thereof of about 26%. In some embodiments, the acrylic multigraft copolymer has an average number of grafts of about 5.7. In some embodiments, the acrylic multigraft copolymer has a $M_n$ of about 300 kg/mol.

In some embodiments, the acrylic multigraft copolymer comprises a PBA main chain and a plurality of PtBMA grafts. In some embodiments, the acrylic multigraft copolymer has an elongation at break of about 3000% or more and optionally a stress at break of about 1.0 MPa or greater.

In some embodiments, the acrylic multigraft copolymer comprises a PBA main chain and a plurality of grafts comprising a copolymer of PtBMA and poly(methacrylic acid) or a salt or coordination complex thereof. In some embodiments, each of the plurality of grafts has a structure of the formula:

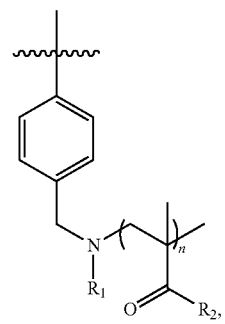

wherein: n is an integer of 10 or greater; $R_1$ is selected from the group consisting of alkyl, optionally $C_1$-$C_6$ alkyl, aralkyl, and aryl, optionally phenyl; and each R$_2$ is independently selected from tert-butoxy and hydroxyl, optionally wherein between about 15% and about 55% of R$_2$ groups are hydroxyl.

In some embodiments, the acrylic multigraft copolymer has a stress at break of about 2 MPa or more, optionally wherein the stress at break is between about 2.8 MPa and about 6.8 MPa. In some embodiments, the acrylic multigraft copolymer has an elongation at break of 1700% or more. In some embodiments, the acrylic multigraft copolymer has a stress at 500% elongation of about 1.6 MPa or more, optionally wherein the stress at 500% elongation is between about 1.6 MPa and about 5.9 MPa.

In some embodiments, each of the plurality of grafts has a structure of the formula:

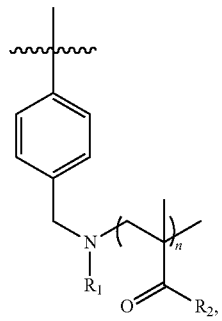

wherein: n is an integer of 10 or greater; R$_1$ is selected from the group consisting of alkyl, optionally C$_1$-C$_6$ alkyl, aralkyl, and aryl, optionally phenyl; and each R$_2$ is independently selected from tert-butoxy and an oxyanion, optionally wherein when R$_2$ is an oxyanion, it is bound to an alkali metal cation, optionally Na$^+$, via an ionic bond, further optionally wherein at least about 10% of R$_2$ are an oxyanion. In some embodiments, about 42% of R$_2$ are an oxyanion, and wherein the multigraft copolymer has a stress at break of about 15.1 MPa, an elongation of about 714%, and a stress at 500% elongation of about 11 MPa.

In some embodiments, the presently disclosed subject matter provides a fabricated article comprising the thermoplastic elastomer comprising an acrylic multigraft copolymer comprising: a rubbery polymeric backbone comprising a plurality of randomly spaced branch points, wherein the rubbery polymeric backbone comprises a poly(alkyl acrylate), optionally wherein the poly(alkyl acrylate) is a poly(n-alkyl acrylate) or a copolymer thereof; and a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points; and wherein the acrylic multigraft copolymer is substantially free of free glassy acrylic polymeric chains and/or has a number-average molecular weight (M$_n$) of at least about 200 kilograms per mole (kg/mol) and/or has a stress at break ($\sigma_B$) of at least about 1 megapascals (MPa). In some embodiments, the fabricated article is selected from an elastic band, a shoe sole or other shoe part, an elastic waistband, an automotive interior or exterior part, a diaper backing or attachment, an adhesive tape, a membrane, a balloon, a bag, ribbing, a roofing tile, a surgical or other glove, a medical device, and a condom.

In some embodiments, the presently disclosed subject matter provides an adhesive comprising a tackifier and a thermoplastic elastomer comprising an acrylic multigraft copolymer comprising: a rubbery polymeric backbone comprising a plurality of randomly spaced branch points, wherein the rubbery polymeric backbone comprises a poly(alkyl acrylate), optionally wherein the poly(alkyl acrylate) is a poly(n-alkyl acrylate) or a copolymer thereof; and a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points; and wherein the acrylic multigraft copolymer is substantially free of free glassy acrylic polymeric chains and/or has a number-average molecular weight (M$_n$) of at least about 200 kilograms per mole (kg/mol) and/or has a stress at break ($\sigma_B$) of at least about 1 megapascals (MPa). In some embodiments, the tackifier is selected from the group comprising rosins and derivatives thereof, terpenes, modified terpenes, an aliphatic resin, a cycloaliphatic resin, an aromatic resin, a hydrogenated hydrocarbon resin, a terpene-phenol resin, and mixtures thereof. In some embodiments, the adhesive further comprises one or more additives selected from the group comprising waxes, plasticizers, anti-oxidants, stabilizers, decorative agents, biocides, flame retardants, antistatic agents, and fillers.

In some embodiments, the presently disclosed subject matter provides a method of preparing an acrylic multigraft copolymer, the method comprising: (a) providing a macromonomer having a structure of the formula:

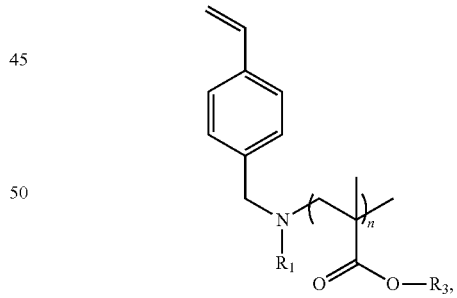

wherein: n is an integer of about 10 or greater; R$_1$ is selected from the group consisting of alkyl, optionally C$_1$-C$_6$ alkyl, aralkyl, and aryl, optionally phenyl; and each R$_3$ is independently alkyl, optionally C$_1$-C$_{12}$ alkyl, cycloalkyl, aralkyl, or aryl, optionally wherein each R$_3$ can be the same; and (b) copolymerizing the macromonomer and a second monomer, wherein the second monomer is an alkyl acrylate or a mixture thereof, optionally wherein the second monomer is an n-alkyl acrylate or a mixture thereof, thereby forming a poly(alkyl acrylate)-graft-poly(alkyl methacrylate) copolymer, a poly(alkyl acrylate)-graft-poly(cycloalkyl methacrylate) copolymer, a poly(alkyl acrylate)-graft-poly(aralkyl methacrylate) copolymer, or a poly(alkyl acrylate)-graft-poly(aryl methacrylate) copolymer.

In some embodiments, providing the macromonomer comprises polymerizing a first monomer via anionic polymerization in the presence of an alkyl lithium reagent, optionally sec-butyl lithium; a lithium salt, optionally lithium chloride; and a vinylbenzylamine, optionally wherein the vinylbenzylamine is selected from the group consisting of a N-alkyl-4-vinylbenzylamine and a N-aryl-4-vinylbenzylamine, optionally wherein the vinylbenzylamine is N-isopropyl-4-vinylbenzylamine (PVBA). In some embodiments, the first monomer is selected from the group consisting of methyl methacrylate and tert-butyl methacrylate.

In some embodiments, the copolymerizing is performed via reversible addition fragmentation chain-transfer (RAFT) polymerization. In some embodiments, the RAFT polymerization is performed using a radical initiator, optionally azobisisobutyronitrile (AIBN), and a chain transfer agent (CTA), optionally S-1-dodecyl-S"-($\alpha,\alpha'$-dimethyl-$\alpha'$acetic acid) trithiocarbonate. In some embodiments, the RAFT polymerization is performed in an aromatic solvent, optionally benzene, at a temperature of at least about 40° C., optionally at a temperature of between about 75° C. and about 80° C.

In some embodiments, the method further comprises (c) collecting the copolymer formed in step (b); and (d) contacting the copolymer with a solution comprising a strong acid, optionally HCl, for a period of time, thereby providing a partially hydrolyzed copolymer. In some embodiments, the method further comprises: (e) contacting the partially hydrolyzed copolymer with a solution comprising an alkali metal hydroxide, optionally NaOH, or a metal coordination complex, optionally a zinc dihalide, to form a graft copolymer comprising one or more alkali metal salt groups or one or more metal coordination complexes.

It is an object of the presently disclosed subject matter to provide a thermoplastic elastomer comprising an acrylic multigraft copolymer, fabricated articles and adhesives comprising the thermoplastic elastomer, and methods of preparing the acrylic multigraft copolymer of the thermoplastic elastomer. An object of the presently disclosed subject matter having been stated hereinabove, and which is achieved in whole or in part by the presently disclosed subject matter, other objects will become evident as the description proceeds when taken in connection with the accompanying drawings and examples as best described herein below.

DETAILED DESCRIPTION

Figure 1A:
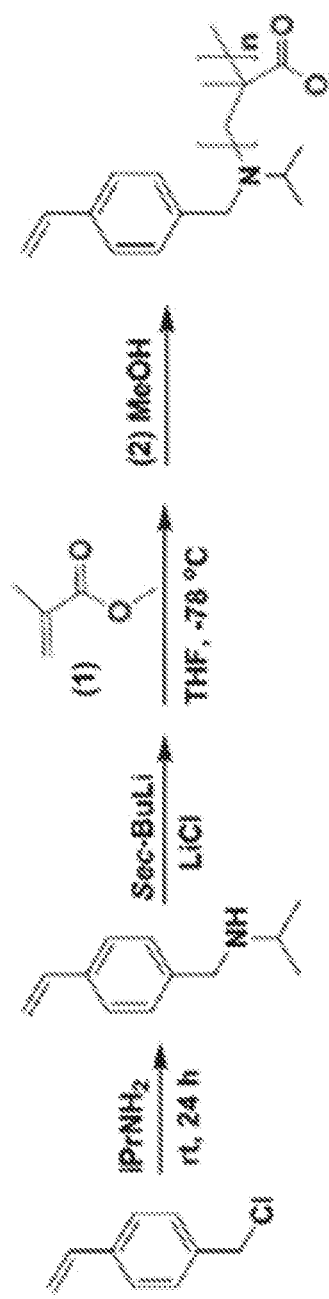
FIG. 1A is a schematic drawing showing the chemical synthesis of an exemplary single-tailed poly(methyl methacrylate) (PMMA) macromonomer of the presently disclosed subject matter using N-isopropyl-4-vinylbenzylamine (PVBA) as a polymerization initiator.

The presently disclosed subject matter will now be described more fully hereinafter with reference to the accompanying Examples and Drawings, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

I. Definitions

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "a monomer" or "a solvent" includes a plurality or mixture of monomers or solvents, and so forth.

Unless otherwise indicated, all numbers expressing quantities of size, weight, percentage, temperature, or other reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value or to an amount of size, weight, concentration, temperature, percentage, or the like is meant to encompass variations of, in some embodiments ±20%, in some embodiments ±10%, in some embodiments ±5%, in some embodiments ±1%, and in some embodiments ±0.1% from the specified amount, as such variations are appropriate to perform the disclosed methods.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "anionic polymerization" refers to an ionic polymerization in which the kinetic chain carriers are anions. Accordingly, an anionic polymerization reaction is a chain reaction in which the growth of the polymer chain proceeds by reaction(s) between a monomer(s) and a reactive site(s) on the polymer chain with regeneration of the reactive site(s) at the end of each growth step. Anionic polymerization typically is used to produce macromolecules from monomers that contain a carbon-carbon double bond, such as styrene, butadiene, an acrylate, or a methacrylate. Such reactions are referred to as anionic vinyl polymerization. For example, anionic polymerization can take place with vinyl monomers that can also comprise electron-withdrawing groups, such as nitrile, carboxyl, phenyl, and vinyl, or with monomers that can stabilize the anions through resonance. These polymerizations are initiated by nucleophilic addition to the double bond of the monomer, wherein the initiator comprises an anion, such as hydroxide, alkoxide, cyanide, or a carbanion. In some embodiments, the carbanion is generated from an organometallic species, such as an alkyl lithium, e.g., butyl lithium, or a Grignard reagent.

The terms "radical polymerization" and "free radical polymerization" refer to a polymerization in which the kinetic chain carriers are radicals. A radical polymerization is initiated by the creation of a radical from an initiator compound, compounds, or system, followed by transfer of the radical to a monomer. Various initiators can be used. Many initiators include a peroxy or azo bond. Radicals can be formed from initiators, for example, via thermal decomposition of the initiator, photolysis, redox reactions, electrochemically, and via ionizing radiation, among other ways. Monomers that can be polymerized via radical polymerization include, but are not limited to, monomers that comprise carbon-carbon double bonds (e.g., alkenes) and monomers that comprise carbon-oxygen double bonds (e.g., ketones and aldehydes).

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "polymer" refers to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units.

A "copolymer" refers to a polymer derived from more than one species of monomer.

As used herein, "macromonomer" refers to a polymer having at least one functional group (e.g. a vinyl or other carbon-carbon double bond) through which polymerization reactions can proceed. Macromonomers are thus macromolecular monomers which can be converted to homo- or copolymers of defined structures. In some embodiments, a macromonomer can comprise more than one (e.g., 2, 3, 4, 5, 6, etc.) polymeric chain (e.g., linear polymeric chain) attached to one functional (e.g., polymerizable) group. Macromonomers with two polymeric chains attached to one polymerizable functional group can be referred to as "double-tailed" or "double chain" macromonomers. In some embodiments, the macromonomer comprises a single polymeric chain attached to one polymerizable functional group. Such macromonomers can be referred to as "single-tailed" or "single chain" macromonomers.

As used herein, a "block macromolecule" refers to a macromolecule that comprises blocks in a linear sequence. A "block" refers to a portion of a macromolecule that has at least one feature that is not present in the adjacent portions of the macromolecule. A "block copolymer" refers to a copolymer in which adjacent blocks are constitutionally different, i.e., each of these blocks comprises constitutional units derived from different characteristic species of monomer or with different composition or sequence distribution of constitutional units.

For example, a diblock copolymer of polybutadiene and polystyrene is referred to as polybutadiene-block-polystyrene. Such a copolymer is referred to generically as an "AB block copolymer." Likewise, a triblock copolymer can be represented as "ABA." Other types of block polymers exist, such as multiblock copolymers of the $(AB)_n$ type, ABC block polymers comprising three different blocks, and star block polymers, which have a central point with three or more arms, each of which is in the form of a block copolymer, usually of the AB type.

As used herein, a "graft macromolecule" or "graft polymer" refers to a macromolecule comprising one or more species of block connected to the main chain as a side chain or chains, wherein the side chain(s) comprises constitutional or configurational features that differ from those in the main chain. The term "multigraft copolymer" refers to a graft copolymer wherein at least some of the individual copolymer molecules in the total population of copolymer molecules being described, provided, prepared, or used comprise at least two or more side chains (e.g., at least three, at least 5, or at least 10 side chains).

The term "regular multigraft macromolecule" can refer to a multigraft copolymer where the branch points at which the side chains are attached to the main chain are at evenly spaced intervals, i.e., where the main chain segment between each branch point is about the same length.

The term "random multigraft copolymer" as used herein can refer to multigraft copolymers with non-regularly spaced branch points and/or to multigraft copolymers wherein the sequential distribution of the backbone monomeric units and the macromonomeric units that include the branch segments obeys known statistical laws, including, but not limited to Markovian statistics and/or can relate to the relative reactivities and concentrations of the backbone monomer and the macromonomer.

A "branch point" (or "junction point") refers to a point on a chain (e.g., a main chain) at which a branch is attached. A "branch," also referred to as a "side chain," "graft," or "pendant chain," is an oligomeric or polymeric offshoot from a macromolecule chain. An oligomeric branch can be termed a "short chain branch," whereas a polymeric branch can be termed a "long chain branch."

A "chain" refers to the whole or part of a macromolecule, an oligomer, or a block comprising a linear or branched sequence of constitutional units between two boundary constitutional units, wherein the two boundary constitutional units can comprise an end group, a branch point, or combinations thereof.

A "main chain" or "backbone" refers to a linear polymeric chain from which all other chains are regarded as being pendant.

A "side chain" refers to a linear chain which is attached to a main chain at a branch point.

An "end group" (or "terminal group") refers to a constitutional unit that comprises the extremity of a macromolecule or oligomer and is attached to only one constitutional unit of a macromolecule or oligomer.

A "comb macromolecule" refers to a multigraft copolymer comprising a main chain with multiple branch points from each of which one linear side chain emanates.

A "centipede macromolecule" refers to a multigraft copolymer comprising a main chain with multiple branch points, wherein from each branch point two linear side chains emanate.

A "star polymer" refers to a polymer comprising a macromolecule comprising a single branch point from which a plurality of linear chains (or arms) emanate. A star polymer or macromolecule with "n" linear chains emanating from the branch point is referred to as an "n-star polymer." If the linear chains of a star polymer are identical with respect to constitution and degree of polymerization, the macromolecule is referred to as a "regular star macromolecule." If different arms of a star polymer comprise different monomeric units, the macromolecule is referred to as a "variegated star polymer."

A "miktoarm star polymer" refers to a star polymer comprising chemically different (i.e., "mixed") arms, thereby producing a star polymer having the characteristic of chemical asymmetry.

The term "rubbery" can refer to a polymer having a glass transition temperature ($T_g$) of about 0° C. or less.

The term "glassy" can refer to a polymer having a $T_g$ of about 60° C. or more.

Polydispersity (PDI) refers to the ratio ($M_w/M_n$) of a polymer sample. $M_w$ refers to the mass average molar mass (also commonly referred to as weight average molecular weight). $M_n$ refers number average molar mass (also commonly referred to as number average molecular weight).

As used herein the term "alkyl" can refer to $C_{1-20}$ inclusive, linear (i.e., "straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, sec-butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms or 1 to 6 carbon atoms (i.e., a $C_{1-6}$ alkyl). "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-12}$ straight-chain alkyls (i.e., n-alkyl). In other embodiments, "alkyl" refers, in particular, to $C_{1-6}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. In some embodiments, there can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

The term "aryl" is used herein to refer to an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether, or nitrogen, as in diphenylamine. The term "aryl" specifically encompasses heterocyclic aromatic compounds. The aromatic ring(s) can comprise phenyl, naphthyl, biphenyl, diphenylether, diphenylamine and benzophenone, among others. In particular embodiments, the term "aryl" means a cyclic aromatic comprising about 5 to about 10 carbon atoms, e.g., 5, 6, 7, 8, 9, or 10 carbon atoms, and including 5- and 6-membered hydrocarbon and heterocyclic aromatic rings.

The aryl group can be optionally substituted (a "substituted aryl") with one or more aryl group substituents, which can be the same or different, wherein "aryl group substituent" includes alkyl, substituted alkyl, aryl, substituted aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR'R", wherein R' and R" can each be independently hydrogen, alkyl, substituted alkyl, aryl, substituted aryl, and aralkyl.

Thus, as used herein, the term "substituted aryl" includes aryl groups, as defined herein, in which one or more atoms or functional groups of the aryl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

Specific examples of aryl groups include, but are not limited to, cyclopentadienyl, phenyl, furan, thiophene, pyrrole, pyran, pyridine, imidazole, benzimidazole, isothiazole, isoxazole, pyrazole, pyrazine, triazine, pyrimidine, quinoline, isoquinoline, indole, carbazole, and the like.

"Heteroaryl" as used herein refers to an aryl group that contains one or more non-carbon atoms (e.g., O, N, S, Se, etc) in the backbone of a ring structure. Nitrogen-containing heteroaryl moieties include, but are not limited to, pyridine, imidazole, benzimidazole, pyrazole, pyrazine, triazine, pyrimidine, and the like.

"Aralkyl" refers to an aryl-alkyl- group wherein aryl and alkyl are as previously described, and can include substituted aryl and substituted alkyl. Exemplary aralkyl groups include benzyl, phenylethyl, and naphthylmethyl.

"Cyclic" and "cycloalkyl" refer to a non-aromatic mono- or multicyclic ring system of about 3 to about 10 carbon atoms, e.g., 3, 4, 5, 6, 7, 8, 9, or 10 carbon atoms. The cycloalkyl group can be optionally partially unsaturated. The cycloalkyl group also can be optionally substituted with an alkyl group substituent as defined herein, oxo, and/or alkylene. There can be optionally inserted along the cyclic alkyl chain one or more oxygen, sulfur or substituted or unsubstituted nitrogen atoms, wherein the nitrogen substituent is hydrogen, alkyl, substituted alkyl, aryl, or substituted aryl, thus providing a heterocyclic group. Representative monocyclic cycloalkyl rings include cyclopentyl, cyclohexyl, and cycloheptyl. Multicyclic cycloalkyl rings include adamantyl, octahydronaphthyl, decalin, camphor, camphane, and noradamantyl.

The term "bivalent" as used herein refers to a group that can bond (e.g., covalently bond) or is bonded to two other groups, such as alkyl, aralkyl, cycloalkyl, or aryl groups. Typically, two different sites on the bivalent group (e.g., two different atoms) can bond to groups on other molecules or two different groups on the same molecule. For example, the bivalent group can be an alkylene group.

"Alkylene" can refer to a straight or branched bivalent aliphatic hydrocarbon group having from 1 to about 20 carbon atoms, e.g., 1, 2, 3, 4, 5, 6, 7, 8, 9, 10, 11, 12, 13, 14, 15, 16, 17, 18, 19, or 20 carbon atoms. The alkylene group can be straight, branched or cyclic. The alkylene group also can be optionally unsaturated and/or substituted with one or more "alkyl group substituents." There can be optionally inserted along the alkylene group one or more oxygen, sulfur or substituted or unsubstituted nitrogen atoms (also referred to herein as "alkylaminoalkyl"), wherein the nitrogen substituent is alkyl as previously described. Exemplary alkylene groups include methylene (—$CH_2$—); ethylene (—$CH_2$—$CH_2$—); propylene (—$(CH_2)_3$—); cyclohexylene (—$C_6H_{10}$—); —CH═CH—CH═CH—; —CH═CH—$CH_2$—; —$(CH_2)_q$—N(R)—$(CH_2)_r$—, wherein each of q and r is independently an integer from 0 to about 20, e.g., 0, 1, 2, 3, 4, 5, 6, 7, 8, 9, 10, 11, 12, 13, 14, 15, 16, 17, 18, 19, or 20, and R is hydrogen or lower alkyl; methylenedioxyl (—O—$CH_2$—O—); and ethylenedioxyl (—O—$(CH_2)_2$—O—). An alkylene group can have about 2 to about 3 carbon atoms and can further have 6-20 carbons.

"Arylene" refers to a bivalent aryl group, which can be substituted or unsubstituted.

The term "aralkylene" refers to a bivalent group that comprises a combination of alkylene and arylene groups (e.g., -arylene-alkylene-, alkylene-arylene-alkylene-, arylene-alkylene-arylene-, etc.).

"Alkoxyl", "alkoxy", and "alkyloxyl" refer to an alkyl-O— group wherein alkyl is as previously described, including a substituted alkyl. The term "alkoxyl" as used herein can refer to $C_{1-20}$ inclusive, linear, branched, or cyclic, saturated or unsaturated oxo-hydrocarbon chains, including, for example, methoxyl, ethoxyl, propoxyl, isopropoxyl, butoxyl, t-butoxyl, and pentoxyl.

"Aryloxyl" and "aryloxy" refer to an aryl-O— group wherein the aryl group is as previously described, including a substituted aryl. The term "aryloxyl" as used herein can refer to phenyloxyl or hexyloxyl, and alkyl, substituted alkyl, halo, or alkoxyl substituted phenyloxyl or hexyloxyl.

"Aralkyloxyl", "aralkoxy", and "aralkoxyl" refer to an aralkyl-O— group wherein the aralkyl group is as previously described. An exemplary aralkyloxyl group is benzyloxyl.

The terms "halo", "halide", or "halogen" as used herein refer to fluoro, chloro, bromo, and iodo groups.

The term "hydroxyl" refers to the —OH group.

The terms "mercapto," "mercaptan," and "thiol" refer to compounds comprising the group —SH or —SR, wherein R is alkyl, substituted alkyl, aralkyl, substituted aralkyl, aryl, and substituted aryl.

The term "vinyl" can refers to the group —CH═$CH_2$. However, as used herein, unless specified otherwise, the term "vinyl" can also refer to any alkenyl group (i.e., any group containing a carbon-carbon double bond).

The terms "carboxylate" and "carboxylic acid" can refer to the groups —C(═O)$O^-$ and —C(═O)OH, respectively or to molecules containing such groups, such as methacrylic acid or alkanoic acids (e.g., hexanoic acid, butanoic acid), etc. Derivatives of carboxylic acid groups include, but are not limited to, acid halides (also known as acyl halides, e.g., acid or acyl chlorides), anhydrides, esters, or amides, i.e., compounds wherein the —OH of the carboxylic acid group is replaced by —X, —OC(═O)R, OR, or NRR', respectively, wherein X is a halide, and R and R' are each H, alkyl, substituted alkyl, aralkyl, substituted aralkyl, aryl or substituted aryl.

The term "ester" refers to a group or a molecule having a group having the structure: —C(═O)—O—R, wherein R is selected from alkyl, substituted alkyl, aralkyl, substituted aralkyl, aryl, and substituted aryl.

The term "alkyl acrylate" refers to a compound having the formula $CH_2$═CHC(═O)OR, wherein R is an alkyl or substituted alkyl group. In some embodiments, "alkyl acrylate" refers to a compound of the formula $CH_2$═CHC(═O)OR, wherein R is a $C_1$-$C_{12}$ n-alkyl group.

The term "alkyl methacrylate" refers to a compound having the formula $CH_2$═C($CH_3$)C(═O)OR, wherein R is alkyl or substituted alkyl. Similarly, the terms "aralkyl methacrylate", "aryl methacrylate", and "cycloalkyl methacrylate" refer to compounds having the formula $CH_2$═C($CH_3$)C(═O)OR, wherein R aralkyl or substituted aralkyl, aryl or substituted aryl, or cycloalkyl or substituted cycloalkyl, respectively.

Wavy lines used in the chemical formulas described herein, e.g.:

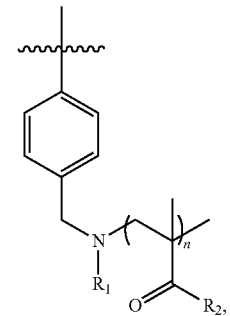

indicate the attachment site of the specified structure to another chemical group, for example, to the backbone of a polymer.

A structure represented generally by a formula such as:

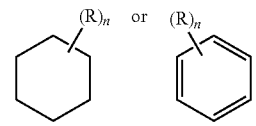

as used herein refers to a ring structure, for example, but not limited to, a 3-carbon, a 4-carbon, a 5-carbon, a 6-carbon, and the like, aliphatic and/or aromatic cyclic compound comprising a substituent group (e.g., a R, D, or another variable), wherein the substituent group can be present or absent, and when present, one or more substituent groups can each be substituted on one or more available carbon atoms of the ring structure. The presence or absence of the substituent group and number of substituent groups is determined by the value of the integer n. Each substituent group, if more than one, is substituted on an available carbon of the ring structure rather than on another substituent group. For example, the structure:

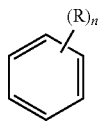

wherein n is an integer from 0 to 2 comprises compound groups including, but not limited to:

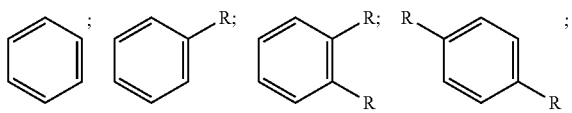

and the like.

When the term "independently selected" is used, the substituents being referred to (e.g., R groups, such as groups $R_1$ and $R_2$, or groups X, Y, and D), can be identical or different. For example, both $R_1$ and $R_2$ can be substituted alkyls, or $R_1$ can be hydrogen and $R_2$ can be a substituted alkyl, and the like.

The term "aprotic solvent" refers to a solvent molecule which can neither accept nor donate a proton. Typical aprotic solvents include, but are not limited to, acetone, acetonitrile, benzene, butanone, butyronitrile, carbon tetrachloride, chlorobenzene, chloroform, 1,2-dichloroethane, dichloromethane (DCM), diethyl ether, dimethylacetamide, N,N-dimethylformamide (DMF), dimethylsulfoxide (DMSO), 1,4-dioxane, ethyl acetate, ethylene glycol dimethyl ether, hexane, N-methylpyrrolidone, pyridine, tetrahydrofuran (THF), and toluene. Certain aprotic solvents are polar solvents. Examples of polar aprotic solvents include, but are not limited to, acetone, acetonitrile, butanone, N,N-dimethylformamide, and dimethylsulfoxide. Certain aprotic solvents are non-polar solvents (e.g., non-polar organic solvents). Examples of nonpolar organic solvents include, but are not limited to, diethyl ether, aliphatic hydrocarbons, such as hexane, aromatic hydrocarbons, such as benzene and toluene, and halogenated hydrocarbons, such as carbon tetrachloride, DCM, and chloroform.

The term "strong acid" as used herein refers to an acid that ionizes completely in a solution of water. Strong acids typically have a $pK_a$ that is less that about −1.74 or less than about −1. Examples of strong acids, include, but are not limited to, hydrochloric acid (HCl), hydrobromic acid (HBr), hydroiodic acid (HI), sulfuric acid ($H_2SO_4$), perchloric acid ($HClO_4$), nitric acid ($HNO_3$), methanesulfonic acid (MsOH), and p-toluenesulfonic acid (pTsOH or PTSA), and chloric acid ($HClO_3$). In contrast, a "weak acid" is an acid that does not completely dissociate in a solution of water, but instead exists in equilibrium between molecules that are ionized and those that are not. Examples of weak acids include acetic acid, benzoic acid, and oxalic acid.

The term "substantially free of free glassy acrylic polymeric chains" as used herein refers to a thermoplastic elastomer comprising an acrylic multigraft polymer or to an acrylic multigraft copolymer that is substantially free of glassy acrylic polymeric chains that are not covalently attached/grafted to a rubbery acrylic polymeric backbone. These free chains can also be referred to as non-copolymerized grafts. "Substantially free" can refer to an elastomer or copolymer that contains no free glassy acrylic polymeric chains. It can also refer to an elastomer or copolymer population that contains some free glassy acrylic polymeric chains, but wherein the number of free glassy acrylic polymeric chains or the concentration of free glassy acrylic polymeric chains is too low to have a measurable effect on the mechanical and/or elastic properties of the elastomer or copolymer. In some embodiments, the elastomer or copolymer that is "substantially free of free glassy acrylic polymeric chains" contains about 10% or less (e.g., about 10, 9, 8, 7, 6, 5, 4, 3, 2.5, 2.0, 1.75, 1.5, 1.25, 1, 0.75, 0.5, 0.25, 0.1, or about 0%) by volume of free glassy acrylic polymeric chains. In some embodiments, the elastomer or copolymer that is "substantially free of free glassy acrylic polymeric chains" contains about 10% or less (e.g., about 10, 9, 8, 7, 6, 5, 4, 3, 2.5, 2.0, 1.75, 1.5, 1.25, 1, 0.75, 0.5, 0.25, 0.1, or about 0%) of free glassy acrylic polymeric chains compared to the total number of individual polymers (i.e., the total number of multigraft copolymers and free glassy acrylic polymeric chains combined) in a particular polymer population.

II. All-Acrylic Multigraft Copolymers

Thermoplastic elastomers (TPEs) are materials with rubber-like properties. They have various applications in daily life, for example, as elastomers and adhesives. Most commercial TPEs, such as SBS and SIS (S=polystyrene, B=polybutadiene, I=polyisoprene) are linear triblock copolymers synthesized by anionic polymerization. In contrast to conventional rubbers, which achieve their elastic properties by chemical cross-links between macromolecules, TPEs exhibit rubber-like behavior due to the formation of hard physically cross-linked domains in a soft continuous phase. See Holdon et al., Thermoplastic Elastomers, Hanser, Munich, 1996; and Spontak and Patel, (2000) Current opinion in colloid & interface science, 5, 333.

Acrylic TPEs can offer many advantages compared to styrenic TPEs, including better chemical stability, higher upper service temperature (UST), better optical transparency, oil resistance, versatility of adhesion, low viscosity, and weatherability. Thus, Polyacrylate-based TPEs are good options for use as high performance pressure-sensitive adhesives. However, acrylic TPEs tend to have poorer mechanical properties compared to styrenic TPEs due to the higher entanglement molecular weight ($M_e$) of acrylic polymers. See Tong and Jerôme (2000) Polymer, 41, 2499-2510; Lu et al. (2017) Polym. Chem., 8, 5741-5748; and Tong and Jerôme (2000) Macromolecules, 33, 1479-1481. Improvements in elongation at break while maintaining high tensile strength are desirable to improve the performance of acrylic TPEs in many applications, such as gloves, condoms, and rubber bands. With increased elongation at break and high elastic recovery, products can be prepared using less elastomer, providing improved and/or thinner materials, having reduced cost and weight. See Tong and Jerôme (2000) Polymer, 41, 2499-2510.

The use of a more complex macromolecular architecture is one approach to address these issues. As compared to linear block copolymers, polymers with more complex architectures can exhibit superior physical and mechanical properties. Furthermore, block copolymers having miktoarm stars or graft/multigraft architectures can provide additional capacity to tune morphology and long range order. "Superelastomer" multigraft copolymers comprising polyisoprene (PI) backbones and polystyrene (PS) side chains have been described that have higher elongation at break than a PS-PI-PS triblock copolymer. See Mays et al. (2004) Macromol. Symp., 215, 111-126; Mijović et al. (2003) Macromolecules, 36, 7640-7651; Uhrig et al. (2011) Eur. Poly. J., 47, 560-568; and Zhu et al. (2006) Macromolecules, 39, 4428-4436.

Multigraft copolymers are normally synthesized through one of three strategies: "grafting onto", "grafting from", and "grafting through", a strategy that employs macromonomers. See Urhrig and Mags (2011) Polym. Chem., 2, 69-76. Among these approaches, the grafting through approach provides a better ability to produce graft copolymers with side chains having a fixed chain length. See Ito et al. (2014) Poly. Chem., 2, 69-76. Generally, using the grafting through approach, regular and random multigraft copolymers can be prepared by copolymerizing a monomer related to the constitutional units of the copolymer backbone or main chain with macromonomers comprising polymeric chains that can make up the side chains of the resulting copolymer.

Poly(n-butyl acrylate)-g-poly(methyl methacrylate) (PBA-g-PMMA) multigraft copolymers with 400% strain at beak have been described. See Goodwin et al. (2015) Ind. Eng. Chem. Res., 54, 9566-9576; Radke et al. (1996) Macromol. Symp., 101, 19-27; and Roos et al. (1999) Macromolecules, 32, 8331-8335. The PMMA macromonomer was synthesized by anionic polymerization using 1-(tert-butyldimethylsiloxy)-3-butyllithium as a protected initiator, followed by deprotection and conversion to the PMMA macromonomer (MM-PMMA). Macromonomer can also be synthesized through a coupling reaction with 4-vinylbenzyl chloride. See Wang et al. (2014) Macromolecules 47, 7284-7295. However, these previously reported routes involve linking reactions or post-polymerization modification reactions that can make synthesis more complex, result in low monomer conversion, result in lower copolymer purity, and/or involve long reaction times.

According to one aspect of the presently disclosed subject matter, an acrylic multigraft copolymer is prepared via a grafting through method wherein an acrylic macromonomer is produced via anionic polymerization using a vinylbenzylamine (e.g., a N-alkyl-4-vinylbenzylamine) or a vinylbenzyldiamine as an initiator. The reactivity gap between the carbanion and the nitranion can give rise to the polymerization of methacrylates with the styrenic vinyl group of the initiator intact. Thus, the synthesis of the acrylic macromonomer can be achieved in a one-batch reaction with essentially 100% conversion and a short reaction time, taking advantage of the "living" nature of anionic polymerization. In some embodiments, the final multigraft copolymer can be synthesized via reversible addition-fragmentation chain-transfer (RAFT) polymerization.

The resulting acrylic multigraft copolymers exhibit microphase separated morphologies. Further, for what is believed to be the first time for all-acrylic copolymers (i.e., copolymers comprising acrylic rubbery/soft phases and acrylic glassy/hard phases), the combination of multigraft architecture and increased overall molecular weight provide "superelastomeric" properties, including an elongation at break that is significantly greater than those of conventional triblock copolymer polyacrylate TPEs. In addition, the presently disclosed copolymers have excellent elastic recovery, making them superior to traditional linear triblock type TPEs. Thus, the mechanical properties of the presently disclosed copolymers offer the ability to expand the application range of all-acrylic TPEs, for example, in the production of thinner surgical gloves and condoms.

Accordingly, in some embodiments, the presently disclosed subject matter provides a thermoplastic elastomer comprising an acrylic multigraft copolymer (e.g., a random multigraft copolymer) that has "superelastomeric" properties. Superelastomers can have advantageous properties compared to commercial linear (e.g., block) thermoplastic elastomers, such as larger elongation at break, lower residual strain, and/or highly tunable modulus. In some embodiments, the presently disclosed multigraft copolymers comprise a "rubbery" acrylic backbone comprising an acrylic polymer having a glass transition temperature ($T_g$) of about 0° C. or less, and "glassy" acrylic side chains having a $T_g$ of about 60° C. or more. In some embodiments, the multigraft copolymer has a number-average molecular weight of about 200 kilograms per mole (kg/mol) or more. In some embodiments, the multigraft copolymer has a stress at break ($\sigma_B$) of at least about 1 megapascal (MPa).

In some embodiments, the thermoplastic elastomer comprises an acrylic multigraft copolymer comprising (a) a rubbery polymeric backbone comprising an acrylic polymer and a plurality of randomly spaced branch points and (b) a plurality of glassy acrylic polymeric grafts, wherein each of the acrylic polymeric grafts comprises an acrylic polymer and wherein each of the acrylic polymeric grafts is attached to the rubbery polymeric backbone at one of the plurality of randomly spaced branch points. In some embodiments, the acrylic multigraft copolymer can further comprise one or more backbone segments and/or one or more graft or graft segments that are non-acrylic polymers (e.g., other polyvinyl polymers). In some embodiments, the acrylic multigraft copolymer is free of polymer segments that comprise a non-acrylic polymer. In some embodiments, the acrylic multigraft copolymer is substantially free of free glassy polymeric chains (e.g., free glassy acrylic polymeric chains).

In some embodiments, the rubber polymeric backbone comprises a poly(alkyl acrylate) or a poly(alkyl acrylate) copolymer. Acrylic polymers that can be used in the glassy polymeric grafts include polymethacrylic acid as well as esters, salts, and coordination complexes thereof. In some embodiments, the acrylic polymeric grafts comprise a poly(alkyl methacrylate), a poly(cycloalkyl methacrylate), a poly(aralkyl methacrylate), a poly(aryl methacrylate), or copolymers thereof. In some embodiments, the acrylic polymeric grafts comprise a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof.

Accordingly, in some embodiments, the presently disclosed subject matter provides a thermoplastic elastomer comprising an acrylic multigraft copolymer comprising: a rubbery polymeric backbone comprising a plurality of randomly spaced branch points, wherein the rubbery polymeric backbone comprises a poly(alkyl acrylate) or a copolymer thereof; and a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points.

In one aspect of the presently disclosed subject matter, it is believed that the use of a grafting through synthesis strategy comprising the use of a macromonomer prepared using a nitroanion-based initiator can provide enhanced copolymer purity. In particularly, it is believed that the use of a nitroanion-based initiator leads to quantitative functionalization of all the polymeric chains in the macromonomer with a terminal functional group that is reactive in the copolymerization. Thus, according to the presently disclosed subject matter, an acrylic multigraft copolymer can be prepared that is substantially free of glassy acrylic polymeric (i.e., polyacrylic) chains that are not attached to the rubbery polyacrylic backbone. Thus, the copolymer is substantially free of "free" or "unattached" glassy polyacrylic chains: and the instantly disclosed copolymers can have a higher purity than prior acrylic copolymers (e.g., prior acrylic multigraft copolymers). Further, as it is believed that the free glassy polyacrylic chains can have a negative impact on the mechanical and/or elastic properties of the acrylic copolymers, the presently disclosed, higher purity acrylic multigraft copolymers can have enhanced mechanical and/or elastic properties compared prior acrylic copolymers (e.g., prior acrylic multigraft copolymers).

Accordingly, in some embodiments, the presently disclosed subject matter provides a thermoplastic elastomer comprising an acrylic multigraft copolymer comprising: a rubbery polymeric backbone comprising a plurality of randomly spaced branch points, wherein the rubbery polymeric backbone comprises a poly(alkyl acrylate) or a copolymer thereof; and a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points; wherein the acrylic multigraft copolymer is substantially free of free glassy acrylic polymeric chains.

In some embodiments, the presently disclosed subject matter provides a thermoplastic elastomer comprising an acrylic multigraft copolymer comprising: a rubbery polymeric backbone comprising a plurality of randomly spaced branch points, wherein the rubbery polymeric backbone comprises a poly(alkyl acrylate) or a copolymer thereof; and a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points; wherein the acrylic multigraft copolymer has a number-average molecular weight ($M_n$) of at least about 200 kilograms per mole (kg/mol).

In some embodiments, the presently disclosed subject matter provides a thermoplastic elastomer comprising an acrylic multigraft copolymer comprising: a rubbery polymeric backbone comprising a plurality of randomly spaced branch points, wherein the rubbery polymeric backbone comprises a poly(alkyl acrylate) or a copolymer thereof; and a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points; wherein the acrylic multigraft copolymer has a as of at least about 1 MPa.

In some embodiments, the presently disclosed subject matter provides a thermoplastic elastomer comprising an acrylic multigraft copolymer comprising: a rubbery polymeric backbone comprising a plurality of randomly spaced branch points, wherein the rubbery polymeric backbone comprises a poly(alkyl acrylate) or a copolymer thereof; and a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points; wherein the acrylic multigraft copolymer is/has at least two or is all three of the group comprising: substantially free of free glassy acrylic polymeric chains, a $M_n$ of at least about 200 kg/mol, and a as of at least about 1 megapascals MPa.

The rubbery polymeric backbone of the presently disclosed multigraft copolymers can comprise any suitable poly(alkyl acrylate). Suitable poly(alkyl acrylates) include poly(n-alkyl acrylates), such as, but not limited to, poly(methyl acrylate), poly(ethyl acrylate), poly(n-propyl acrylate), poly(n-butyl acrylate), poly(n-pentyl acrylate), poly(n-hexyl acrylate), poly(n-heptyl acrylate), poly(n-octyl acrylate), poly(n-nonyl acrylate), poly(n-decyl acrylate), poly(n-undecyl acrylate), poly(n-dodecyl acrylate), and copolymers thereof. In some embodiments, the poly(alkyl acrylate) is selected from poly(methyl acrylate), poly(ethyl acrylate), poly(n-propyl acrylate), poly(n-butyl acrylate), poly(n-pentyl acrylate), poly(n-hexyl acrylate), and copolymers thereof. In some embodiments, the poly(alkyl acrylate) is poly(n-butyl acrylate) (PBA).

Suitable poly(alkyl methacrylates) for the grafts of the presently disclosed multigraft copolymers include, but are not limited to, alkyl esters of polymethacrylic acid wherein the alkyl ester is the ester of a straight or branched $C_1$-$C_{12}$ or $C_1$-$C_6$ alkyl group, such as, but not limited to, poly(methyl methacrylate) (PMMA), poly(ethyl methacrylate), poly(propyl methacrylate), poly(butyl methacrylate) (e.g., poly(tert-butyl methacrylate) (PtBMA)), poly(pentyl methacrylate), and poly(hexyl methacrylate). Suitable poly(cycloalkyl methacrylates) for the grafts include, but are not limited to, poly(isobornyl methacrylate), poly(1-adamantyl methacrylate), poly(cyclohexyl methacrylate), and poly(menthyl methacrylate). Suitable poly(aryl methacrylates) and poly(aralkyl methacrylates) for the grafts include, but are not limited to, poly(phenyl methacrylate), poly(naphthyl methacrylate), poly(benzyl methacrylate), and poly(trityl methacrylate).

In some embodiments, each of the plurality of glassy polymeric grafts has a structure of one of the formulas:

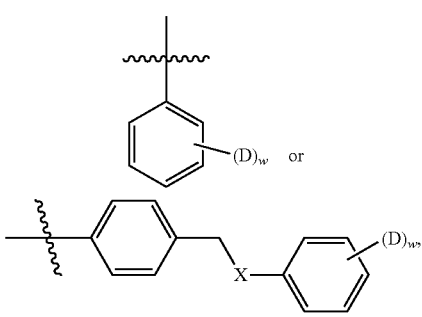

wherein w is 1 or 2; X is O, S, or NR', wherein R' is alkyl, aralkyl, or aryl; and each D is a group having the structure formula —$CH_2$—$NR_1$—[$CH_2$—C($CH_3$)(C(=O)$R_2$)]$_n$—$CH_3$ or —$X_1$-L-$NR_1$—[$CH_2$—C($CH_3$)(C(=O)$R_2$)]$_n$—$CH_3$ wherein each n is independently an integer greater than 10; $X_1$ is O, S or NR', L is a bivalent linker, such as an alkylene, aralkylene, or arylene group, (e.g., $C_1$-$C_6$ alkylene, such as propylene); $R_1$ is selected from the group comprising alkyl (e.g., $C_1$-$C_6$ alkyl), aralkyl (e.g., benzyl), and aryl (e.g., phenyl); and each $R_2$ is independently selected from hydroxyl, alkoxy, cycloalkoxy, aralkoxy, aryloxy and an oxyanion (i.e., —$O^-$), optionally wherein when $R_2$ is an oxyanion, it can be bonded to a cation of an alkali metal (i.e., Li, Na, K, Rb, or Cs) via an ionic bond or to a metal compound via a coordination bond. The value of w can determine whether the multigraft copolymer has a "comb" architecture (i.e., when w is 1) or a "centipede" architecture (i.e., when w is 2).

In some embodiments, the multigraft copolymer has a "centipede" architecture wherein each of the branch points on the polymer backbone is attached to two glassy side chains. For example, in some embodiments, each of the plurality of glassy polymeric grafts has a structure of the formula:

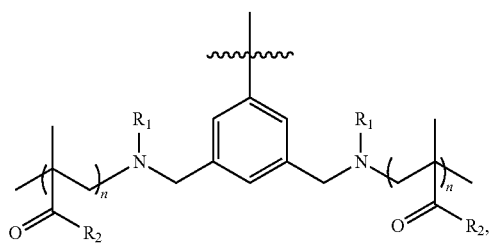

wherein: each n is an integer of about 10 or greater, depending upon the molecular weight of the graft; $R_1$ is selected from the group comprising alkyl, optionally $C_1$-$C_6$ alkyl, aralkyl, and aryl, optionally phenyl; and each $R_2$ is independently selected from hydroxyl, alkoxy, cycloalkoxy, aralkoxy, aryloxy and an oxyanion, optionally wherein when $R_2$ is a an oxyanion, it can be bonded to a cation of an alkali metal via an ionic bond or to a metal compound via a coordination bond. In some embodiments, each of the plurality of glassy polymeric grafts in the centipede multigraft copolymer can have a structure of the formula:

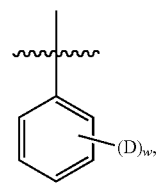

wherein: w is 2, and each D has a structure —O-L-$NR_1$—[$CH_2$—C($CH_3$)(C(=O)$R_2$)]$_n$—$CH_3$ wherein each n is independently an integer greater than 10: L is alkylene (e.g., $C_1$-$C_6$ alkylene, such as propylene): $R_1$ is selected from the group comprising alkyl (e.g., $C_1$-$C_6$ alkyl), aralkyl (e.g., benzyl), and aryl (e.g., phenyl); and each $R_2$ is independently selected from hydroxyl, alkoxy, cycloalkoxy, aralkoxy, aryloxy and an oxyanion (i.e., —$O^-$), optionally wherein when $R_2$ is an oxyanion, it can be bonded to a cation of an alkali metal (i.e., Li, Na, K, Rb, or Cs) via an ionic bond or to a metal compound via a coordination bond. Alternatively, in some embodiments, each of the plurality of glassy polymeric grafts in the centipede multigraft copolymer can have a structure of the formula:

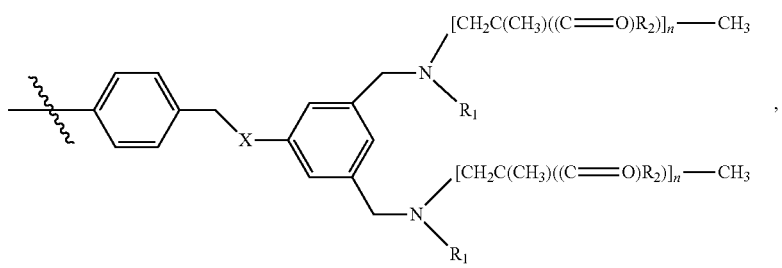

wherein: each n is an independently an integer of about 10 or greater, depending upon the molecular weight of the graft; X is selected from O, S, and NR', wherein R' is alkyl, aralkyl or aryl; $R_1$ is selected from the group comprising alkyl, optionally $C_1$-$C_6$ alkyl, aralkyl, and aryl, optionally phenyl; and each $R_2$ is independently selected from hydroxyl, alkoxy, cycloalkoxy, aralkoxy, aryloxy and an oxyanion, optionally wherein when $R_2$ is a an oxyanion, it can be bonded to a cation of an alkali metal via an ionic bond or to a metal compound via a coordination bond. In some embodiments, X is O.

In some embodiments, the multigraft copolymer has a "centipede" architecture wherein each of the branch points on the polymer backbone is attached to two different types of glassy side chains. For example, each branch point can be attached to one glassy polyacrylic side chain (e.g., a PMMA side chain) and one glassy non-polyacrylic side chain (e.g., a polystyrene (PS) side chain). See FIG. 1G.

In some embodiments, the multigraft copolymer has a "comb" architecture wherein each of the branch points is attached to a single glassy side chain. In some embodiments, each of the plurality of glassy polymeric grafts has a structure of the formula:

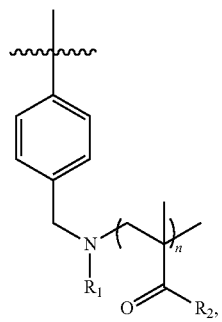

wherein: n is an integer of about 10 or greater, depending upon the molecular weight of the graft; $R_1$ is selected from the group comprising alkyl, optionally $C_1$-$C_6$ alkyl, aralkyl, and aryl, optionally phenyl; and each $R_2$ is independently selected from hydroxyl, alkoxy, cycloalkoxy, aralkoxy, aryloxy and an oxyanion, optionally wherein when $R_2$ is a an oxyanion, it can be bonded to a cation of an alkali metal via an ionic bond or to a metal compound via a coordination bond.

In any of the presently disclosed graft structures, in some embodiments, $R_1$ is alkyl or aryl. In some embodiments, $R_1$ is branched alkyl, e.g., isopropyl, sec-butyl, or tert-butyl. In some embodiments, $R_1$ is isopropyl.

In any of the presently disclosed graft structures, in some embodiments, $R_2$ is an alkoxy, cycloalkoxy, aralkoxy, or aryloxy group having the structure —$OR_3$, wherein $R_3$ is selected from the group comprising methyl, ethyl, propyl, butyl, isobornyl, 1-adamantyl, cyclohexyl, menthyl, phenyl, naphthyl, benzyl, diphenylmethyl, and triphenylmethyl (i.e., trityl). In some embodiments, $R_3$ is selected from methyl and tert-butyl (i.e., $R_2$ is methoxy or tert-butoxy).

In some embodiments, the thermoplastic elastomer comprises a "comb" multigraft copolymer having the structure:

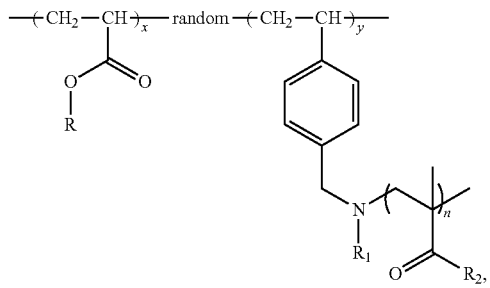

wherein:
x is an integer of 10 or greater;
y is 1.2 or greater, optionally between about 1.2 and about 15;
n is an integer of about 10 or greater:
R is a straight chain $C_1$-$C_{12}$ alkyl group $R_1$ is selected from the group comprising alkyl, optionally $C_1$-$C_6$ alkyl, aryl, optionally phenyl; and
each $R_2$ is independently selected from hydroxyl, alkoxy, cycloalkoxy, aralkoxy, aryloxy and an oxyanion, optionally wherein when $R_2$ is a an oxyanion, it can be bonded to a cation of an alkali metal via an ionic bond or to a metal compound via a coordination bond. The use of "random" linking the two sub-structures indicates the random order of the different sub-structures within the copolymer, e.g., monomeric units based on an ester of methacrylic acid (i.e., the sub-structure on the right) can be randomly interspersed with polymeric units of the left-hand sub-structure (although there will be more than one of the sub-structures on the right in the copolymer as a whole).

Typically, the volume fraction of the glassy grafts in the presently disclosed acrylic multigraft copolymer is at least about 5% of the total copolymer but less than about 50%. In some embodiments, the volume fraction of the glassy grafts can be varied between about 8% and about 35% (e.g., about 8, 9, 10, 11, 12, 13, 14, 15, 16, 17, 18, 19, 20, 21, 22, 23, 24, 25, 26, 27, 28, 29, 30, 31, 32, 33, 34, or about 35%). In some embodiments, the number-average molecular weight ($M_n$) of each glassy graft is at least about 5 kg/mol. In some embodiments, the $M_n$ of each graft is at least about 7.5 kg/mol. In some embodiments, the $M_n$ of each between about 8 kg/mol and about 30 kg/mol (e.g., about 8, 10, 12, 14, 16, 18, 20, 22, 24, 26, 28, or about 30 kg/mol. In some embodiments, the multigraft copolymer comprises an average number of grafts of about 1.2, 1.3, 1.4, or 1.5 or higher. In some embodiments, the average number of grafts is between about 1.5 and about 6.

As described hereinabove, the acrylic multigraft copolymer can have a $M_n$ of at least about 200 kg/mol. In some embodiments, the $M_n$ can be as high as about 1,000 or about 2,000 kg/mol or higher. In some embodiments, the $M_n$ is between about 200 kg/mol and about 600 kg/mol (e.g., about 200, 250, 300, 350, 400, 450, 500, 550 or about 600 kg/mol). In some embodiments, the $M_n$ is at least about 245 kg/mol. In some embodiments, the $M_n$ is between about 245 kg/mol and about 445 kg/mol (e.g., about 245, 265, 285, 305, 325, 345, 365, 385, 405, 425, or about 445 kg/mol).

As noted above, in some embodiments, the acrylic multigraft copolymer has a stress at break ($\sigma_B$) of at least about 1 megapascal (MPa). In some embodiments, the copolymer as a $\sigma_B$ of at least about 1.5, 1.6, 1.7, 1.8, or about 1.9 MPa. In some embodiments, the $\sigma_B$ is between about 1.9 MPa and about 15.1 MPa (e.g., about 2, 3, 4, 5, 6, 7, 8, 9, 10, 11, 12, 13, 14, or 15 MPa). In some embodiments the copolymer with the $\sigma_B$ of at least about 1 MPa or about 1.9 MPa also has an elongation at break ($\varepsilon_B$) of 490% or more. In some embodiments, $\varepsilon_B$ is at least about 1000% or more. In some embodiments, the $\varepsilon_B$ is at least about 1500% or more (e.g., about 1500%, 1600%, 1700%, 1800%, 2000%, 2500%, or about 3000% or more). In some embodiments, the copolymer has a $\varepsilon_B$ of about 3127%. In some embodiments, the acrylic multigraft copolymer has a residual strain of about 15% or less at an applied strain of about 1460%. In some embodiments, the acrylic multigraft copolymer has a stress of about 1.0 MPa or greater (e.g., about 1, 2, 3, 4, 5, 6, 7, 8, 9, 10, or 11 MPa) at 500% strain.

In some embodiments, the presently disclosed subject matter provides a thermoplastic elastomer composition comprising a multigraft copolymer comprising a poly(n-butyl acrylate) (PBA) main chain and a plurality of poly(methyl methacrylate) (PMMA) grafts, i.e., a PBA-g-PMMA copolymer. In some embodiments, the copolymer is a random PBA-g-PMMA copolymer. In some embodiments, the volume fraction of PMMA is between about 8% and about 34% (e.g., about 8, 10, 12, 13, 14, 16, 18, 20, 22, 24, 26, 28, 30, 32, or about 34%). In some embodiments, the PBA-g-PMMA copolymer has a volume fraction of PMMA between about 8% and about 10%. In some embodiments, the PBA-g-PMMA multigraft copolymer has a stress at break of at least about 1.9 MPa and/or an elongation at break of about 1700% or more. In some embodiments, the stress at break is between about 1.9 MPa and about 11 MPa (e.g., about 2, 3, 4, 5, 6, 7, 8, 9, 10, 10.5, or about 11 MPa). In some embodiments, the elongation at break is between about 1700% and about 1900%. In some embodiments, the Young's modulus is between about 0.2 and about 22 MPa. In some embodiments, the Young's modulus is about 1 MPa or more.

The inclusion of groups in the glassy graft chains that can hydrogen bond or bond via coordination or ionic bonds can, in some embodiments, increase the mechanical strength or other elastomeric or mechanical properties of the multigraft copolymers. Thus, in some embodiments, the acrylic multigraft copolymer comprises a poly(alkyl acrylate) main chain and a plurality of grafts comprising a copolymer of a polymethacrylate (e.g., a poly(alkyl methacrylate), a poly(aryl methacrylate), a poly(cycloalkyl methacrylate) or a poly(aralkyl methacrylate)) and poly(methacrylic acid) or a salt or coordination complex thereof. The polymethacrylate of the graft chains can be selected to include an ester that is more easily hydrolyzed under one or more particular conditions than the ester of the poly(alkyl acrylate) of the main chain. Thus, for example, the copolymer can have a formula of the structure:

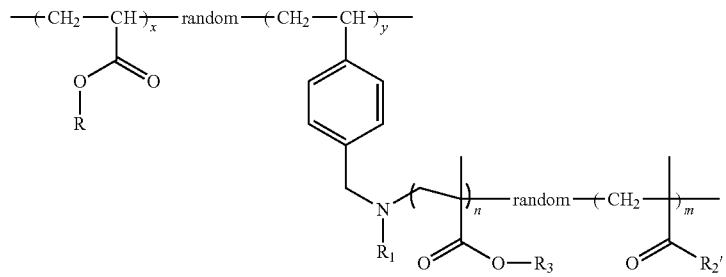

wherein:
x is an integer of about 10 or greater;
y is a number corresponding to the average number of grafts, optionally between about 1.2 and about 15;
n is an integer of about 10 or greater;
m is an integer of 1 or greater;
R is a straight chain $C_1$-$C_{12}$ alkyl group
$R_1$ is selected from the group comprising alkyl, optionally $C_1$-$C_6$ alkyl, aralkyl, and aryl, optionally phenyl;
each $R_{2'}$ is independently selected from hydroxyl and an oxyanion, optionally wherein when $R_{2'}$ is a an oxyanion, it can be bonded to a cation of an alkali metal via an ionic bond or to a metal ion or metal compound via a coordination bond; and
$R_3$ is selected from alkyl, aralkyl, aryl, and cycloalkyl.

In order to facilitate partial hydrolysis of the glassy polymeric side chains while leaving the esters in the rubbery polyacrylic backbone intact, in some embodiments, $R_3$ is an alkyl, aralkyl, aryl, or cycloalkyl group of an ester that is more readily hydrolyzed than an n-alkyl ester. For example, in some embodiments, $R_3$ is tert-butyl, benzyl, diphenylmethyl, or triphenylmethyl (i.e., trityl).

In some embodiments, each $R_{2'}$ is hydroxyl and the copolymer comprises partially hydrolyzed grafts. In some embodiments, each graft is between about 10% and about 66% hydrolyzed (e.g., about 10, 15, 20, 25, 30, 35, 40, 45, 50, 55, 60, 65, or about 66% hydrolyzed). In some embodiments, the ratio of n to m is between about 9:1 and about 2:3. In some embodiments, each graft is between about 40 and about 60% hydrolyzed (e.g., about 40, 42, 44, 46, 48, 50, 52, 54, 56, 58, or about 60% hydrolyzed). The presence of partially hydrolyzed grafts and the degree of hydrolysis can increase the strength of the copolymer.

In some embodiments, each $R_{2'}$ is an oxyanion, optionally bonded via an ionic bond to a cation of an alkali metal, such as sodium, potassium, lithium, rubidium or cesium, and the copolymer comprises partially ionized grafts. In some embodiments, each graft is between about 10% and about 66% ionized. In some embodiments, the ratio of n to m is between about 9:1 and about 2:3. In some embodiments, each graft is between about 40 and about 60% ionized. The presence of partially ionized grafts and the degree of ionization can increase the strength of the copolymer.

In some embodiments, each $R_{2'}$ is an oxyanion, optionally coordinatively bonded to a metal in a metal complex and the copolymer comprises partially coordinatively bonded grafts. In some embodiments, the metal is an alkali earth metal, such as calcium, magnesium, strontium or barium, or zinc or another transition metal. In some embodiments, each graft is between about 10% and about 66% coordinatively bonded. In some embodiments, the ratio of n to m is between about 9:1 and about 2:3. In some embodiments, each graft is between about 40 and about 60% coordinatively bonded. The metal complex can further include other metal ligands, such as halide, hydroxyl, alkoxy, and the like. The presence of coordination bonds and the degree of coordination bonding can increase the strength of the copolymer.

In some embodiments, the glassy polyacrylic side chains are copolymers of a methacrylate comprising an easily hydrolyzable ester (e.g., tert-butyl methacylate or benzyl methacrylate) and a methacrylate that is less easily hydrolyzed (i.e., is less easily hydrolyzed in one or more particular conditions than the easily hydrolyzable ester). Thus, when partially hydrolyzed, the graft chain can include three different types of monomeric units, i.e., one including the intact harder to hydrolyze ester, one including the intact more easily hydrolyzable ester, and one including a hydrolyzed ester or derivative thereof, i.e., where the hydrolyzed ester forms a carboxylic acid or a carboxylate or salt or coordination complex thereof. In some embodiments, the grafts can include block copolymers, e.g., wherein a partially hydrolyzed glassy acrylic chain is at one end of the graft (e.g., farther from the multigraft copolymer main chain) and a non-hydrolyzed glassy acrylic chain is at the other end of the graft (e.g., nearer to the attachment point of the graft to the multigraft copolymer main chain). In some embodiments, each graft comprises a copolymer of PMMA and partially hydrolyzed PtBMA or partially hydrolyzed poly(benzyl methacrylate).

In some embodiments, the acrylic multigraft copolymer comprises a poly(alkyl acrylate) main chain and a plurality of grafts comprising poly(tert-butyl methacrylate) (PtBMA) or a copolymer of PtBMA and poly(methacrylic acid) or a salt or coordination complex thereof. In some embodiments, the acrylic multigraft copolymer comprises a poly(n-butyl acrylate) main chain and is a PBA-g-PtBMA copolymer or a hydrolyzed, ionized, or coordinated derivative thereof. Thus, in some embodiments, the acrylic multigraft copolymer comprises a poly(n-butyl acrylate) (PBA) main chain and a plurality of grafts comprising poly(tert-butyl methacrylate) (PtBMA) or a copolymer of PtBMA and poly(methacrylic acid) or a salt or coordination complex thereof.

In some embodiments, the acrylic multigraft copolymer has a volume fraction of PtBMA or copolymer of PtBMA and poly(methacrylic acid) or salt or coordination complex thereof between about 20% and about 32% (20, 21, 22, 23, 24, 25, 26, 27, 28, 29, 30, 31, or about 32%). In some embodiments, the volume fraction of PtBMA or copolymer of PtBMA and poly(methacrylic acid) or salt or coordination complex thereof is about 26%. In some embodiments, the acrylic multigraft copolymer has an average number of grafts of at least about 3. In some embodiments, the average number of grafts is about 5.7. In some embodiments, the acrylic multigraft copolymer has a $M_n$ of about 300 kg/mol.

In some embodiments, acrylic multigraft copolymer comprises a PBA main chain and a plurality of PtBMA grafts. In some embodiments, the PBA-g-PtBMA copolymer has a volume fraction of PtBMA of about 26% and/or an average number of grafts of about 5.7 and/or graft chains with a number-average molecular weight of about 13.1 kg/mol. In some embodiments, the PBA-g-PtBMA copolymer has an elongation at break of about 3000% or more. In some embodiments, the copolymer has a stress at break of about 1.0 MPa or greater.

In some embodiments, the PBA-g-PtBMA copolymer is modified, e.g., via partial hydrolysis, ionization or coordination of the graft chains. Thus, in some embodiments, the acrylic multigraft copolymer comprises a PBA main chain and a plurality of grafts comprising a copolymer of PtBMA and poly(methacrylic acid) or a salt or coordination complex thereof.

In some embodiments, the grafts are partially hydrolyzed. Accordingly, in some embodiments, each of the plurality of grafts has a structure of the formula:

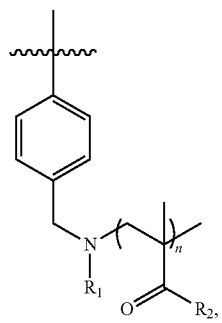

wherein
n is an integer of 10 or greater;
$R_1$ is selected from the group comprising alkyl, optionally $C_1$-$C_6$ alkyl, aralkyl, and aryl, optionally phenyl; and each $R_2$ is independently selected from tert-butoxy and hydroxyl. In some embodiments, between about 15% and about 55% of $R_2$ groups are hydroxyl. In some embodiments, between about 40% and about 55% of the $R_2$ groups are hydroxyl.

In some embodiments, the acrylic multigraft copolymer has a stress at break of about 2 MPa or more. In some embodiments, the stress at break is between about 2.8 MPa and about 6.8 MPa. In some embodiments, the acrylic multigraft copolymer has an elongation at break of 1700% or more. In some embodiments, the acrylic multigraft copolymer has a stress at 500% elongation of about 1.6 MPa or more. In some embodiments, the stress at 500% elongation is between about 1.6 MPa and about 5.9 MPa.

In some embodiments, the grafts are partially ionized. Thus, in some embodiments, each of the plurality of grafts has a structure of the formula:

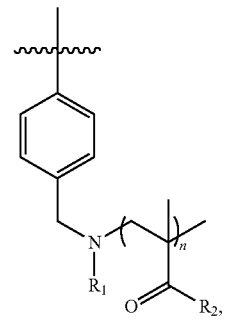

wherein
n is an integer of 10 or greater;
$R_1$ is selected from the group comprising alkyl, optionally $C_1$-$C_6$ alkyl, aralkyl, and aryl, optionally phenyl; and each $R_2$ is independently selected from tert-butoxy (i.e., $(CH_3)_3CO$— or tBuO—) and an oxyanion. In some embodiments, the oxyanion is bound to an alkali metal cation (e.g., $Na^+$, $K^+$, or $Li^+$) via an ionic bond. In some embodiments, the oxyanion is ionically bonded to $Na^+$.

In some embodiments, at least about 10% of $R_2$ are an oxyanion. In some embodiments, between about 10% and about 55% of $R_2$ are oxyanions. In some embodiments, about 42% of $R_2$ are oxyanions. In some embodiments, the multigraft copolymer has a stress at break of about 15.1 MPa, an elongation of about 714%, and/or a stress at 500% elongation of about 11 MPa.

In view of the mechanical properties of the presently disclosed materials, compositions comprising the materials can be provided for use in a wide variety of areas, both as high-tech and commodity thermoplastics. In particular, it is believed that by providing enhanced mechanical properties compared to prior acrylic TPEs, the presently disclosed copolymer can produce products that are thinner than previous acrylic TPE products, thereby reducing the amount of polymer needed to make the products and the product weight, thus reducing costs. In addition, the presently disclosed acrylic TPE can be used in applications where acrylic TPEs have not been used previously. Thus, the optically transparent acrylic TPEs can take the place of non-transparent styrenic TPEs.

Accordingly, in some embodiments, the presently disclosed subject matter provides a composition comprising a thermoplastic elastomer comprising an acrylic multigraft copolymer comprising (a) a rubbery polymeric backbone comprising an acrylic polymer (e.g., a poly(alkyl acrylate)) and a plurality of randomly spaced branch points and (b) a plurality of glassy polymer grafts, wherein each of the glassy polymer grafts comprises an acrylic polymer (e.g., a poly (alkyl methacrylate), poly(aryl methacrylate), poly(aralkyl methacrylate) or poly(cycloalkyl methacrylate) or a copolymer thereof or a copolymer thereof with poly(methacrylic acid) or a salt or coordination complex thereof) and wherein each of the polymer grafts is attached to the rubbery polymeric backbone at one of the plurality of randomly spaced branch points.

The composition can also include at least one additional component, such as, but not limited to, an organic filler, an inorganic filler, a wax, a plasticizer, a tackifier, an antioxidant, a stabilizer (e.g., a thermal or UV stabilizer), a decorative agent, a biocide, a flame retardant, an anti-static agent, a therapeutic agent, a processing aid, such as a lubricant or a mold-release agent, and combinations thereof. More particular additives that can be used are described, for example, in U.S. Patent Application Publication No. 2014/0161858, herein incorporated by reference in its entirety. The type and amount of an additive or additives can be chosen based on the properties desired for the final end use of the composition. The additive or additives can be present in an amount that is less than about 50% by volume or by weight of the composition as a whole. Alternatively, the multigraft copolymer can comprise less than about 50% of the composition as a whole.

The presently disclosed compositions can obtained by mixing and homogenizing the components by the usual methods of plastics technology, and the sequence of adding the components can be varied. Examples of suitable mixing equipment are continuous or batch kneaders, compounding rolls, plastographs, Banbury mixers, co-rotating or counter rotating single- or twin-screw extruders, or other mixers which will provide essentially homogeneous mixtures. In some embodiments, the presently disclosed compositions are prepared by blending together the components including the multigraft copolymer and other additive or additives as desired at between about 23° C. to about 100° C., forming a paste like mixture, and further heating said mixture uniformly (e.g., to about 150° C., or to about 200° C. or more) until a homogeneous molten blend is obtained. Any heated vessel equipped with a stirrer can be used, including those equipped with components to pressure and/or vacuum.

The thermoplastic properties of the presently disclosed copolymers and compositions lend themselves to the fabrication of a variety of articles, via molding and other methods of fabrication known in the art, including, but not limited to injection molding, compression molding, extrusion, and calendaring. Accordingly, in some embodiments, the presently disclosed subject matter provides a fabricated article comprising a random acrylic multigraft copolymer of the presently disclosed subject matter. The fabricated articles can be, for example, an automotive interior or exterior part (e.g. an air bag or air bag door, a seat covering (such as artificial leather upholstery), bumpers, decorative molding pieces, etc.); shoe soles or other shoe parts; elastic waistbands or other elastic bands; diaper or sanitary napkin backings or attachments; adhesive tapes, membranes, toys (or parts for toys), balloons, bags, tubing, ribbing, roofing tiles, medical devices, surgical or other types of gloves, condoms, and electronic wiring coatings or other electronic device components. For instance, U.S. Patent Application Publication No. 2009/0028356, herein incorporated by reference in its entirety, describes the use of elastomeric polymers as an expandable bubble portion in an audio device. In some embodiments, the compositions can be used to provide elastic or flexible moldings for "soft-touch" applications, such as grips, handles, antislip surfaces, gaskets, switches, housings with sealing lips, control knobs, flexographic printing plates, hoses, profiles, medical items, hygiene items, such as toothbrushes, materials for insulating or sheathing cables, sound-deadening elements, folding bellows, rolls or roll coatings, and carpet backings.

In some embodiments, the article is a medical device. Medical devices can include, but are not limited to, infusion kits, dialysis units, breathing masks, catheter tubing, intravenous (iv) bags or tubing therefore, blood bags, syringes, prosthetics, prophylactics, implants or implant coverings (e.g. orthopedic implants, stents or other endoprostheses, or coverings for pacemakers or cochlear implants). In some embodiments, the article is a balloon catheter or a stent. For example, the article can comprise a balloon catheter wherein at least the inflatable portion of the balloon catheter comprises the presently disclosed thermoplastic elastomer composition. Catheters can include any tubing (e.g., flexible or "soft" tubing) that can be inserted into a body cavity, duct, or vessel to inject or to drain fluids. The body cavity, duct, or vessel can be for example, the urethra, the bladder, a blood vessel (e.g., a vein or artery), a biliary duct, the kidney, the heart, the uterus, a fallopian tube, the epidural space, the subarachnoid space, etc. The balloon catheter can be inserted into the body to deliver a stent. For example, the stent can be placed over the balloon portion of the catheter for insertion into the body. When placed inside the body at the desired location (e.g., in a blocked artery), the balloon can be inflated, thereby expanding the stent. The balloon can then be deflated and the catheter removed, leaving the stent in position within the body.

Stents can have one or more branch points. For example, stents can be y-shaped, including a central main tube portion that at one end is separated into two tubes. Stents can be fabricated from metal, polymers, or combinations thereof. For example, the stent can include a wire mesh, a metal coil or coils, or metal rings covered by and/or connected with the presently disclosed composition. Alternatively, the stent can comprise the presently disclosed composition alone or as a covering for another polymeric material.

The stent can be coated with a drug-eluting coating or the thermoplastic elastomeric composition can include a therapeutic additive which can elute from the composition upon placement in the body or upon exposure to particular conditions (e.g., heat, pH, enzymes, etc.). For example, the multigraft copolymer can be blended with a biodegradable polymer having an encapsulated or otherwise complexed drug.

In some embodiments, the presently disclosed compositions are provided for use as adhesive materials. The adhesive can be a pressure sensitive adhesive or a hot melt adhesive and can be used, for example, to adhere plastics to other plastics or to other materials (e.g., paper, wood, metal, glass, etc.). The adhesive composition can include a tackifier, such as, but not limited to, a tackifier selected from the group comprising rosins and derivatives thereof, terpenes, modified terpenes, aliphatic resins, cycloaliphatic resins, aromatic resins, hydrogenated hydrocarbon resins, terpenephenol resins, and mixtures thereof. In some embodiments, the tackifier is selected from the group comprising a rosin ester (e.g., a hydrogenated rosin ester), an aromatic hydrocarbon resin (e.g. a hydrogenated aromatic hydrocarbon resin), an aromatic modified hydrocarbon resin, and an aromatic modified polyterpene. The adhesive can further comprise one or more other additives, such as, but not limited to, waxes, plasticizers, anti-oxidants, UV-stabilizers, decorative agents, biocides, flame retardants, anti-static agents, and fillers. Suitable plasticizers comprise, but are not limited to, phthalates, adipates, citrates, trioctyl trimellitate polyethers, and fatty acid esters. The adhesive can be formulated to provide either temporary or permanent adhesion.

The presently disclosed adhesive compositions can be used, for example, to act as a releasable adhesive for holding gift cards or other plastic cards onto paper or other backings for temporary display or presentation purposes. The presently disclosed adhesive compositions can also be provided in the form of adhesive tapes, comprising one or more releasable backing components that can be easily removed just prior to use of the adhesive. The compositions can further be provided as adhesive backings on other materials, e.g., labels, stamps, automotive trim, bandages or other wound care items, drug patches, diapers, etc. In some embodiments, the adhesive compositions can be provided in the form of spheres, bars or rods suitable for use as hot-melt adhesives, in the home, e.g., for various arts or crafts projects, or in industry, e.g., for the construction of cardboard boxes or for the fabrication of sporting equipment or toys.

The presently disclosed compositions are also useful as elastic or flexible coating layers over other objects, particularly for "soft-touch" applications. "Soft touch" applications include those, for instance, for which one or more of a soft texture, shock absorption, ergonomic comfort, slip resistance, and flexibility, are desirable.

Thus, in some embodiments, the presently disclosed subject matter provides a coated object comprising a coating layer comprising a random acrylic multigraft copolymer as described herein, wherein the random multigraft copolymer comprises a rubbery acrylic polymeric backbone and a plurality of glassy acrylic polymeric grafts, wherein each of the plurality of glassy polymeric grafts is attached to the rubbery polymeric backbone at one of a plurality of randomly spaced branch points, wherein the coating layer covers at least a portion of a surface of a wood, ceramic, glass, carbon fiber, metal, metallic, leather, fabric, stone, or plastic object. In some embodiments, the object is selected from the group comprising an article of clothing (e.g., a shoe or a portion of a shoe, such as a shoe sole, for orthopedic, athletic, or children's shoes or for work boots), an eating or cooking utensil (e.g., baby spoons or other infant feeding tools where a soft mouth feel might be needed, knives, tongs, vegetable peelers, etc), tools (e.g., hammers, wrenches, screwdrivers, saws, etc.), medical implants (e.g. stents, pacemakers, cochlear implants), medical/surgical tools (e.g., retractors, scalpels, clamps, etc.) and wiring and electronic devices (e.g. electronic wiring or fiber optic wiring, materials in ear buds).

III. Methods of Preparing Acrylic Multigraft Copolymers

In some embodiments, the presently disclosed subject matter provides a method of preparing an acrylic multigraft copolymer. The method can comprise the anionic polymerization of a first monomer to form a macromonomer, followed by the copolymerization of the macromonomer with a second monomer to form the multigraft copolymer. Therefore, in some aspects, the presently disclosed method relates to the use of the "grafting through" strategy of preparing graft copolymers.

Suitable macromonomers for use according to the presently disclosed methods include, for example, compounds having a structure of one of the formulas:

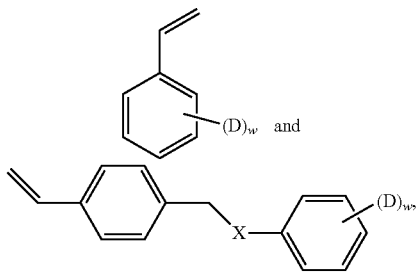

wherein w is 1 or 2; X is O, S, or NR', wherein R' is alkyl, aralkyl or aryl, and each D is a group having a formula —$CH_2$—$NR_1$—[$CH_2$—$C(CH_3)(C(=O)R_2)$]$_n$—$CH_3$, or —$X_1$-L-$NR_1$—[$CH_2$—$C(CH_3)(C(=O)R_2)$]$_n$—$CH_3$ wherein each n is independently an integer greater than 10; $X_1$ is O, S or NR'; L is a bivalent linker, such as an alkylene, aralkylene, or arylene group, (e.g., $C_1$-$C_6$ alkylene, such as propylene); $R_1$ is selected from the group comprising alkyl (e.g., $C_1$-$C_6$ alkyl), aralkyl (e.g., benzyl), and aryl (e.g., phenyl); and each $R_2$ is independently selected from alkoxy, cycloalkoxy, aralkoxy, and aryloxy. In some embodiments, w is 1 or 2. In some embodiments, X is O. In some embodiments $X_1$ is O. In some embodiments, L is alkylene. In some embodiments, L is propylene. In some embodiments, $R_1$ is isopropyl. In some embodiments, $R_2$ is selected from methoxy, tert-butoxy, benzyloxy, diphenylmethoxy, and triphenylmethoxy. In some embodiments, $R_2$ is methoxy or tert-butoxy.

Figure 1B:
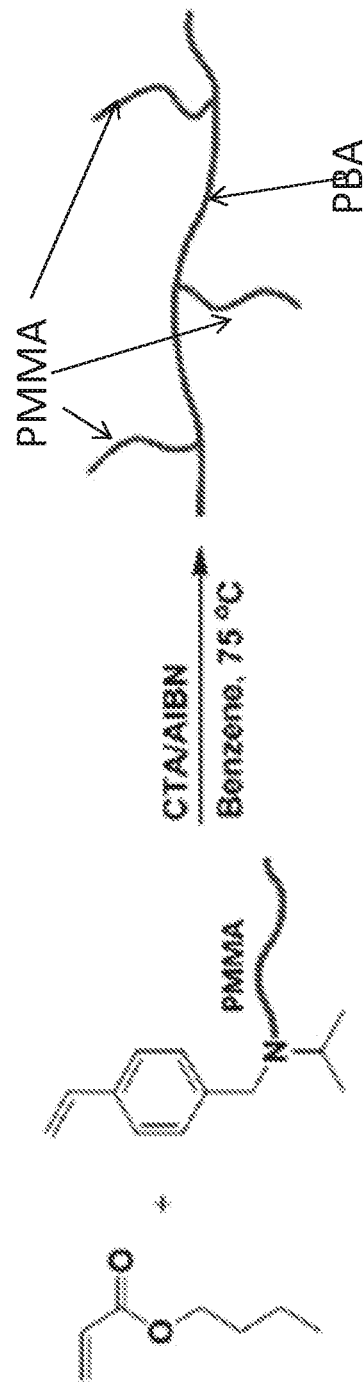
FIG. 1B is a schematic drawing showing the synthesis of an exemplary random multigraft copolymer of n-butyl acrylate (BA) and methyl methacrylate via the copolymerization of BA and the poly(methyl methacrylate) (PMMA) macromonomer described in FIG. 1A using a chain transfer agent (CTA) and 2,2-azobis-(isobutyronitrile) (AIBN) as a radical initiator. The resulting poly(n-butyl acrylate)-graft-poly(methyl methacrylate) (PBA-g-PMMA) has a "comb" architecture.

In some embodiments, the method comprises: (a) providing a macromonomer having the structure of the formula:

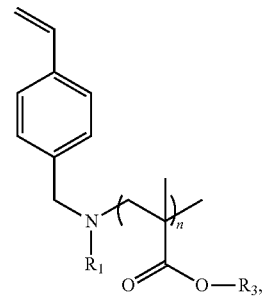

wherein:
n is an integer of about 10 or greater:
$R_1$ is selected from the group comprising alkyl, optionally $C_1$-$C_6$ alkyl, aralkyl, and aryl, optionally phenyl; and
each $R_3$ is independently alkyl, optionally $C_1$-$C_{12}$ alkyl, cycloalkyl, aralkyl, or aryl, optionally wherein each $R_3$ can be the same; and (b) copolymerizing the macromonomer and a second monomer, wherein the second monomer is an alkyl acrylate or a mixture thereof; thereby providing an acrylic multigraft copolymer. In some embodiments, $R_1$ is isopropyl. In some embodiments, $R_3$ is methyl or tert-butyl. FIG. 1B shows the synthesis of a comb PBA-g-PMMA copolymer via the copolymerization of BA and a PMMA macromonomer via RAFT copolymerization using a CTA and AIBN as a radical initiator.

In some embodiments, the second monomer is an n-alkyl acrylate or a mixture thereof. Thus, in some embodiments, the graft copolymers provided by the method can be, for example, poly(alkyl acrylate)-graft-poly(alkyl methacrylate) copolymers, poly(alkyl acrylate)-graft-poly(cycloalkyl methacrylate) copolymers, poly(alkyl acrylate)-graft-poly(aralkyl methacrylate) copolymers, or poly(alkyl acrylate)-graft-poly(aryl methacrylate) copolymers.

In some embodiments, the macromonomer can be prepared in a one-step process, i.e., that is free of post-polymerization modification. In some embodiments, the macromonomer is prepared with high purity, i.e., with little to no polymeric side-product that is not functionalized with a group that can be copolymerized. Thus, in some embodiments, the macromonomer is substantially free of free glassy acrylic polymeric chains.

In some embodiments, the macromonomer is provided via anionic polymerization of a first monomer in the presence of an initiator system that includes a vinylbenzylamine and an alkyl lithium reagent (e.g., sec-butyl lithium, n-butyl lithium, or tert-butyl lithium) or an alkali naphthalenide (e.g., sodium, potassium, or lithium napthalenide). The initiator system can further include a salt, such as a lithium salt (e.g., LiCl), which can be provided in a molar excess (e.g., a 2, 3, 4, 5, or more molar excess) compared to the moles of vinylbenzylamine. The salt can be used to coordinate to the nitrogen anion and carbanion to suppress unwanted side reactions during the polymerization. In some embodiments, a solution comprising the vinylbenzylamine and a solution comprising the alkyl lithium reagent are mixed with one other and then the salt and first monomer are added sequentially. The polymerization can be performed in a first solvent at a first temperature. The first solvent can be a aprotic organic solvent (e.g., an ether, such as THF) The first temperature can be below room temperature (e.g., below about 10° C., below about 5° C., below about 0° C., below about 20° C., or at about −78° C.). In some embodiments, the vinylbenzylamine is a N-alkyl-4-vinylbenzylamine or an N-aryl-4-vinylbenzylamine (e.g., N-phenyl-4-vinylbenzylamine). In some embodiments, the N-alkyl-4-vinylbenzylamine is the alkyl amine formed by reacting a 4-vinylbenzylhalide (e.g., 4-vinylbenzylchloride) or 4-vinylbenzaldehyde with an alkylamine (e.g., a molar excess of an alkylamine). In some embodiments, the alkylamine comprises a bulky (e.g., branched) alkyl group, such as isopropyl, tert-butyl, isopentyl, etc. In some embodiments, the vinylbenzylamine is N-isopropyl-4-vinylbenzylamine (PVBA). See FIG. 1A.

In some embodiments, the anionic polymerization takes about 60 minutes or less. In some embodiments, the vinylbenzylamine, the alkyl lithium reagent, and optionally the lithium salt can be contacted with one another at low temperature (e.g., less than about 0° C., less than about −20° C., or about −78° C.), but the mixture can be warmed (e.g., to about 0° C. or higher or to about room temperature) prior to, during, or after the addition of the first monomer.

Alternatively, if a "centipede" copolymer is desired, a "double-tailed" macromonomer can be provided in place of the "single-tailed" macromonomer described above in step (a). Thus, for example, in some embodiments, the macromonomer provided in step (a) can have a structure of the formula:

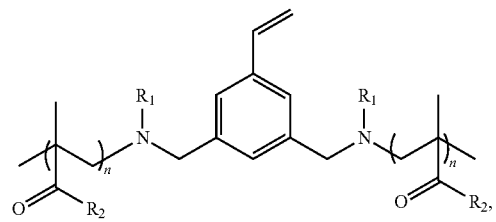

wherein:
n is an integer of about 10 or greater;
$R_1$ is selected from the group comprising alkyl, optionally $C_1$-$C_6$ alkyl, aralkyl, and aryl, optionally phenyl; and
each $R_2$ is independently alkoxy, aralkoxy, aryloxy, or cycloalkoxy.

The "double-tailed" macromonomer can be provided via anionic polymerization of a first monomer in the presence of an initiator system that includes a bis(aminomethyl)styrene and an alkyl lithium reagent (e.g., sec-butyl lithium, n-butyl lithium, or tert-butyl lithium) or an alkali naphthalenide (e.g., sodium, potassium or lithium naphthalenide). The initiator system can further include a salt, such as a lithium salt (e.g., LiCl), which can be provided in a molar excess (e.g., a 2, 3, 4, 5, or more molar excess) compared to the moles amine group in the bis(aminomethyl)styrene). In some embodiments, a solution comprising the bis(aminomethyl)styrene and a solution comprising an alkyl lithium reagent or alkali naphthalenide are mixed with one other and then the salt and first monomer are added sequentially. As described above for the preparation of the "single-tailed" macromonomer polymerization can be performed in a first solvent at a first temperature. The first solvent can be a aprotic organic solvent (e.g., an ether, such as THF) The first temperature can be below room temperature (e.g., below about 10° C., below about 5° C., below about 0° C., below about 20° C., or at about −78° C.). In some embodiments, the bis(aminomethyl)styrene is a bis-((N-alkyl) aminomethyl)styrene or a bis-((N-aryl)aminomethyl)styrene). In some embodiments, the bis(aminomethyl)styrene is a bis-((N-isopropyl)aminomethyl)styrene.

Figure 1C:
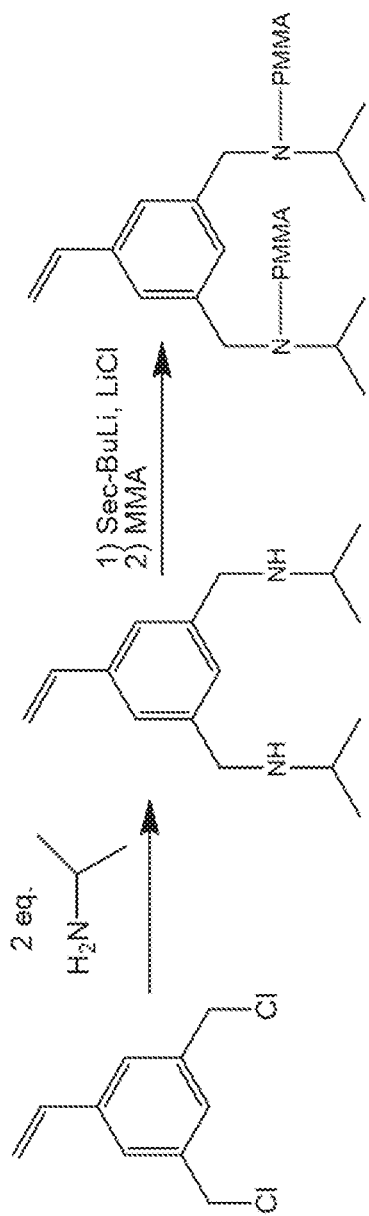
FIG. 1C is a schematic drawing showing the synthesis of an exemplary double-tailed poly(methyl methacrylate) (PMMA) macromonomer using a diamine as a polymerization initiator.
Figure 1D:
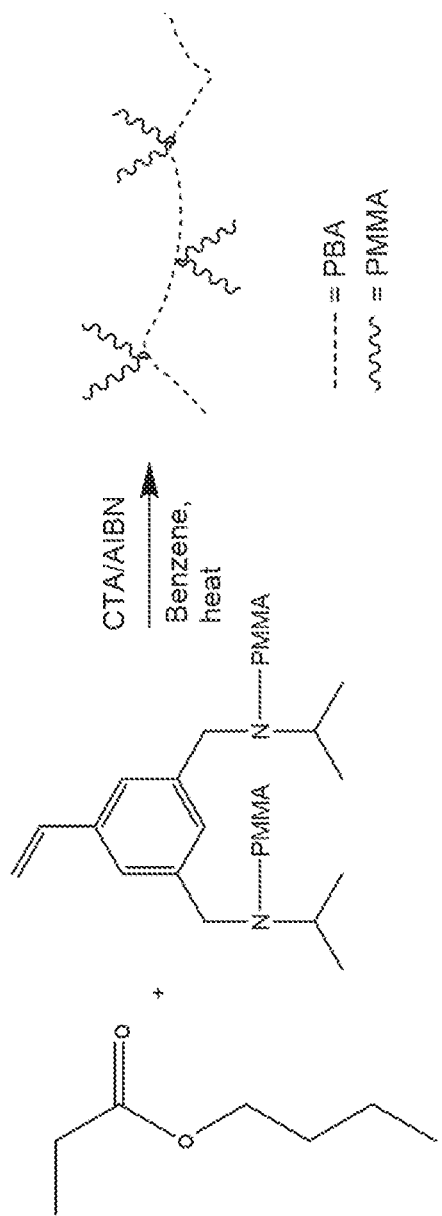
FIG. 1D is a schematic drawing showing the synthesis of an exemplary random multigraft copolymer of n-butyl acrylate (BA) and methyl methacrylate via the copolymerization of BA and the double-tailed poly(methyl methacrylate) (PMMA) macromonomer described in FIG. 1C using a chain transfer agent (CTA) and 2,2-azobis-(isobutyronitrile) (AIBN) as a radical initiator. The resulting poly(n-butyl acrylate)-graft-poly(methyl methacrylate) (PBA-g-PMMA) has a "centipede" architecture.

In some embodiments, the bis-((N-alkyl)aminomethyl) styrene is formed by reacting a bis(halomethyl)styrene (e.g., 3,5-dichloromethyl)styrene with at least 2 molar equivalents of an alkylamine. See FIG. 1C. In some embodiments, the alkylamine comprises a branched alkyl group, such as isopropyl, tert-butyl, isopentyl, etc. Bis(halomethyl)styrenes are commercially available and methods of preparing bis (halomethyl)styrenes have been previously described in the literature. See Loykulnant et al. (2001) Macromolecular Chemistry and Physics, 202(9), 1791-1798. FIG. 1D shows the synthesis of a centipede PBA-g-PMMA copolymer via the RAFT copolymerization of BA and a double-tailed PMMA macromonomer using a CTA and AIBN as a radical initiator.

Figure 1E:
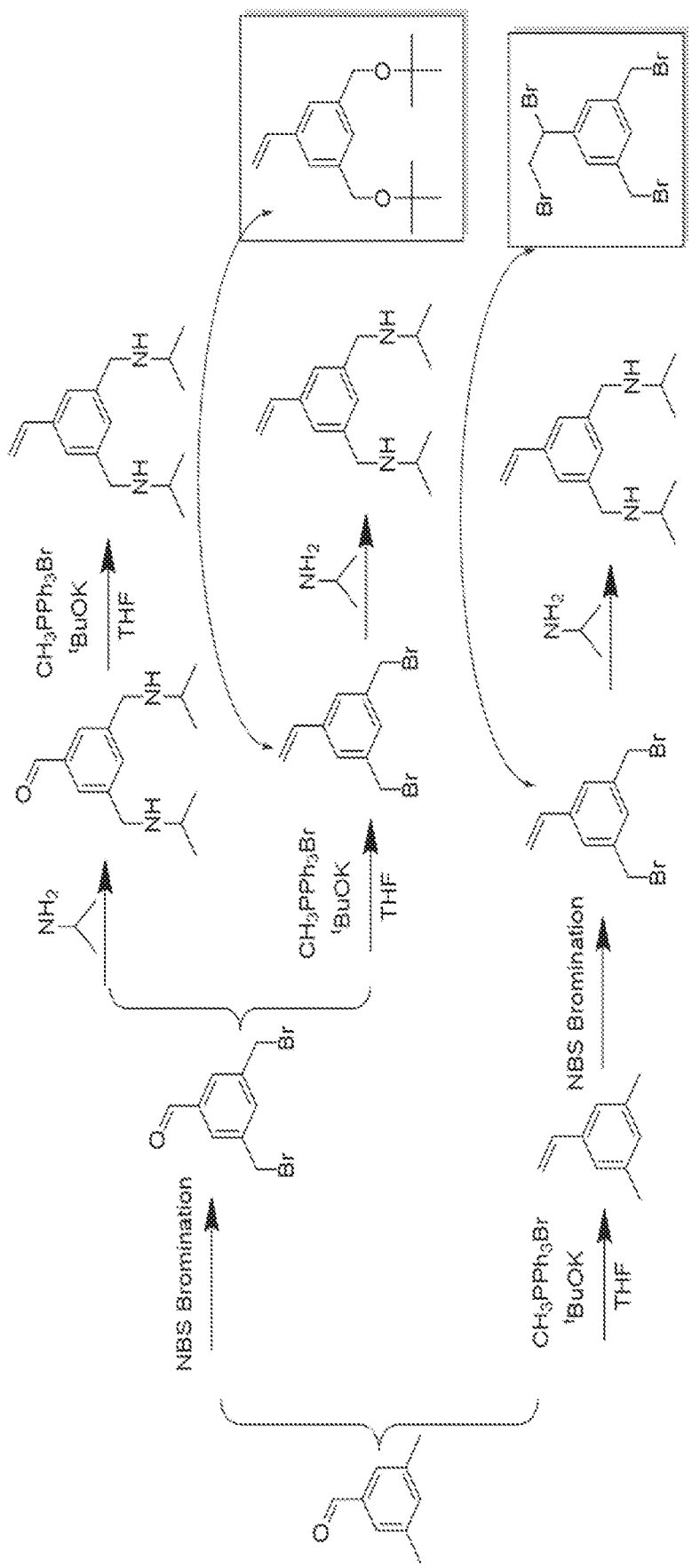
FIG. 1E is a schematic drawing showing three possible three-step routes for the chemical synthesis of an exemplary styrenic diamine for use in preparing an initiator for a double-tailed acrylic macromonomer of the presently disclosed subject matter. All three routes use 3,5-dimethylbenzaldehyde as the starting material. The molecules in the boxes to the right of the middle and bottom routes show possible side-products that can be formed during the second steps of the middle and bottom routes.

Suitable methods of preparing bis-((N-alkyl)aminomethyl) styrenes are also described in FIG. 1E. For example, FIG. 1E shows the three approaches for the synthesis of bis-((N-isopropyl)aminomethyl)styrene starting from 3,5-dimethylbenzaldehyde. In the top route, the methyl groups are first brominated using N-bromosuccinimide (NBS). Then, the dihalide is reacted with isopropylamine to form the diamine and the aldehyde is transformed into an alkene via a Grignard reaction using methyltriphenylphosphonium bromide ($CH_3PPh_3Br$) and potassium tert-butoxide (tBuO⁻ K⁺). The order of the steps can be changed, but can lead to undesirable side-reactions. For instance, bromination in the presence of a vinyl group can result in bromination of the vinyl group as well as of the methyl groups (see bottom of FIG. 1E). Also, performing the Grignard reaction in the presence of the benzylic halide (see middle of FIG. 1E) can result in the displacement of the halide groups and the formation of ethers.

Figure 1F:
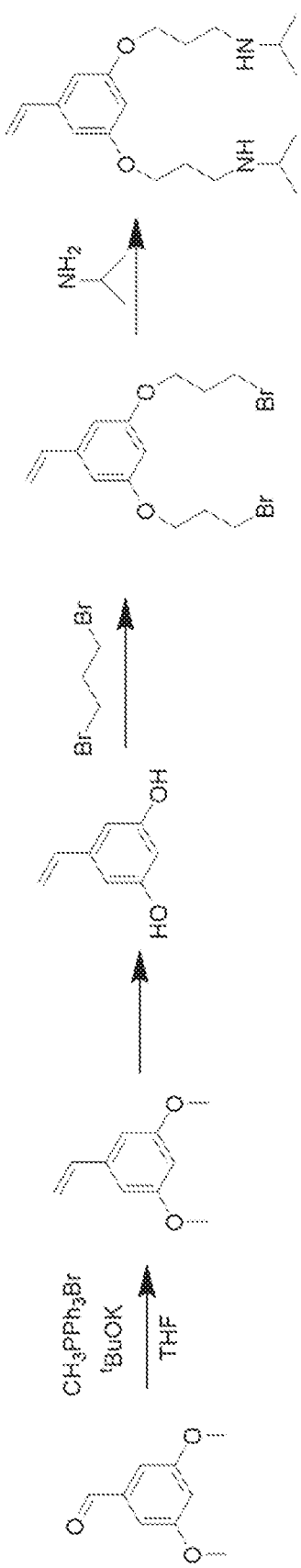
FIG. 1F is a schematic drawing showing a route for the chemical synthesis of an alternative styrenic diamine for use in preparing an initiator for a double-tailed acrylic macromonomer of the presently disclosed subject matter. The route uses 3,5-dimethoxybenzaldehyde as the starting material.

FIG. 1F shows the synthesis of a double-tailed macromonomer wherein the alkylamines are attached to the styrene group via oxyalkylene groups. Starting with the commercially available 3,5-dimethoxybenzaldehyde, the aldehyde can first be transformed to an alkene via a Grignard reaction. Then, the methyl ethers can be cleaved to form hydroxyl groups using a variety of reagents, e.g., iodotrimethylsilane, potassium thiophenoxide, sodium ethanethiolate, sodium sulfide, and others known in the art. The diphenol can then be reacted with two equivalents of a dihaloalkane (e.g., 1,3-dibromopropane) and the resulting dihalide reacted with two equivalents of an amine (e.g., isopropylamine).

Figure 1G:
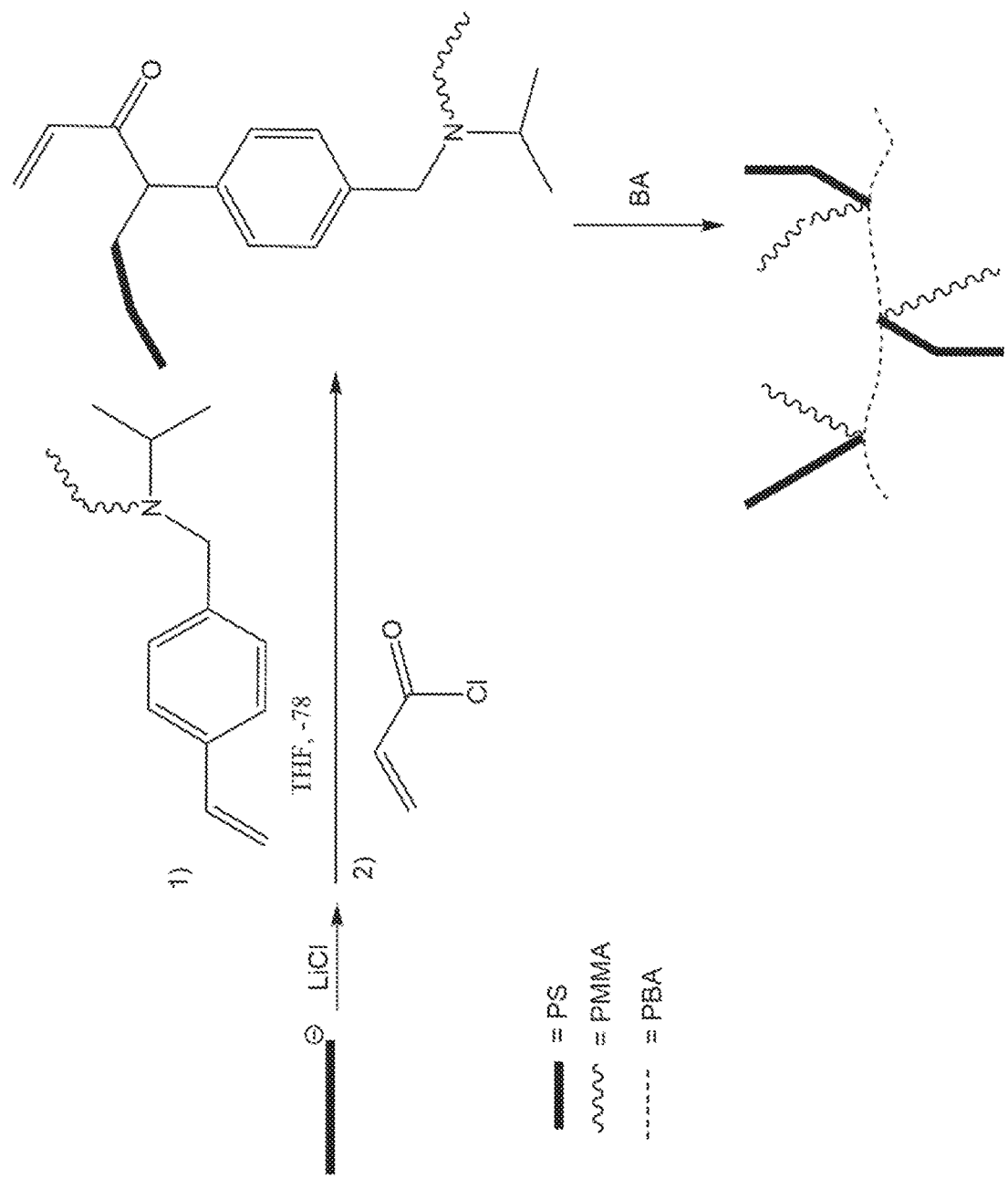
FIG. 1G is a schematic drawing showing the synthesis of an exemplary hybrid double-tailed macromonomer comprising both a polystyrene (PS) chain (solid heavy line) and a poly(methyl methacrylate) (PMMA) chain (wavy line) and the copolymerization of the macromonomer with n-butyl acrylate (BA) to form a multigraft copolymer comprising a poly(n-butyl acrylate) (PBA) main chain (dotted line) and PMMA and PS grafts.

Alternatively, in some embodiments, the double-tailed macromonomer can be a hybrid macromonomer, i.e., a macromonomer containing two different types of glassy polymeric chains. For example, the macromonomer can comprise one glassy polyacrylic chain and one glassy non-acrylic polymeric chain (e.g., a polystyrene (PS) chain). FIG. 1G shows the exemplary synthesis of a hybrid macromonomer of the presently disclosed subject matter and its use in copolymerization with n-butyl acrylate (BA). More particularly, as shown in FIG. 1G, a polystyrene chain with a living chain end can be prepared via anionic polymerization and then coupled to a single tailed macromonomer as described hereinabove comprising a glassy polyacrylic chain (e.g., PMMA) (e.g., in the presence of a lithium salt, such as lithium chloride). The resulting carbanion can be reacted with another vinyl-containing compound, such as acryloyl chloride to form a double-tailed macromonomer comprising both PMMA and PS chains. Then the macromonomer can be copolymerized with a n-alkyl acrylate (e.g., BA) to prepare a final multigraft copolymer comprising a PBA backbone/main chain and PMMA and PS graft chains.

Regardless of macromonomer structure (i.e., "single-tailed" or "double-tailed"), any suitable acrylate can be used as the first monomer. In some embodiments, the first monomer is an alkyl, aralkyl, aryl, or cycloalkyl ester of methacrylic acid. In some embodiments, the first monomer is selected from the group including, but not limited to, methyl methacrylate (MMA), ethyl methacrylate, a propyl methacrylate, a butyl methacrylate, isobornyl methacrylate, 1-adamantyl methacrylate, cyclohexyl methacrylate, menthyl methacrylate, phenyl methacrylate, naphthyl methacrylate, benzyl methacrylate, and trityl methacrylate. In some embodiments, the first monomer is selected from the group consisting of methyl methacrylate and tert-butyl methacrylate.

The copolymerizing can be performed via any suitable method, e.g., free radical polymerization or reversible addition fragmentation chain-transfer (RAFT) polymerization. In some embodiments, the copolymerizing is performed via RAFT polymerization. RAFT polymerization can be performed using a radical initiator and a chain transfer agent (CTA). The RAFT polymerization can be performed in any suitable aprotic organic solvent, such as an ether (e.g., THF), a aliphatic hydrocarbon (e.g., hexanes) or an aromatic solvent such as benzene, toluene, or xylene. In some embodiments, the RAFT polymerization is performed at a temperature above room temperature. In some embodiments, the temperature is at least about 40° C. In some embodiments, the temperature is about the reflux/boiling temperature of the solvent. In some embodiments, the temperature is between about 75° C. and about 80° C. In some embodiments, the RAFT polymerization reaction can take between about 10 hours and about 24 hours (e.g., 10, 12, 14, 16, 18, 20 22, or about 24 hours) depending upon the weight of the macromonomer and the reaction temperature.

Suitable radical initiators can include, for example, those of the peroxy and azo type. These include, but are not limited to, hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2,5-bis(hydroperoxy)hexane, perbenzoic acid, t-butyl peroxypivalate, t-butyl peracetate, dilauroyl peroxide, dicaproyl peroxide, distearoyl peroxide, dibenzoyl peroxide, diisopropyl peroxydicarbonate, dodecyl peroxydicarbonate, dieicosyl peroxydicarbonate, di-t-butyl perbenzoate, azobisisobutyronitrile (AIBN), 4,4'-azobis(4-cyano-1-pentanol) (AIBN-OH), 2,2'-azobis-2,4-dimethylvaleronitrile, ammonium persulfate, potassium persulfate, sodium persulfate and sodium perphosphate. In some embodiments, the radical initiator is AIBN.

A variety of CTAs are known in the art. Suitable CTAs include, but are not limited to, thiocarbonylthiocompounds, such as dithioesters, trithiocarbonates, and xanthanes. In some embodiments, the CTA is a trithiocarbonate. In some embodiments, the CTA is S-1-dodecyl-S"-($\alpha,\alpha'$-dimethyl-$\alpha'$acetic acid) trithiocarbonate.

In some embodiments, step (a) (i.e., providing the macromonomers) and step (b) (i.e., copolymerizing the macromonomer and the second monomer) can be performed in a single vessel, e.g., via sequential addition of the reagents and by varying the temperature between the two steps. Aliquots of the reaction mixture can be withdrawn and analyzed during the process, e.g., to determine the % completion of either step and/or the average molecular weight or the macromonomer. Alternatively, in some embodiments, the anionic polymerization is terminated via addition of an alcohol (e.g., methanol) and the macromonomer is isolated and optionally characterized prior to the second step.

In some embodiments, the method further comprises one or more post-copolymerization modification steps. For example, when the glassy side chains include esters that can be more easily hydrolyzed than any esters present in the backbone, the post-copolymerization modification steps can include hydrolyzing one or more ester bonds in the glassy side chains. The hydrolyzing can be performed via any suitable method, e.g., chemically or enzymatically. In some embodiments, the hydrolysis comprises acid-catalyzed hydrolysis or base-catalyzed hydrolysis. Acid catalyzed hydrolysis can be used to cleave esters in the glassy acrylic grafts to form carboxylic acid groups. Base-catalyzed hydrolysis (e.g., hydrolysis catalyzed using an alkali metal hydroxide, such as NaOH, KOH, or LiOH) can cleave esters in the glassy acrylic grafts to directly form carboxylate groups that are bonded to an alkali metal cation via an ionic bond.

In some embodiments, the presently disclosed method further comprises (c) collecting the copolymer formed in step (b); and (d) contacting the copolymer with an aqueous solution comprising a strong acid for a period of time, thereby providing a partially hydrolyzed copolymer. Hydrolysis of PtBMA segments by in a polybutadiene-PtBMA block copolymer using MsOH in a mixture of acetic acid and toluene are described, for example by Dubois et al. ((1997) Rubber Chemistry and Technology, 70, 714-726). In some embodiments, the strong acid is HCl. The concentration of the acid and/or the length of time the copolymer is contacted with the acid can be varied to vary the amount of hydrolysis. In some embodiments, the strong acid is HCl that is between about 3 molar (M) and about 12 M (e.g., 3, 4, 5, 6, 7, 8, 9, 10, 11, or 12 M HCl). In some embodiments, the hydrolysis can be performed for between about 1.5 hours and about 6 hours (e.g., about 1.5, 2, 2.5, 3, 3.5, 4, 4.5, 5, 5.5, or about 6 hours). The more concentrated the acid and/or the longer the hydrolysis is allowed to continue, the higher the degree of hydrolysis in the grafts.

In some embodiments, the method further comprises: (e) contacting the partially hydrolyzed copolymer with a solution (e.g., an aqueous) comprising an alkali metal hydroxide or a metal coordination complex to form a graft copolymer comprising one or more alkali metal salt groups or one or more metal coordination complexes. Suitable conditions for forming ionic bonds or metal bonds in a polymer comprising carboxylic acid side chains have been previously described. See Tobolsky et al. (1968) Macromolecules, 1(6), 515-519. In some embodiments, the alkali metal hydroxide is selected from NaOH, KOH, and LiOH. In some embodiments, the alkali metal hydroxide is NaOH. In some embodiments, the metal coordination complex comprises an alkali earth metal (e.g., Ca) or a transition metal (e.g., Zn). In some embodiments, the metal coordination complex comprises a metal and one or more halo, hydroxyl or alkoxy metal ligands. In some embodiments, the metal coordination complex is a metal oxide. In some embodiments, the metal coordination complex is a metal halide. In some embodiments, the metal coordination complex is a zinc dihalide. In some embodiments, the zinc dihalide is $ZnCl_2$.

IV. Morphology and Mechanical Properties

Variations in the molecular architecture of graft copolymers can be manipulated to control their nano-scale structure (morphology) and their ability to form long-range order during self-assembly. To provide a desired performance, the size, shape and symmetry, and overall volume fraction of different types of domains can be controlled independently. This independent control is not possible with conventional linear AB diblock copolymers and ABA triblock copolymers for which the nanophase separated morphology which forms (e.g., spheres, cylinders, cubic bicontinuous gyroid, or lamella) is tied directly to the relative volume fractions of the two block materials. Previous characterization data on complex graft copolymer architectures with multiple grafting points has been fit into the framework of a theoretical morphology diagram calculated by Milner, S. T., *Macromolecules*, 27, 2333 (1994). Morphological characterization of the multigraft copolymers can utilize real-space, transmission electron microscope (TEM) imaging and reciprocal-space small angle scattering (SAXS and/or SANS) techniques.

Other things being equal (e.g., "glassy" polymer volume fraction and average number of grafts per molecule), in some embodiments of the presently disclosed subject matter, increasing junction point functionality increases material strength and elasticity. Additionally, for a fixed glassy polymer volume fraction and junction point functionality, in some embodiments of the presently disclosed subject matter, increasing the number of junction points per copolymer increases the strength, stress at break, and/or elasticity. In some embodiments, increasing the molecular weight of the copolymer can increase material strength and/or elasticity. In some embodiments, increasing the purity of the macromonomer (e.g., by eliminating or substantially eliminating unfunctionalized polymeric chains) can increase the material strength and/or elasticity. In a representative comparison, the copolymers of the presently disclosed subject matter can compared to the strength, elasticity and stress at break performance of commercial thermoplastic elastomers, such as KRATON™ and STYROFLEX™ materials (Kraton Polymers, Houston, Tex., United States of America and BASF, Ludwigshafen, Germany, respectively) or all acrylic block copolymers such as PMMA-PBA-PMMA triblock copolymers via tensile tests that utilize a scaled down ASTM standard "dog bone."

If desired, in addition to tensile tests at room temperature, tensile performance at elevated temperatures can be evaluated, to determine material properties under conditions of any particular proposed use. Dynamical mechanical, creep, and fatigue performance of these materials at room and elevated temperatures can also be evaluated. Thermogravimetric analysis (TGA) can be used to investigate the chemical stability of the materials at elevated temperatures.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

General Materials and Methods

Isopropylamine (99%, Acros Organics, Thermo Fisher Scientific, Waltham, Mass., United States of America), 4-vinylbenzylchloride (90%, Acros Organics, Thermo Fisher Scientific, Waltham, Mass., United States of America), sec-butyllithium (sec-BuLi), 1,1-diphenyl ethylene (DPE, 98%, Acros Organics, Thermo Fisher Scientific, Waltham, Mass., United States of America), tetrahydrofuran (THF) (GR grade, Fisher, Thermo Fisher Scientific, United States of America), and methanol (GR grade, Fisher, Thermo Fisher Scientific, United States of America) were prepared and purified as previously described. See Uhrig and Mays (2005) J. Polym. Sci., Part A: Poly, Chem., 43, 6179-6222. LiCl (99.995%, Alfa Aesar, Thermo Fisher Scientific, Waltham, Mass., United States of America) was dried at 130° C. for 2 days and ampulized under high vacuum conditions. Methyl methacrylate (99%, MMA, Aldrich, Milwaukee, Wis., United States of America) was passed through an aluminum oxide (basic, Acros Organics, Thermo Fisher Scientific, Waltham, Mass., United States of America) column to remove inhibitor, stirred for 24 hours over anhydrous $CaH_2$, and trioctylaluminum sequentially under reduced pressure. The resulting MMA was ampulized and diluted immediately with THF under high vacuum conditions, giving a concentration of 0.8-0.9 mmol/ml. All ampules of the reactants were equipped with break seals and stored at −30° C.

N-butyl acrylate (BA, 99%, Acros Organics, Thermo Fisher Scientific, Waltham, Mass., United States of America) was used directly after passing through an aluminum oxide (basic, Acros Organics, Thermo Fisher Scientific, Waltham, Mass., United States of America) column to remove the inhibitor. 2,2-Azobis-(isobutyronitrile) (AIBN, 90%, Sigma-Aldrich, St. Louis, Mo., United States of America), was recrystallized from methanol before use and the S-1-dodecyl-S'-(α,α'-dimethyl-α'-acetic acid) trithiocarbonate chain transfer agent (CTA) was synthesized following a previously published procedure. See Lai et al. (2002) Macromolecules, 35, 6754-6756. Benzene (≥99.9%, Aldrich, Milwaukee, Wis., United States of America), sodium hydroxide (NaOH, 98%, Acros Organics, Thermo Fisher Scientific, Waltham, Mass., United States of America), magnesium sulfate ($MgSO_4$, 99.5%, Aldrich, Milwaukee, Wis., United States of America), and sodium chloride (NaCl, 99.5%, Acros Organics, Thermo Fisher Scientific, Waltham, Mass., United States of America) were used as received.

Example 1

Synthesis of N-isopropyl-4-vinylbenzylamine (PVBA)

PVBA was synthesized following a previously reported procedure. See Seki et al. (2004) Tetrahedron, 60, 5001. Briefly, the reaction was carried out under a nitrogen atmosphere. A 250 milliliter (ml) round bottom flask with 4-vinylbenzyl chloride (10 g, 65.5 millimoles (mmol)) was cooled to 0° C. in an ice bath. Isopropylamine (15.5 g, 262.2 mol) was added to the flask. The reaction solution was raised to room temperature and left stirring for 24 hours. After the reaction was complete, the solution was diluted with dichloromethane and extracted with a saturated NaOH aqueous solution and deionized water (DIO) sequentially. The combined organic layer was dried over anhydrous $MgSO_4$, evaporated, and purified using a flash column with hexane as the eluant. Light orange oil-like liquid was obtained after the evaporation of hexane. The resulting product was obtained with a yield of 73%. $^1H$ NMR spectra ($CDCl_3$, 500 MHz), δ (ppm): 7.31 and 7.37 (d, 4H—Ar), 6.74 (dd, 1H, C=CH—Ar), 5.72 and 5.24 (dd, 2H, $CH_2$=C—Ar), 3.76 (s, 2H, N—$CH_2$—Ar), 2.83 (sept, 1H, N—CH—$C_2$), 1.09 (d, 6H, $CH_3$—C—N).

For anionic polymerization, PVBA was further stirred over $CaH_2$ overnight, and distilled into an ampoule equipped with a break-seal under high vacuum conditions. The purified colorless liquid was diluted with anhydrous THF. The solutions (0.5 mmol/ml and 0.05 mmol/ml) were stored at −30° C.

Example 2

Homopolymerization of PMMA Macromonomer

All anionic polymerizations were carried out under high-vacuum conditions ($10^{-6}$ mmHg) in a glass apparatus equipped with break-seals. The polymerization was performed in THF at −78° C. The initiation system was prepared by the anion exchange reaction between sec-BuLi and PVBA at −78° C. for 30 minutes. LiCl and MMA were introduced sequentially via break-seals. Polymerization was performed for 1 hour and terminated with degassed methanol at −78° C. The product was poured into a large excess of hexane with vigorous stirring. The precipitated polymer was filtered and vacuum-dried overnight. The resulting polymer was characterized by size exclusion chromatography (SEC). The intact vinyl group was confirmed via $^1H$ NMR spectroscopy.

Example 3

Synthesis of PBA-g-PMMA Graft Copolymers

All the PBA-g-PMMA graft copolymers were polymerized through reversible addition-fragmentation chain transfer (RAFT) polymerization under high-vacuum conditions ($10^{-6}$ mmHg) in a glass apparatus. PMMA macromonomer, CTA, and AIBN were mixed and dissolved in a vial. The solution was transferred to a round bottom flask, which was degassed by three freeze-thaw-evacuate cycles. The flask was flame-sealed under vacuum and immersed in an oil bath at 80° C. for a period of time depending upon the target molecular weight. The polymerization was quenched with liquid nitrogen. The product solution was precipitated in a large excess of methanol with vigorous stirring and vacuum dried overnight. The resulting polymer was characterized by SEC. The ratio of PMMA to PBA was investigated by $^1H$ NMR.

Example 4

Characterization of PBA-g-PMMA Graft Copolymers

Chemical and Thermal Property Characterization: The molecular weights (MWs) of the polymers were characterized by SEC in THF at 40° C. with a flow rate of 1.0 ml/min using a Polymer Laboratories PL-120 SEC system (Polymer Laboratories, Varian, Inc., Amherst, Mass., United States of America) equipped with four detectors including a Polymer Laboratories refractometer (Polymer Laboratories, Varian, Inc., Amherst, Mass., United States of America), a Precision Detector PD 2040 2-angle static light scattering detector (Precision Detectors, Inc., Bellingham, Mass., United States of America), a Precision Detector PD2000DLS 2-angle light scattering detector (Precision Detectors, Inc., Bellingham, Mass., United States of America), and a Viscotek 220 differential viscometer (Malvern Panalytical, Malvern, United Kingdom). The column set employed included a Polymer Laboratories PLgel, 7.5×300 mm; 10 µm; 500, $1×10^4$, $1×10^6$; and $1×10^7$ Å (Polymer Laboratories, Varian, Inc., Amherst, Mass., United States of America). The $^1H$ NMR spectra were measured with a Varian VNMR 500 MHz spectrometer (Varian Inc., Palo Alto, Calif.), using $CDCl_3$ as the solvent. Chemical shifts were referred to the $CDCl_3$ at 7.26 ppm. Thermal properties were characterized by differential scanning calorimetry (DSC, TA2000, TA Instruments, New Castle, Del., United States of America) under nitrogen with a heating rate of 10° C./min.

Phase Separation Behavior Characterization: Morphological measurements were performed using atomic force microscopy (AFM) and small-angle X-ray scattering (SAXS). To prepare samples for AFM measurement, a solution of 50 milligrams (mg) of polymer in 1.0 ml of toluene was stirred overnight at room temperature. Silicon wafers were cleaned by soaking in deionized water, acetone, and isopropanol for one hour in each solvent. Then, the polymer solution was spin-cast on the silicon wafer (1500 rpm for 30 seconds and 300 rpm for another 30 seconds). The resulting thin films were dried and annealed at 160° C. for 7 days prior to the measurement. AFM images were collected using Asylum Research MFP3D with a multimode controller (Oxford Instruments Asylum Research, Inc., Santa Barbara, Calif., United States of America) at room temperature in tapping mode with an A1 reflex coated Si tip (radius 9±2 mm) at a line scanning frequency of 1 Hz.

Samples for SAXS were prepared as follows: a solution of 50 mg of polymer in 1 ml of toluene was stirred overnight at room temperature and cast into a 1 mL PTFE Griffin beaker and evaporated slowly over 7 days, resulting in a film with the thicknesses of around 0.5 mm. All dried samples were annealed at 160° C. for 7 days under vacuum ($10^{-6}$ mmHg) before measurements. SAXS/WAXS experiments were conducted at 12-ID-B at the Advanced Photon Source at Argonne National Laboratory. X-rays of wavelength $\lambda=0.89$ Å were used, and each measurement was performed at two different sample-to-detector distances to cover a q-range of $0.0026<q<4.4$ Å-1, where $q=(4\pi/\lambda) \sin(\theta/2)$ is the magnitude of the scattering vector, and $\theta$ is the scattering angle.

Measurements of the Mechanical Properties: The characterization of mechanical properties of the polymers included dynamic mechanical analysis (DMA) and uniaxial tensile tests. The samples tested were prepared as follows: A solution of 2.0 g of polymer in 20 ml of toluene was stirred overnight at room temperature and cast into a 25 ml PTFE evaporating dish and evaporated slowly over 7 days, resulting in a film with the thickness of around 0.5 mm. Then, the samples were dried for 2 days in a vacuum oven at around 50° C. The resulting films were cut into uniform dog-bone shaped specimens (ISO 37-4).

Dynamic mechanical analysis was performed on a TA Instruments Q-800 dynamic mechanical analyzer (TA Instruments, New Castle, Del., United States of America) equipped with a single cantilever clamp. The temperature ramp/frequency sweep experiments were run at 1 Hz over a temperature range of −60 to +140° C. Uniaxial tensile tests were carried out using an Instron 4465 test machine (Instron, Norwood, Mass., United States of America) with a cross-head velocity of 50 mm/min. For each polymer sample, three identical specimens were tested.

Evaluation of the Linear Viscoelastic Properties: Small amplitude oxcillatory shear measurements of the branched copolymers were performed on a Hybrid Rheometer 2 (TA Instruments, New Castle, Del., United States of America) with 3 mm parallel plates in the temperature range of −45 to 150° C. The temperature was controlled by an Environmental Test Chamber with nitrogen as the gas source.

Example 5

Characterization of Examples 1-4

Through the initiation system of sec-BuLi/PVBA, the PMMA macromonomers were synthesized by anionic polymerization directly in one batch with no post-polymerization modification. See FIG. 1A. The final PBA-g-PMMA macromonomer was synthesized by RAFT polymerization. See FIG. 1B.

More particularly, PVBA was synthesized by the alkylation of isopropylamine by 4-vinylbenzyl chloride. The anionic polymerization was performed by the sequential addition of PVBA, sec-BuLi, LiCl, and MMA monomer, and terminated with degassed methanol. The mixing of PVBA and sec-BuLi lead to the formation of greenish yellow color, which changed to light orange color after the reaction had proceeded for 30 minutes. Otherwise, when PVBA was added to the sec-BuLi solution, a deep orange color was observed due to the attack of extra sec-BuLi to the vinyl group of PBVA. The initiator solution is stable at elevated temperature and was left at room temperature for around 10 minutes for the removal of possible remaining sec-BuLi by its reaction with THF at room temperature. A large excess of LiCl was added to the initiation solution before the addition of MMA at −78° C. to coordinate with the nitrogen anion and suppress backbiting reactions during polymerization. The color change from light orange to a blue color indicated the formation of a complex between the LiCl salt and the nitrogen anion. The solution became colorless once MMA was added, which was the typical phenomenon for living polymethacrylates. The intact vinyl group of the resulting macromonomer was confirmed by the $^1$H NMR spectra, with chemical shifts at 6.7, 5.8, and 5.2 ppm. Detailed polymerization conditions and molecular weight information is shown in Table 1, below. The number-average molecular weight of the resulting macromonomers was always higher than the calculated values. Without being bound to any one theory, this is believed to be due to trace amounts of impurities in the PVBA ampules, since it was distilled only once over $CaH_2$ during the ampulization. However, all the polymers synthesized had a quantitative yield and exhibited very narrow PDI, which indicated the typical characteristics of anionic polymerization.

TABLE 1

Synthesis of PMMA Macromonomer by Living Anionic Polymerization.[a]

| Sample ID | Sec-BuLi (mmol) | PVBA (mmol) | LiCl (mmol) | MMA (mmol) | Time (min) | Calcd $M_n$[c] (kg/mol) | Obsd $M_n$ (kg/mol) | Mw/$M_n$[b] |
|---|---|---|---|---|---|---|---|---|
| PMMA-8 | 0.92 | 1.50 | 10.20 | 30.3 | 60 | 3.3 | 8.4 | 1.04 |
| PMMA-18 | 0.80 | 1.00 | 10.10 | 50.0 | 60 | 6.3 | 18.1 | 1.02 |
| PMMA-29 | 0.12 | 0.2 | 0.1 | 25.0 | 60 | 20.8 | 29.3 | 1.01 |

[a]All polymerization showed quantitative yields.
[B]Number-average molecular weight $M_n$ and PDI were measured in THF at 40° C. via SEC.
[c]$M_n$(calcd) = [MMA]/[sec-BuLi] × MW(MMA) × yield of polymerization (%).

Figure 2:
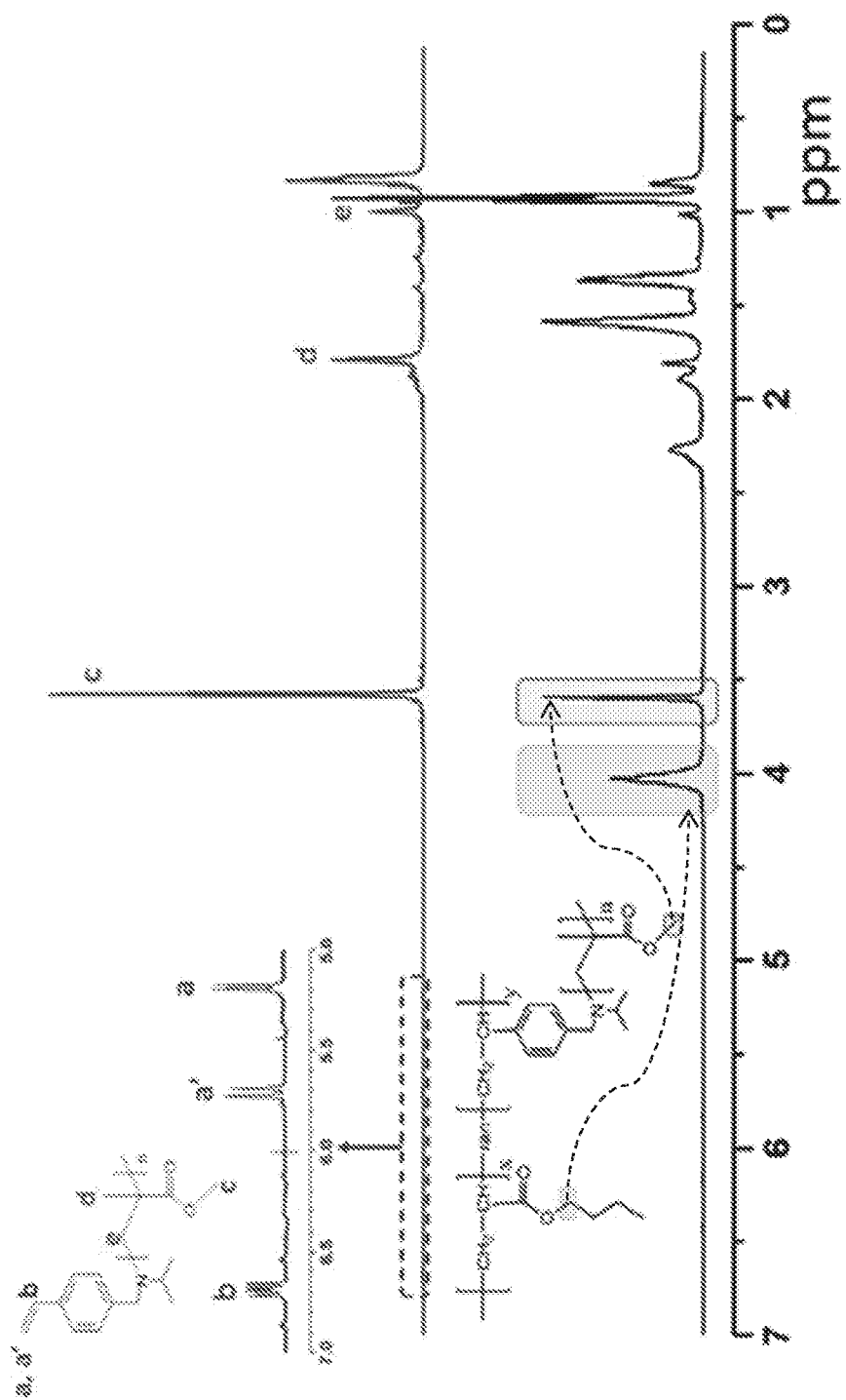
FIG. 2 is a graph showing the proton nuclear magnetic resonance ($^1$H NMR) spectra of (top) the poly(methyl methacrylate) (PMMA) macromonomer shown in FIG. 1A, and (bottom) the poly(n-butyl acrylate)-graft-poly(methyl methacrylate) (PBA-g-PMMA) copolymer described in FIG. 1B. In the spectrum of the PBA-g-PMMA copolymer, the shaded/boxed peak at about 4.0 parts per million (ppm) corresponds to the signal of the protons of the methylene group adjacent to the ester oxygen in the PBA, and the shaded/boxed peak at about 3.6 ppm corresponds to the signal of the protons of the methyl group adjacent to the ester oxygen in the PMMA.
Figure 3:
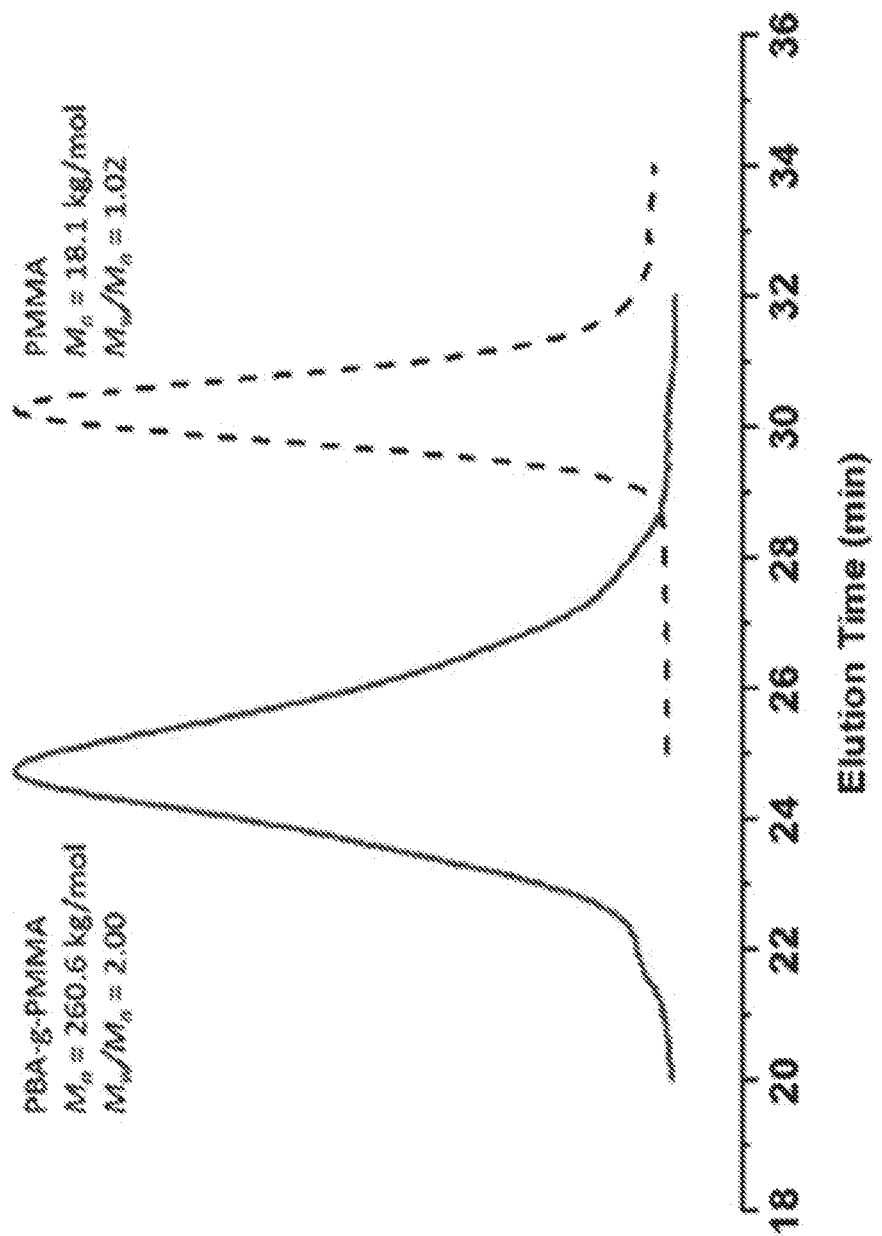
FIG. 3 is a graph showing a size exclusion chromatography (SEC) chromatograph of elution times (in minutes) of a typical poly(n-butyl acrylate)-graft-poly(methyl methacrylate) (PBA-g-PMMA) copolymer (solid line) and of a poly(methyl methacrylate) (PMMA) macromonomer (dashed line). The copolymer has a number-average molecular weight ($M_n$) of about 260.6 kilograms per mole (kg/mol) and a polydispersity index (PDI or $M_w/M_n$) of 2. The macromonomer has a $M_n$ of 18.1 kg/mol and a $M_w/M_n$ of 1.02.

The final PBA-g-PMMA graft copolymers were synthesized by RAFT polymerization of BA with the PMMA macromonomer. The composition of each graft copolymer was calculated based on the ratio of integrated areas between the peaks at around 3.6 ppm (—$OCH_3$ of PMMA) and 4.0 ppm (—O—$CH_2$— of PBA) in $^1$H NMR spectra. See FIG. 2. The typical SEC curves of PMMA macromonomer and resulting PBA-g-PMMA are shown in FIG. 3. Detailed molecular weight information and mechanical properties are described in Table 2 and Table 3, below.

TABLE 2

Characteristics of PBA-g-PMMA graft copolymers.

| Sample ID[a] | PMMA[b] $M_n$ (kg/mol) | PMMA[b] PDI | PBA-g-PMMA[b] $M_n$ (kg/mol) | PBA-g-PMMA[b] PDI | Conv. (%)[f] |
|---|---|---|---|---|---|
| MG-8.4-3.3-8.6 | 8.4 | 1.04 | 294.9 | 1.99 | 87.1 |
| MG-18.1-2.8-18.4 | 18.1 | 1.02 | 260.6 | 2.00 | 69.6 |
| MG-29.3-3.0-33.8 | 29.3 | 1.01 | 245.8 | 1.25 | 36.5 |
| MG-29.3-1.5-9.3 | 29.3 | 1.01 | 432.6 | 1.69 | 49.1 |

[a]Sample identification MG-$M_n$(PMMA)-number of branch points-vol % of PMMA.
[b]Number-average molecular weight ($M_n$) and PDI were measured in THF at 40° C. using the Polymer Laboratories PL-120 GPC system (Polymer Laboratories, Varian Inc., Amherst, Massachusetts, United States of America) with dn/dc estimated by weight % (PMMA) × 0.085 + weight % (PBA) × 0.067 where 0.085 ml/g is dn/dc for PMMA and 0.067 is the dn/dc for PBA, and the weight % of PMMA and PBA was obtained from $^1$H NMR spectra.
[f]Conversion % was calculated based on $M_n$(PBA-g-PMMA)-($M_n$(PMMA) × No.) × mol (CTA/m(BA).

TABLE 3

Further characteristics of PNA-g-PMMA graft copolymers.

| Sample ID[a] | Vol % of PMMA[c] | No.[d] | E[e] | σB[e] (MPa) | εB[e] (%) |
|---|---|---|---|---|---|
| MG-8.4-3.3-8.6 | 8.6 | 3.3 | 0.2 | 1.9 | 1881 |
| MG-18.1-2.8-18.4 | 18.4 | 2.8 | 1.3 | 4.3 | 856 |
| MG-29.3-3.0-33.8 | 33.8 | 3.0 | 21.9 | 10.8 | 497 |
| MG-29.3-1.5-9.3 | 9.3 | 1.5 | 0.2 | 2.0 | 1712 |

[a]Sample identification MG-$M_n$(PMMA)-number of branch points-vol % of PMMA.
[c]Vol % was calculated based on the density of 1.159 g/ml for PMMA and 1.080 g/ml for PBA.
[d]Number of branch points was calculated based on $M_n$(PBA-g-PMMA) × weight % (PMMA)/$M_n$(PMMA).
[e]Young's modulus (E), elongation at break ($ε_B$), and stress at break ($σ_B$) were characterized through uniaxial tensile tests.

RAFT copolymerizations incorporating high molecular weight (MW) macromonomers give higher polydispersity indices (PDIs) than conventional RAFT polymerization because each macromonomer incorporation has a significant effect on the overall molecular weight of that particular polymer chain. Thus, chains that incorporate fewer macromonomers will be much lower in MW than those chains that incorporated more macromonomers, broadening the PDI. See Goodwin et al. (2015) Ind. Eng. Chem. Res., 54, 9566-9576. The broad PDI can contribute to poor order distribution of the morphologies formed by microphase separation. However, a well-ordered morphology is not necessary to achieve superelasticity in multigraft TPEs. See Uhrig et al. (2011) Eur. Polym. J., 47, 560-568.

Figure 4A:
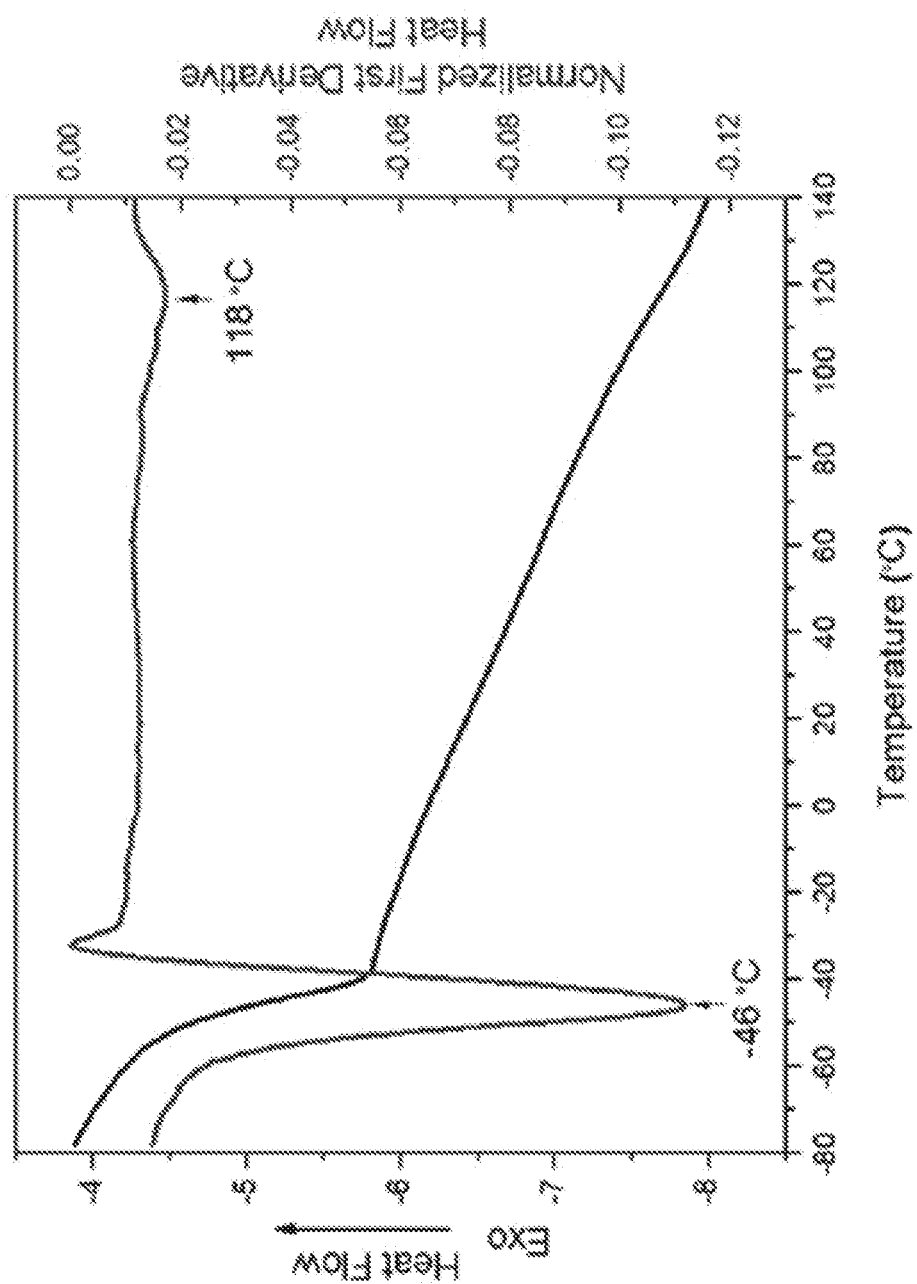
FIG. 4A is a graph showing the differential scanning calorimetry (DSC) thermograph of a poly(n-butyl acrylate)-graft-poly(methyl methacrylate) (PBA-g-PMMA) copolymer and its first derivative. The copolymer, designated MG-18.1-2.8-18.4, was prepared from a macromonomer with a number-average molecular weight ($M_n$) of 18.1 kilograms per mole (kg/mol). The copolymer has an average of 2.8 branch points per molecule and 18.4 volume percentage (vol %) of poly(methyl methacrylate) (PMMA). The arrows in the thermograph show glass transition temperatures ($T_g$s) at −46 degrees Celsius (° C.) and 118° C.
Figure 4B:
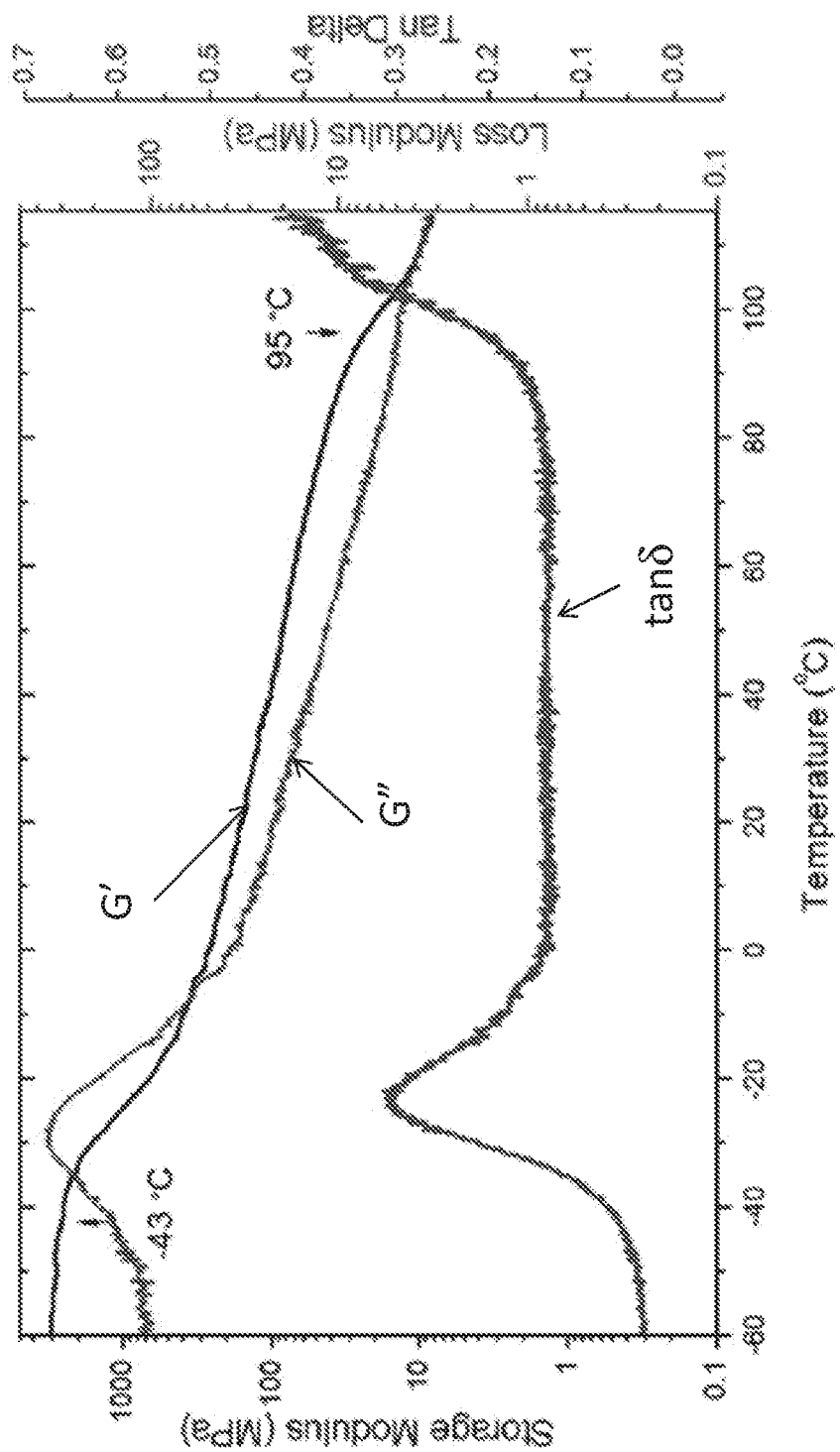
FIG. 4B is a graph showing the dynamic mechanical analysis (DMA) of the copolymer described in FIG. 4B. The graph includes data for the storage modulus (G'), loss modulus (G") and tan delta (δ). Two transitions corresponding to the two different acrylic domains (i.e. hard and soft) are observed as indicated by the arrows at −43 degrees Celsius (° C.) and 95° C. in the storage modulus.

The thermal incompatibility of PBA and PMMA can give rise to their microphase separation. In DSC of MG-18.1-2.8-18.4, both glass transition temperatures ($T_g$s) at −46° C. and 118° C. were observed (see FIG. 4A), which corresponded to those of PBA and PMMA, respectively. The two glass transitions were also observed in dynamic mechanical analysis (DMA). See FIG. 4B. A low temperature relaxation process is observed at −43° C., corresponding to the glass-to-rubber transition of the PBA phase as indicated by a stepwise decrease in storage modulus (G'(T)). Further heating led to another drop of G'(T) when the temperature approached 100° C., corresponding to the glass-to-rubber transition of the PMMA hard phase. The observations of typical $T_g$s of each domain and the two-step transitions provide circumstantial evidence of phase separation behavior in the multigraft copolymers.

Microphase separation behavior of the PBA-g-PMMA samples was further investigated using AFM and SAXS. In the case of AFM images, the bright regions of the phase image represent stiff domains (i.e., PMMA), due to the increase in the phase angle of the probe oscillation. The dark zones represent soft domains (i.e., PBA). Different morphologies were observed with different branch sizes and volume ratios of PMMA. With the increase in the chain length of PMMA, the microphase separation behavior was improved. Longer PMMA chains led to more entanglements between hard domains. Thus, a higher degree of phase separation can be achieved. SAXS profiles also exhibit distinctive peaks, reflecting the microphase separation behavior. The relatively broad PDIs are believed to contribute to poor long order distribution of the morphologies. However, the high molecular weight and presence of multiple branch points can also hinder the ability of the chains to reach equilibrium morphologies, thus, well-ordered morphology is compromised for graft copolymers, even with a well-controlled structure, having regular spacing and narrow PDIs. The relative positions of the SAXS peaks are in general agreement with the AFM images. For instance, the MG-29.3-3.0-33.8 copolymer exhibits peaks corresponding to hexagonal morphology, which is consistent with its phase image in AFM.

Figure 5:
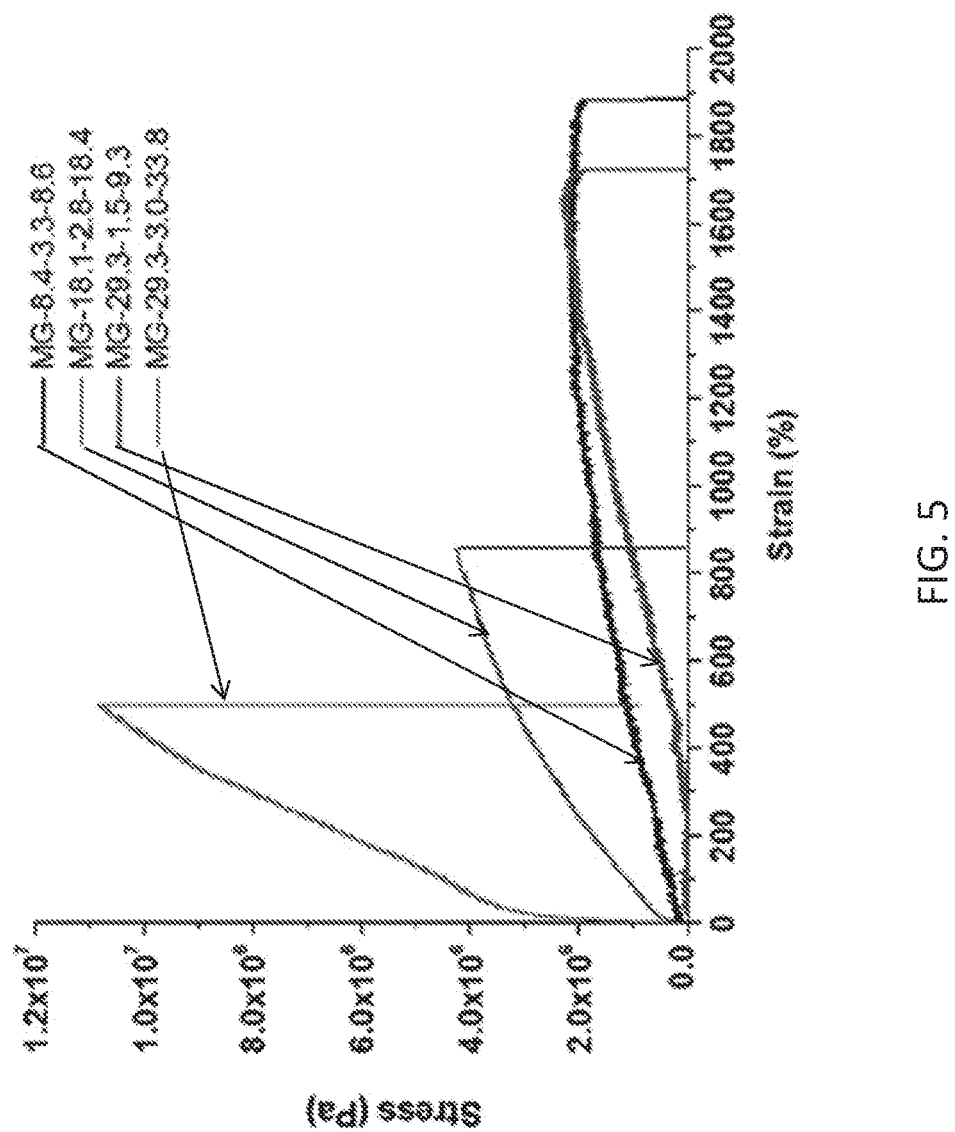
FIG. 5 is a graph showing the stress-strain curves of different poly(n-butyl acrylate)-graft-poly(methyl methacrylate) (PBA-g-PMMA) copolymer samples. Data is shown for a copolymer prepared from a macromonomer having a number-average molecular weight ($M_n$) of 8.4 kilograms per mole (kg/mol), an average of 3.3 branch points, and a 8.6 volume percentage (vol %) of poly(methyl methacrylate) (PMMA) (i.e., MG-8.4-3.3-8.6); a copolymer prepared from a macromonomer having a $M_n$ of 18.1, an average of 2.8 branch points, and 18.4 vol % PMMA (MG-18.1-2.8-18.4); a copolymer prepared from a macromonomer having a $M_n$ of 29.3 kg/mol, an average of 1.5 branch points, and 9.3 vol % of PMMA (MG-29.3-1.5-9.3); and a copolymer prepared from a macromonomer having a $M_n$ of 29.3 kg/mol, an average of 3.0 branch points, and 33.8 vol % PMMA (MG-29.3-3.0-33.8). Stress is measured in pascal (Pa) and strain in percentage (%).

As shown in FIG. 5, a typical stress versus strain curve reveals the mechanical properties of the acrylic multigraft copolymers. The volume fraction of the two components can affect the mechanical behavior of polyacrylate-based graft copolymers. See Goodwin et al. (2015) Industrial & Engineering Chemistry Research, 54, 9566-9576. Herein, the influence of the polymer molecular weight is demonstrated. Several results are found from uniaxial tensile tests on the materials, including that with an increase of the volume ratio of PMMA, the mechanical strength can be adjusted from 1.9 MPa (for about 10 vol % PMMA) to 10.8 MPa (for about 34 vol % PMMA). Increase in mechanical strength can compromise elongation. Interestingly, as compared to prior acrylate copolymers (see Goodwin et al. (2015) Industrial & Engineering Chemistry Research, 54, 9566-9576), MG-8.4-3.3-8.6 exhibits a higher stress at break and elongation at break as compared to previous materials with the same structure and similar molecular weight (MG-11.7-5.3-22.2 with εB around 450% and σB around 0.6 MPa) even through fewer branch points exist in the presently disclosed copolymers. The number of branch points has been previously described as an influence on mechanical performance. See Staudinger et al., in Mechanical Properties and Hysteresis Behavior of Multigraft Copolymers, Macromolecular symposia, Wiley Online Library, 2006, pp. 42-50. Without being bound to any one theory, the improvement in the properties of the presently disclosed copolymers is believed to be explained by the molecular weight between chain entanglements $M_e$. With $M_e$ (PBA) of 28 kg/mol, the increase in $M_n$ (PBA) brings more chain entanglements, which in turn helps increase the modulus. Typically, the $M_e$ difference between PBA and polyisoprene ($M_e$=6.1 kg/mol) or polybutadiene ($M_e$=1.7 kg/mol) leads to a poorer mechanical performance for polyacrylate TPEs compared to styrenic TPEs. However, surprisingly, the presently disclosed data shows that the combination of high molecular weight and multigraft architecture endows the presently disclosed copolymers with good elongation at break and tensile strength. All of the presently disclosed PBA-g-PMMA samples show better ultimate elongation than PMMA-b-PBA-PMMA triblock copolymers having a similar PMMA content. For example, MG-18.1-2.8-18.4 shows elongation at break of 856%, while similar triblock copolymers with about 22 vol % PMMA only exhibited an elongation at break of 545%. See Moineau et al. (1999) Macromolecules, 32, 8277-8282. Even with the vol % (PMMA) of 33.8%, the elongation at break of is still around 500%. The presently disclosed MG-29.3-1.5-9.3 exhibits stress of 2.0 MPa with strain at break of 1712%, which is far beyond the performance of commercial PMMA-b-PBA-b-PMMA triblock copolymers like Arkema's Nanostrength® (Arkema, Colombes, France) and with stress lower than 1 MPa and elongation only around 500%. See Boutillier et al. (2013) ASI Adhesives & Sealants Industry. Moreover, its elongation is even superior to that of commercial styrenic TPEs like Kraton® at 1080%, and comparable with the double tailed PI-g-PS multigraft copolymer superelastomers at around 1600%. See Zhu et al. (2006) Macromolecules, 39, 4428-4436. Thus, all acrylic superelastomers are produced by synthetic strategies reported herein.

Another aspect of presently disclosed superelastomers is their good elastic recovery. As previously reported, PI-g-PS with tetrafunctional branch points exhibits superior recovery with only 40% residual strain after being stretched to 1400% elongation. See Staudinger et al. in Mechanical Properties and Hysteresis Behavior of Multigraft Copolymers, Macromolecular symposia, Wiley Online Library, 2006, pp. 42-50. The hysteresis of the PBA-g-PMMA graft copolymer was examined by stretching of the dog-bone specimens. With the initial cross-head separation around 16 mm, the sample was stretched to 250 mm (1460% strain). The tension was released and the specimen was allowed to return to its original shape, with less than 2 mm residual strain (<15%). In another study, the specimen, with the initial cross-head separation of around 14 mm, was stretched to 1115% elongation twice. It was allowed to return to its original shape, with around 1 mm residual strain each time (7%). Thus, for the first time, elongational recovery behavior of all-acrylic TPEs is demonstrated. Due to the lack of previously reported data, a quantitative comparison with the corresponding ABA triblocks was not attempted. However, based on previous work with styrenic superelastomers, it is believed that the elastic recovery of all acrylic superelastomers can be far superior to that of all acrylic triblock copolymers. See Zhu et al. (2006) Macromolecules 39, 4428-4436; Staudinger et al. in Mechanical Properties and Hysteresis Behavior of Multigraft Copolymers, Macromolecular symposia, Wiley Online Library, 2006, pp. 42-50; and Boutillier et al. ASI Adhesives & Sealants Industry, 2013.

Figure 6A:
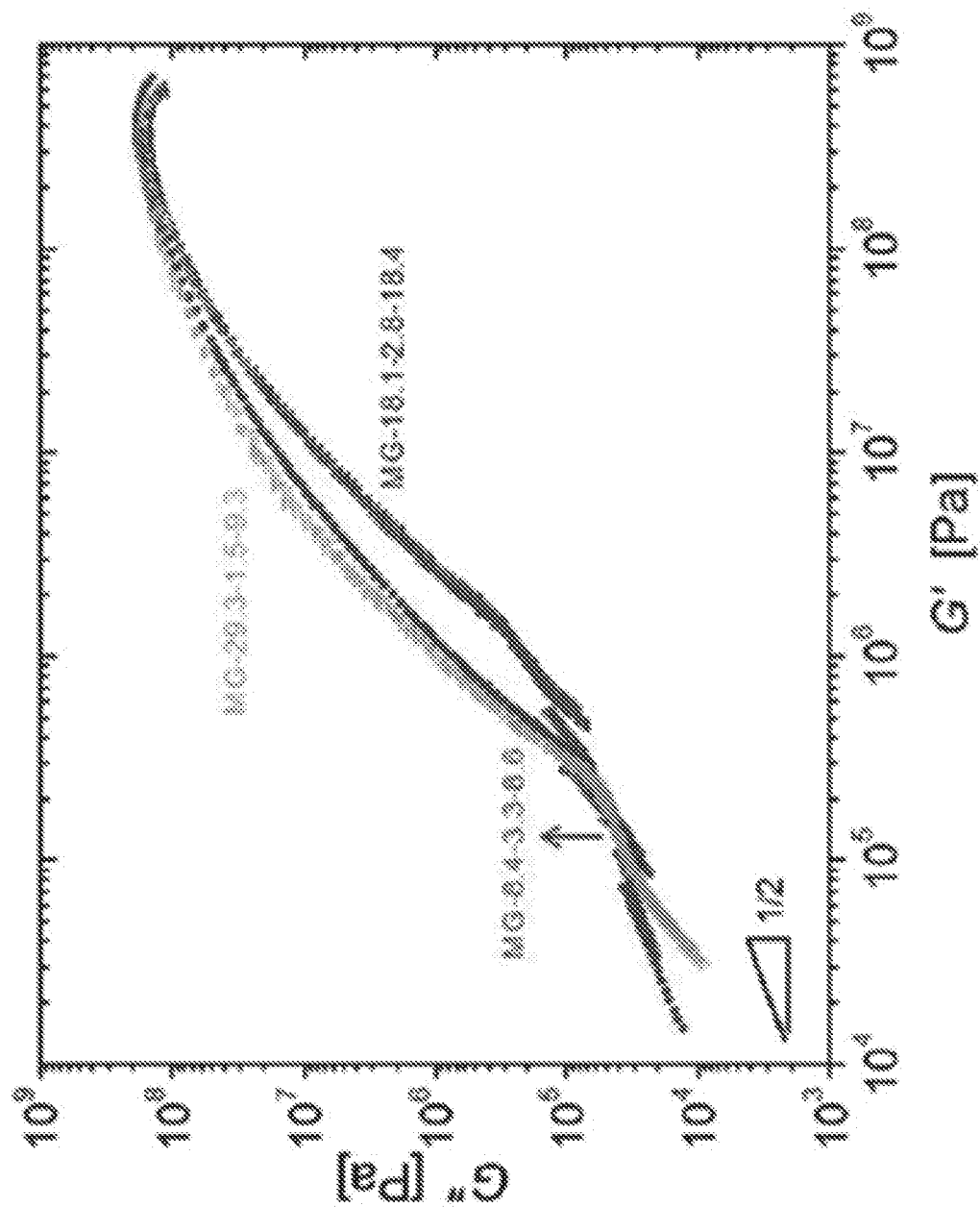
FIG. 6A is a graph showing the Cole-Cole plots of various poly(butyl acrylate)-graft-poly(methyl methacrylate) (PBA-g-PMMA) copolymer samples: a copolymer prepared from a macromonomer having a number-average molecular weight ($M_n$) of 8.4 kilograms per mole (kg/mol), an average of 3.3 branch points, and a 8.6 volume percentage (vol %) of poly(methyl methacrylate) (PMMA) (i.e., MG-8.4-3.3-8.6; upper dark data line); a copolymer prepared from a macromonomer having a $M_n$ of 18.1, an average of 2.8 branch points, and 18.4 vol % PMMA (MG-18.1-2.8-18.4, lower dark data line); and a copolymer prepared from a macromonomer having a $M_n$ of 29.3 kg/mol, an average of 1.5 branch points, and 9.3 vol % of PMMA (MG-29.3-1.5-9.3; lighter data line). The arrow represents the level of the plateau modulus.
Figure 6B:
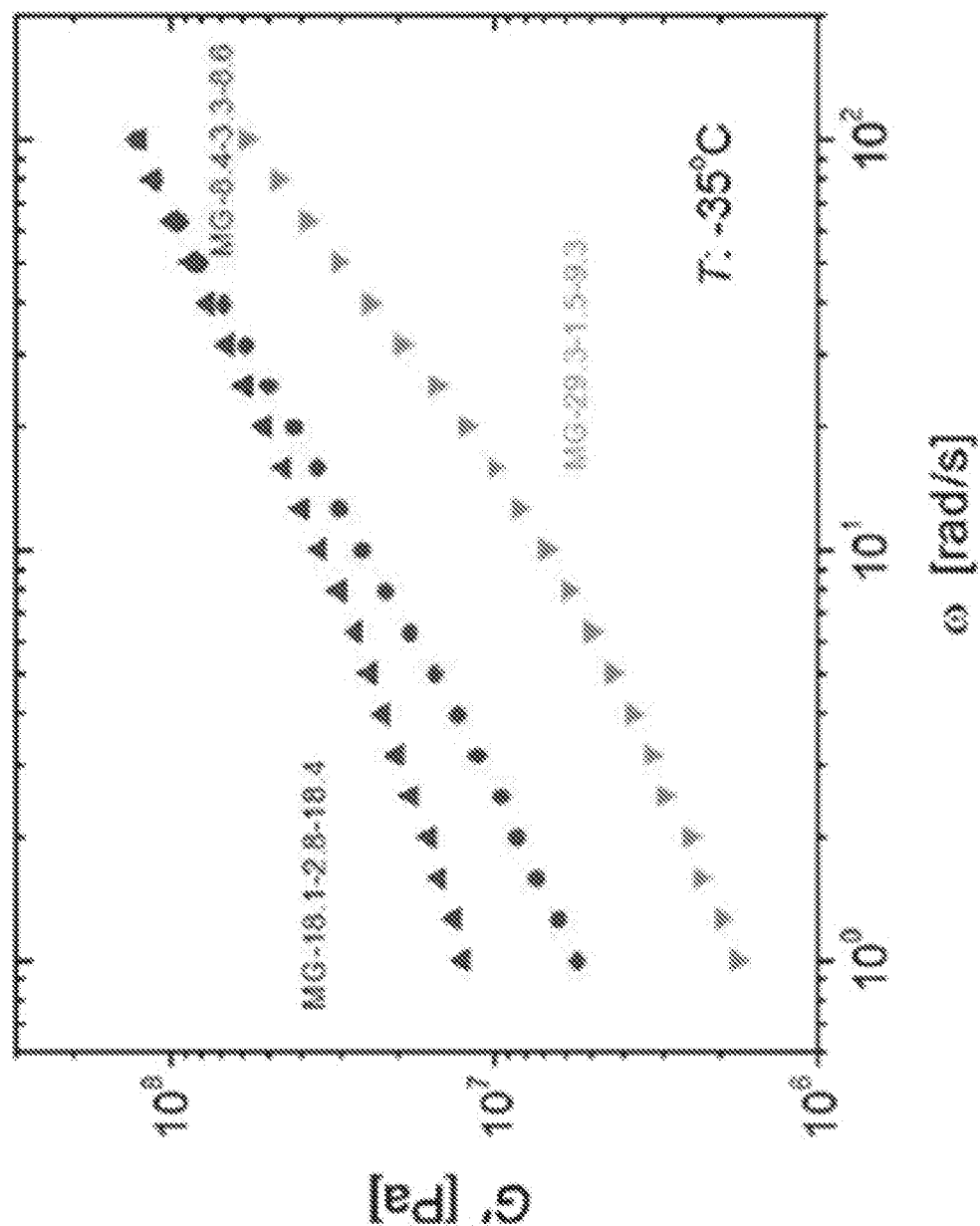
FIG. 6B is a graph of storage modulus (G', in pascal (Pa)) versus frequency (ω, in radian per second (rad/s)) at −35 degrees Celsius (° C.) for various poly(n-butyl acrylate)-graft-poly(methyl methacrylate) (PBA-g-PMMA) copolymer samples: a copolymer prepared from a macromonomer having a number-average molecular weight ($M_n$) of 8.4 kilograms per mole (kg/mol), an average of 3.3 branch points, and a 8.6 volume percentage (vol %) of poly(methyl methacrylate) (PMMA) (i.e., MG-8.4-3.3-8.6; circles): a copolymer prepared from a macromonomer having a $M_n$ of 18.1, an average of 2.8 branch points, and 18.4 vol % PMMA (MG-18.1-2.8-18.4, upward-pointing triangles); and a copolymer prepared from a macromonomer having a $M_n$ of 29.3 kg/mol, an average of 1.5 branch points, and 9.3 vol % of PMMA (MG-29.3-1.5-9.3; downward-pointing triangles).
Figure 6C:
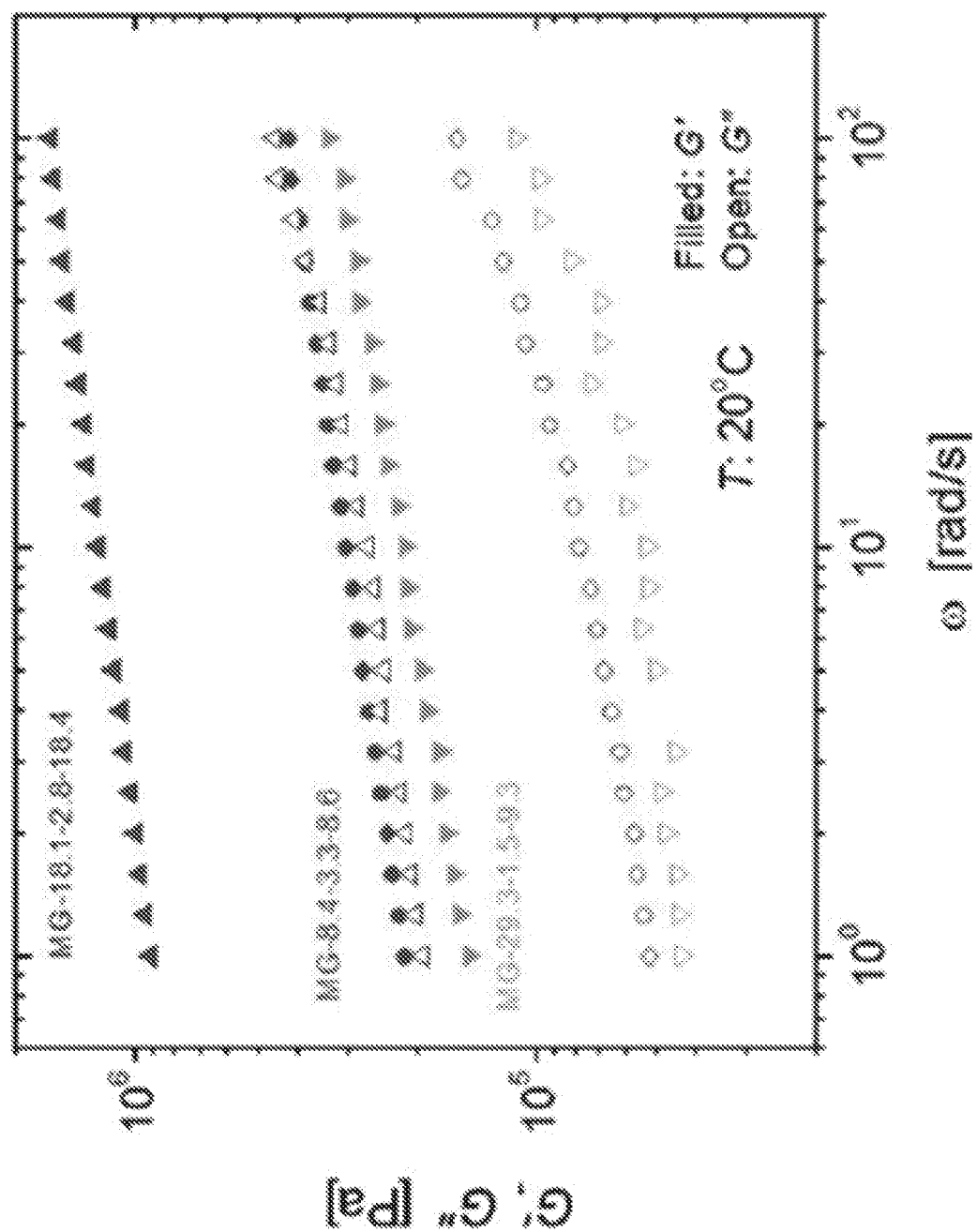
FIG. 6C is a graph of storage modulus (G') and loss modulus (G") (both in pascal (Pa)) versus frequency (ω, in radian per second (rad/s)) at 20 degrees Celsius (° C.) for various poly(n-butyl acrylate)-graft-poly(methyl methacrylate) (PBA-g-PMMA) copolymer samples: a copolymer prepared from a macromonomer having a number-average molecular weight ($M_n$) of 8.4 kilograms per mole (kg/mol), an average of 3.3 branch points, and a 8.6 volume percentage (vol %) of poly(methyl methacrylate) (PMMA) (i.e., MG-8.4-3.3-8.6; filled circles for G', open circles for G"); a copolymer prepared from a macromonomer having a $M_n$ of 18.1, an average of 2.8 branch points, and 18.4 vol % PMMA (MG-18.1-2.8-18.4, filled upward-pointing triangles for G', open upward-pointing triangles for G"); and a copolymer prepared from a macromonomer having a $M_n$ of 29.3 kg/mol, an average of 1.5 branch points, and 9.3 vol % of PMMA (MG-29.3-1.5-9.3: filled downward-pointing triangles for G', open downward-pointing triangles for G").
Figure 6D:
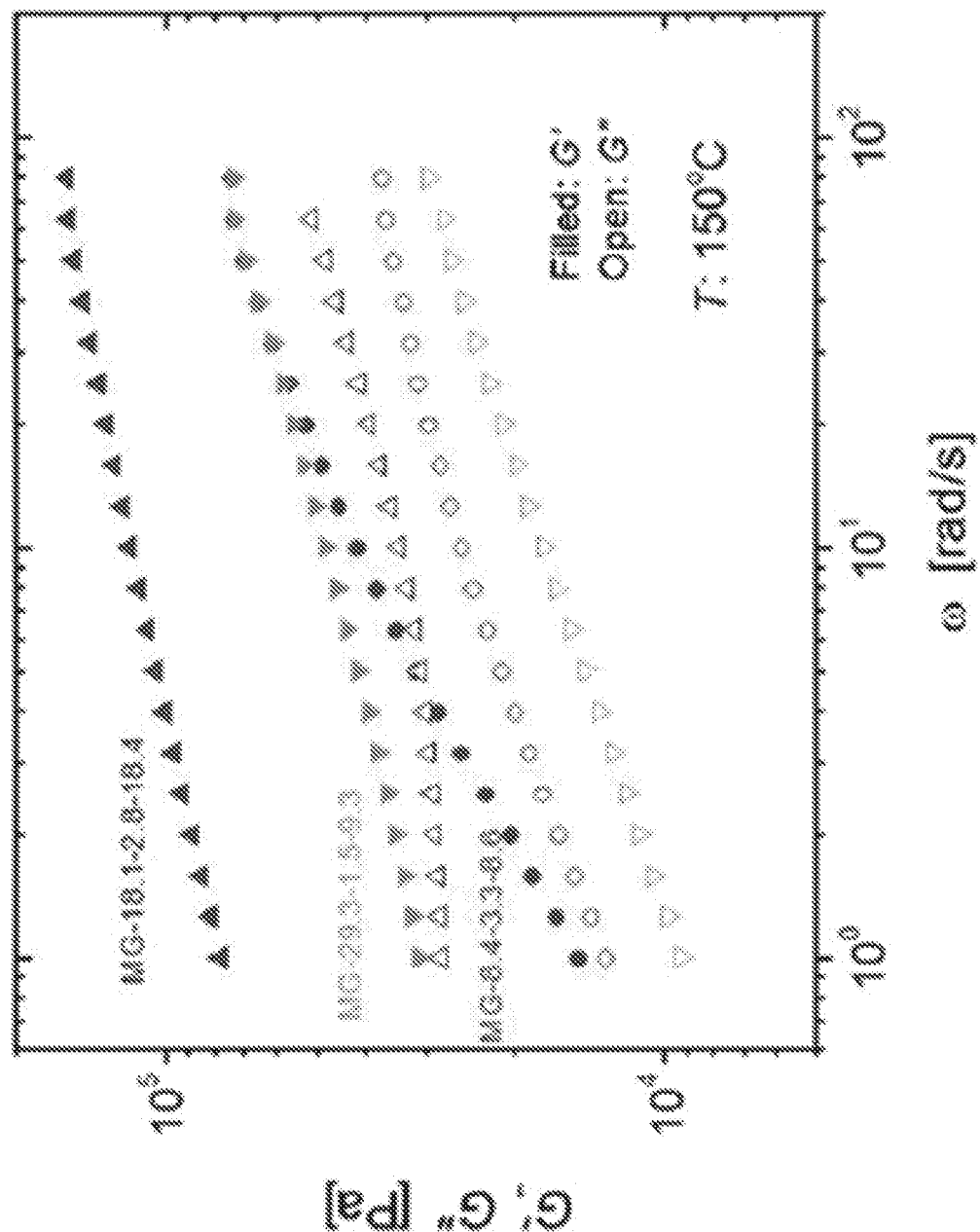
FIG. 6D is a graph of storage modulus (G') and loss modulus (G") (both in pascal (Pa)) versus frequency (ω, in radian per second (rad/s)) at 150 degrees Celsius (° C.) for various poly(n-butyl acrylate)-graft-poly(methyl methacrylate) (PBA-g-PMMA) copolymer samples: a copolymer prepared from a macromonomer having a number-average molecular weight ($M_n$) of 8.4 kilograms per mole (kg/mol), an average of 3.3 branch points, and a 8.6 volume percentage (vol %) of poly(methyl methacrylate) (PMMA) (i.e., MG-8.4-3.3-8.6; filled circles for G', open circles for G"); a copolymer prepared from a macromonomer having a $M_n$ of 18.1, an average of 2.8 branch points, and 18.4 vol % PMMA (MG-18.1-2.8-18.4, filled upward-pointing triangles for G', open upward-pointing triangles for G"); and a copolymer prepared from a macromonomer having a $M_n$ of 29.3 kg/mol, an average of 1.5 branch points, and 9.3 vol % of PMMA (MG-29.3-1.5-9.3; filled downward-pointing triangles for G', open downward-pointing triangles for G").

In addition to DMA, the linear viscoelastic properties of the presently disclosed graft copolymers were measured using a rotational rheometer. As shown in FIG. 6A, the Cole-Cole plot representation gives an overview of the dynamic mechanical spectra at different temperatures without resorting to the Time-Temperature Superposition (TTS) method. Several conclusions can be drawn for the presently disclosed copolymers. First MG-8.4-3.3-8.6 and MG-18.1-2.8-18.4 exhibit thermo-rheological complexity—the failure of TTS. This can be observed from the data collected at intermediate and high temperatures, which do not collapse onto a single curve. TTS appears to work in MG-29.3-1.5-9.3, due to the relatively low number of branches and low volume fraction of PMMA. Secondly, all the samples display a clear signature of the rubbery plateau at intermediate temperatures, which is classic for TPEs. See FIG. 6C. Third, at high temperatures, MG-8.4-3.3-8.6 exhibits liquid-like behavior, due to the relatively weak phase separation in the samples. Moreover, at low temperatures, (−35° C.), the mechanical behavior is dominated by Tg. The storage modulus at low frequencies increases with the increase in the PMMA volume fraction. See FIG. 6B. At high temperatures, the mechanical behavior is affected by a number of factors, including molecular weight, $T_g$, the number of branches, and the degree of phase separation. MG-8.4-3.3-8.6 is liquid-like at 150° C., whereas MG-18.1-2.8-18.4 and MG-29.3-1.5-9.3 are still gel-like. See FIG. 6D.

Example 6

PBA-g-PtBMA Graft Copolymer

Figure 7:
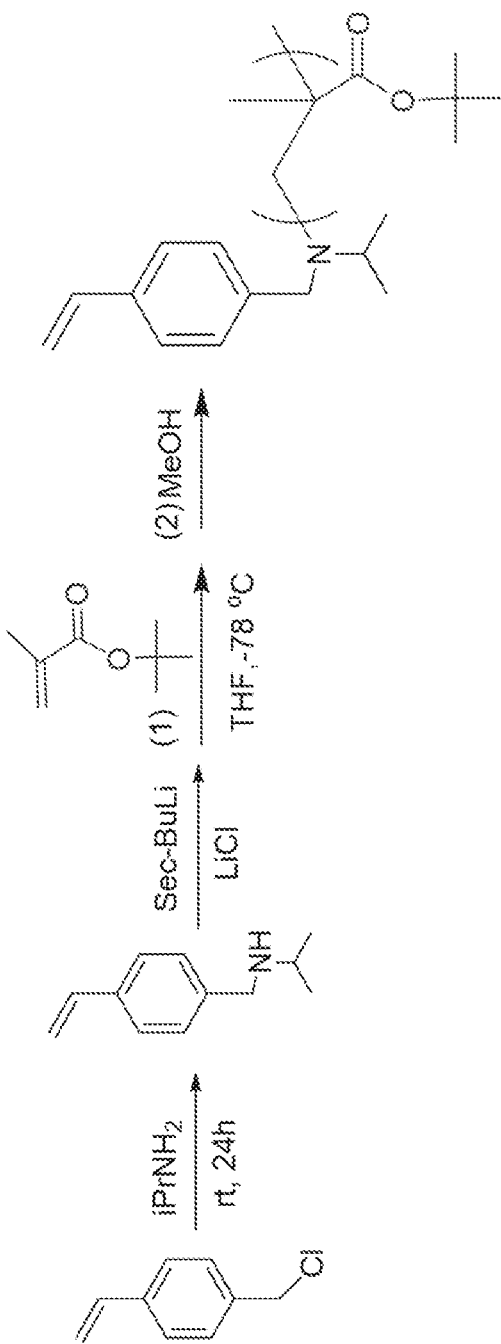
FIG. 7 is a schematic drawing showing the chemical synthesis of a poly(tert-butyl methacrylate) (PtBMA) macromonomer using N-isopropyl-4-vinylbenzylamine (PVBA) as a polymerization initiator.
Figure 8A:
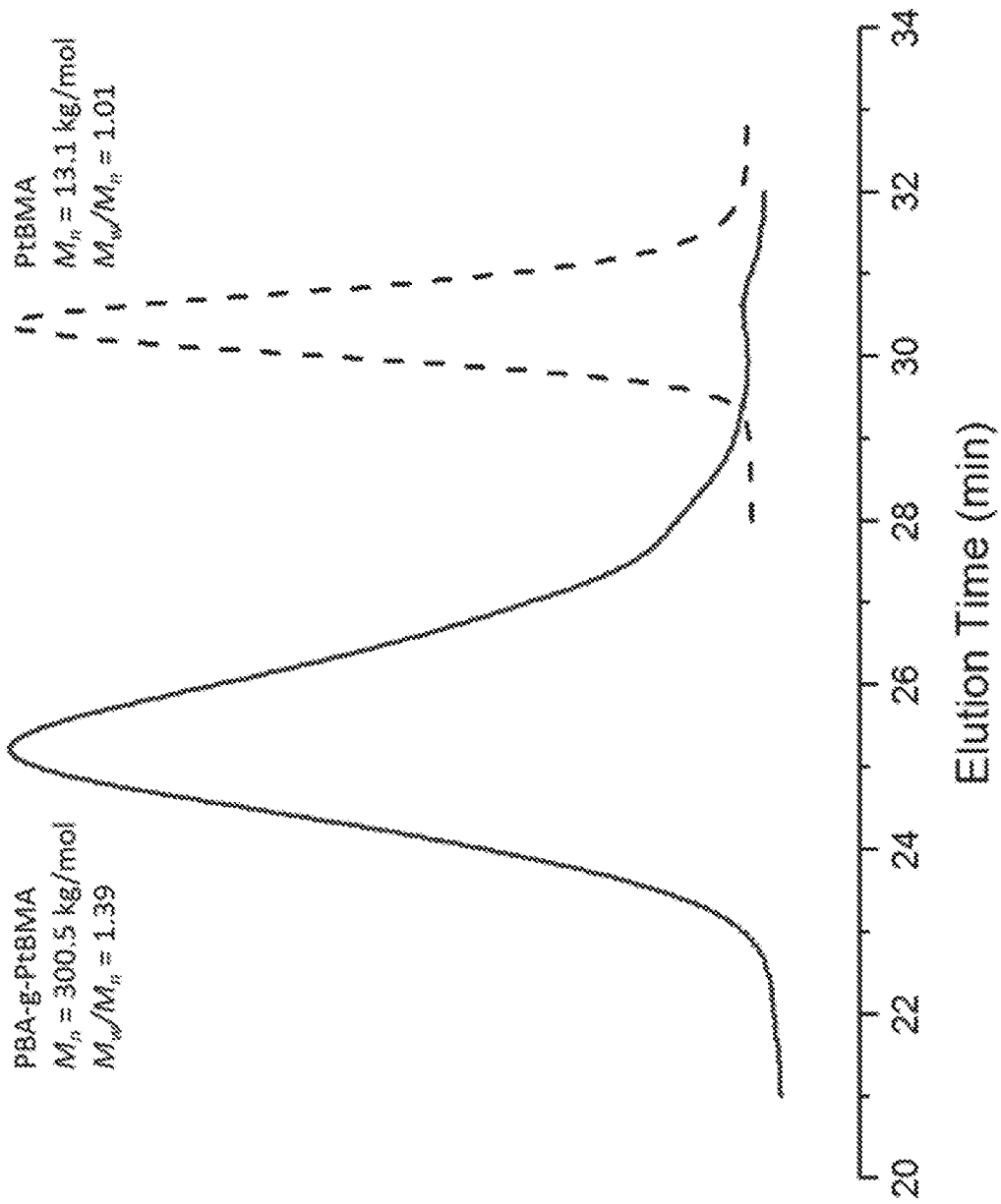
FIG. 8A is a graph showing a size exclusion chromatography (SEC) chromatograph of the elution times (in minutes) of a typical poly(n-butyl acrylate)-graft-poly(tert-butyl methacrylate) (PBA-g-PtBMA) copolymer (solid line) and of a poly(tert-butyl methacrylate) (PtBMA) macromonomer (dashed line). The copolymer has a number-average molecular weight ($M_n$) of about 300.5 kilograms per mole (kg/mol) and a polydispersity index (PDI or $M_w/M_n$) of 1.39. The macromonomer has a $M_n$ of 13.1 kg/mol and a $M_w/M_n$ of 1.01.
Figure 8B:
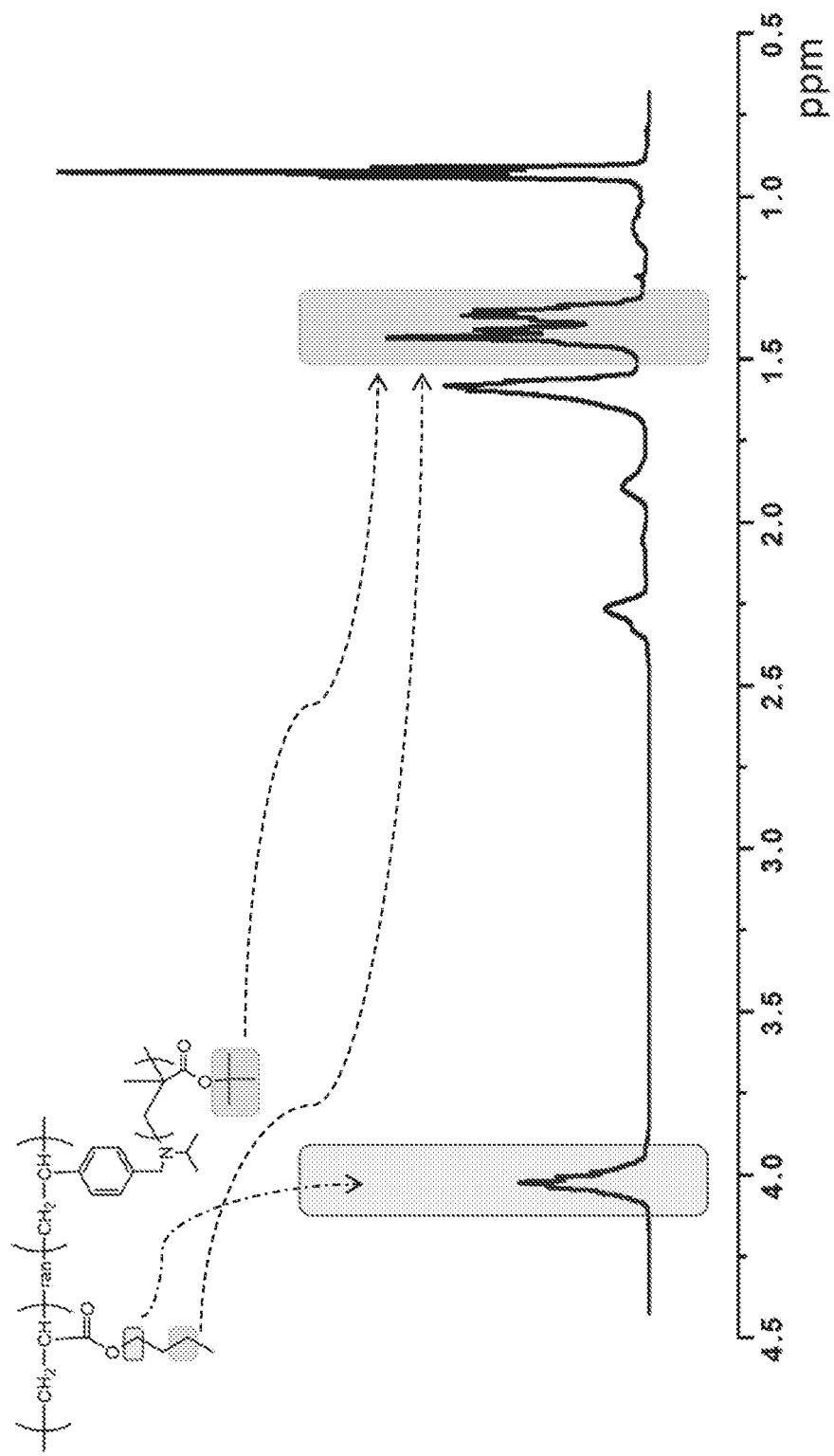
FIG. 8B is a graph showing the proton nuclear magnetic resonance ($^1$H NMR) spectrum of a poly(n-butyl acrylate)-graft-poly(tert-butyl methyl methacrylate) (PBA-g-PtBMA) copolymer. The shaded/boxed peak at about 4.0 parts per million (ppm) corresponds to the signal of the protons of the methylene group adjacent to the ester oxygen in the PBA, while the shaded/boxed peaks at between about 1.3 and 1.5 ppm correspond to the signal of the protons in the methyl groups of the tert-butyl group in the PtBMA and the signal of the protons of the methylene group adjacent to the methyl group of the n-butyl group in the PBA.

The macromonomer of poly(tert-butyl methacrylate) (PtBMA) was synthesized via anionic polymerization in THF at −78° C. using the sec-BuLi/PVBA initiation system in a procedure analogous to that described in Example 2 for the synthesis of the macromonomer of PMMA, only using tert-butyl methacrylate instead of MMA. See FIG. 7. The copolymer of the PtBMA macromonomer and n-butyl acrylate was prepared via RAFT copolymerization of butyl acrylate with the PtBMA macromonomer using a procedure analogous to that described in Example 3. The number-average molecular weight of the PtBMA macromonomer used to make the copolymer was about 13.1 kg/mol with a PDI of 1.01. A number-average molecular weight $M_n$ of 300.5 kg/mol and a PDI of 1.39 were measured for the copolymer in THF at 40° C. using a Polymer Laboratories PL-120 SEC system (Polymer Laboratories, Varian, Inc., Amherst, Mass., United States of America) with dn/dc estimated by wt % (PtBMA×0.085+wt % (PBA)×0.067, where 0.085 ml/g is dn/dc for the PtBMA and 0.067 is the dn/dc for PBA. The wt % of PtBMA and PBA were obtained from $^1$H NMR spectra, i.e., based on the ratio of integrated areas between the peaks at around 1.3-1.5 ppm (—C(CH$_3$)$_3$) of PtBMA and O—C—C—CH$_2$—C of PBA and 4.0 ppm (—O—CH$_2$— of PBA). See FIG. 8B. The volume % of PtBMA in the copolymer was calculated as 26.0% based on the density of 1.023 g/ml for the PtBMA and 1.080 g/ml for PBA. The average number of branch points in the copolymer was determined to be 5.7 based on $M_n$(PBA-g-PtBMA)×wt % (PtBMA)/$M_n$(PtBMA). Thus, the resulting PBA-g-PtBMA copolymer was given the sample identification number of MG-13.1-5.7-26.0, where the first number is the $M_n$ of the PtBMA, the second number is the average number of branch points, and the third number is the vol % of PtBMA. Typical SEC curves of the PtBMA macromonomer and PBA-g-PtBMA copolymer are shown in FIG. 8A.

Example 7

Modifications of the PBA-g-PtBMA Graft Copolymer

Figure 9:
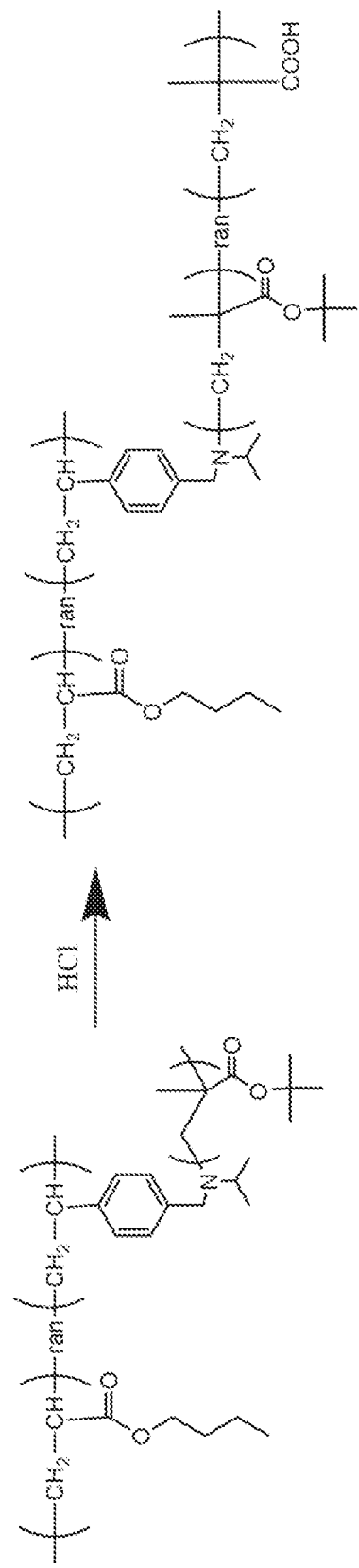
FIG. 9 is a schematic drawing showing the partial acid-catalyzed hydrolysis of the tert-butyl esters in poly(tert-butyl methacrylate) (PtBMA) chains in a random poly(n-butyl acrylate)-graft-poly(tert-butyl methacrylate) (PBA-g-PtBMA) copolymer
Figure 10:
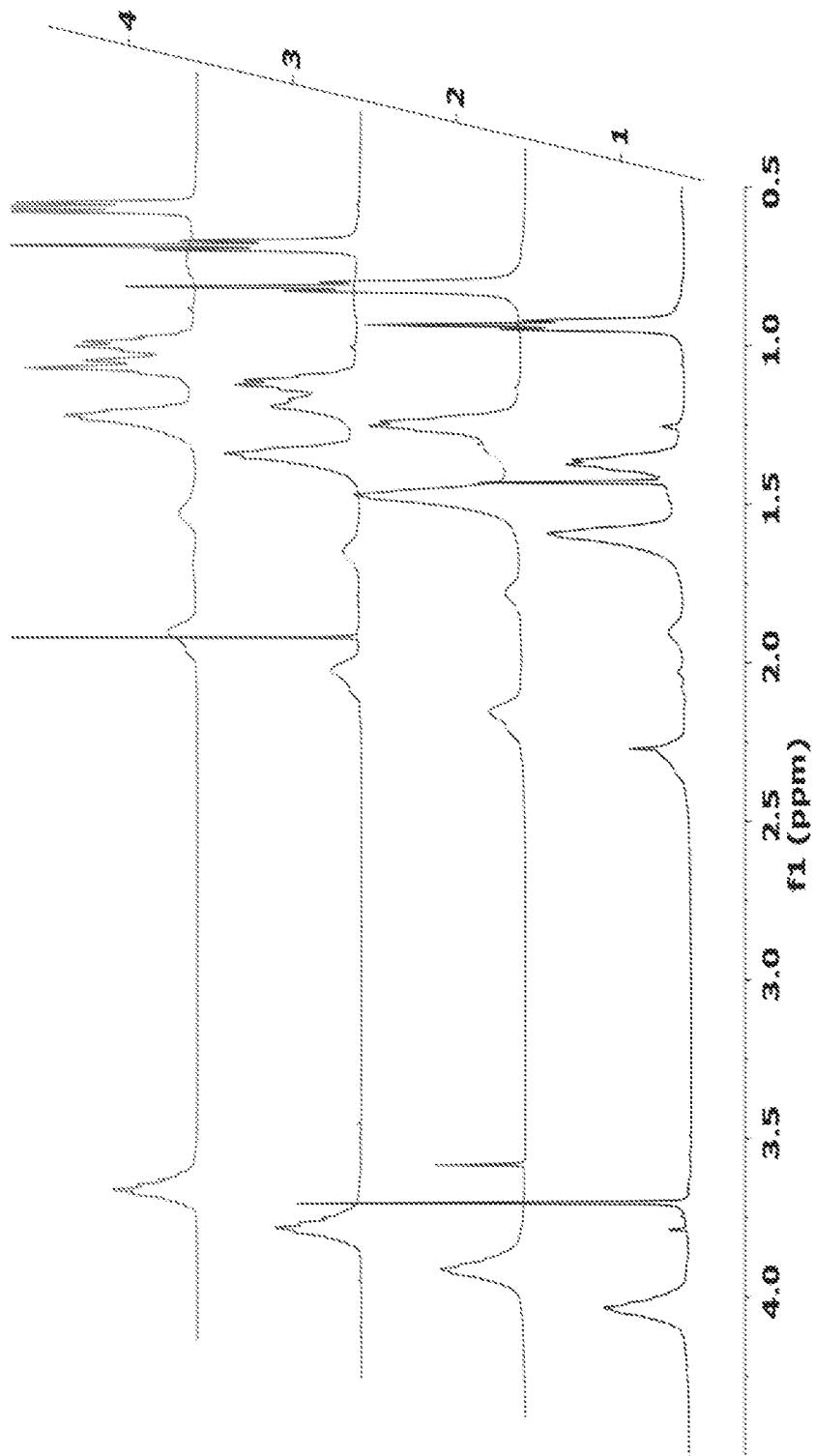
FIG. 10 is a graph showing the effect of increasing levels of ester hydrolysis in the proton nuclear magnetic resonance ($^1$H NMR) spectrum of random poly(n-butyl acrylate)-graft-poly(tert-butyl methacrylate) (PBA-g-PtBMA) copolymers. Going from top to bottom, the top spectrum (4) is of the copolymer with no (0 percent (%)) hydrolysis; the next spectrum (3) is of a copolymer with 16.2% of the tert-butyl esters in the PtBMA chains hydrolyzed to form carboxylic acid groups; the second to last spectrum (2) is of a copolymer with 42.3% of the tert-butyl esters in the PtBMA chains hydrolyzed; and the bottom spectrum (1) is of a copolymer with 54.0% of the tert-butyl esters in the PtBMA chains hydrolyzed. With increasing hydrolysis, the peak corresponding to the signal for the methyl protons of the tert-butyl group decreases and shifts downfield (to higher ppm).

As shown in FIG. 9, the PtBMA block of the PBA-g-PtBMA copolymer described in Example 6 was hydrolyzed using 12× HCl according to a previously reported procedure. See Giebeler and Stadler (1997) Macromol. Chem. Phys., 198, 3815-3825; and Qin and Qiu (2001) J. Polym. Sci., Part A: Polym. Chem., 39(9), 1450-1455. The reaction was performed in 1,4-dioxane with a trace amount of toluene to dissolve the polymer. The reaction time was varied from 1.5 hours to 6 hours to provide copolymers with different degrees of hydrolysis. FIG. 10 shows the effects of varying the degree of hydrolysis (0%, 16.2%, 43.3%, and 54%) on the proton NMR spectra of the copolymer.

Figure 11:
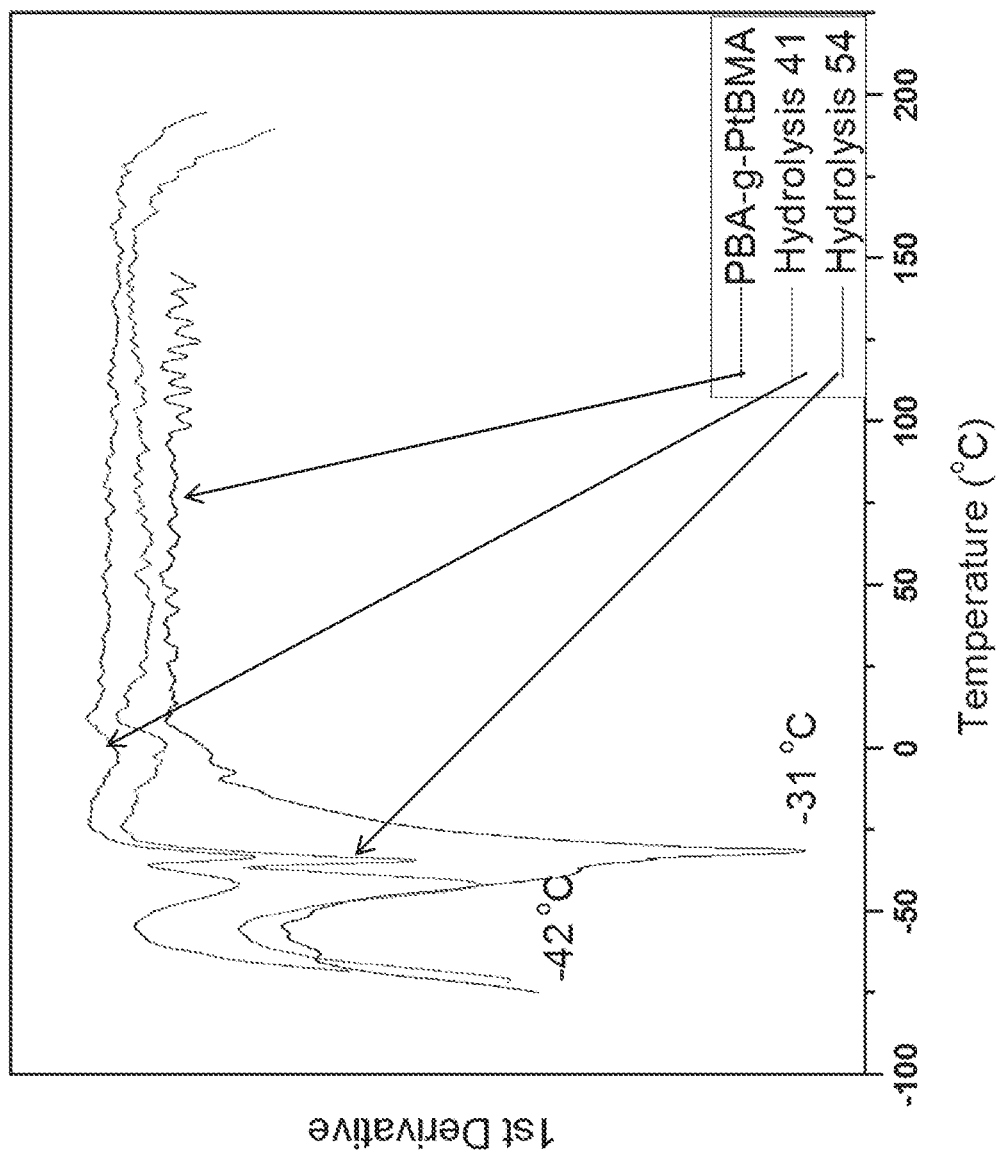
FIG. 11 is a graph showing the differential scanning calorimetry (DSC) first derivative thermographs of a poly(n-butyl acrylate)-graft-poly(tert-butyl methacrylate) (PBA-g-PtBMA) copolymer with no hydrolysis; and of partially hydrolyzed PBA-g-PtBMA copolymers. One of the partially hydrolysis copolymers has about 41% hydrolysis (Hydrolysis 41) and another has about 54% hydrolysis (Hydrolysis 54). The arrows in the thermograph show glass transition temperatures at −42 degrees Celsius (° C.) and −31° C.

Based on AFM and DSC studies (see FIG. 11), hydrolysis appears to improve the microphase separation behavior of the graft copolymers.

Figure 12:
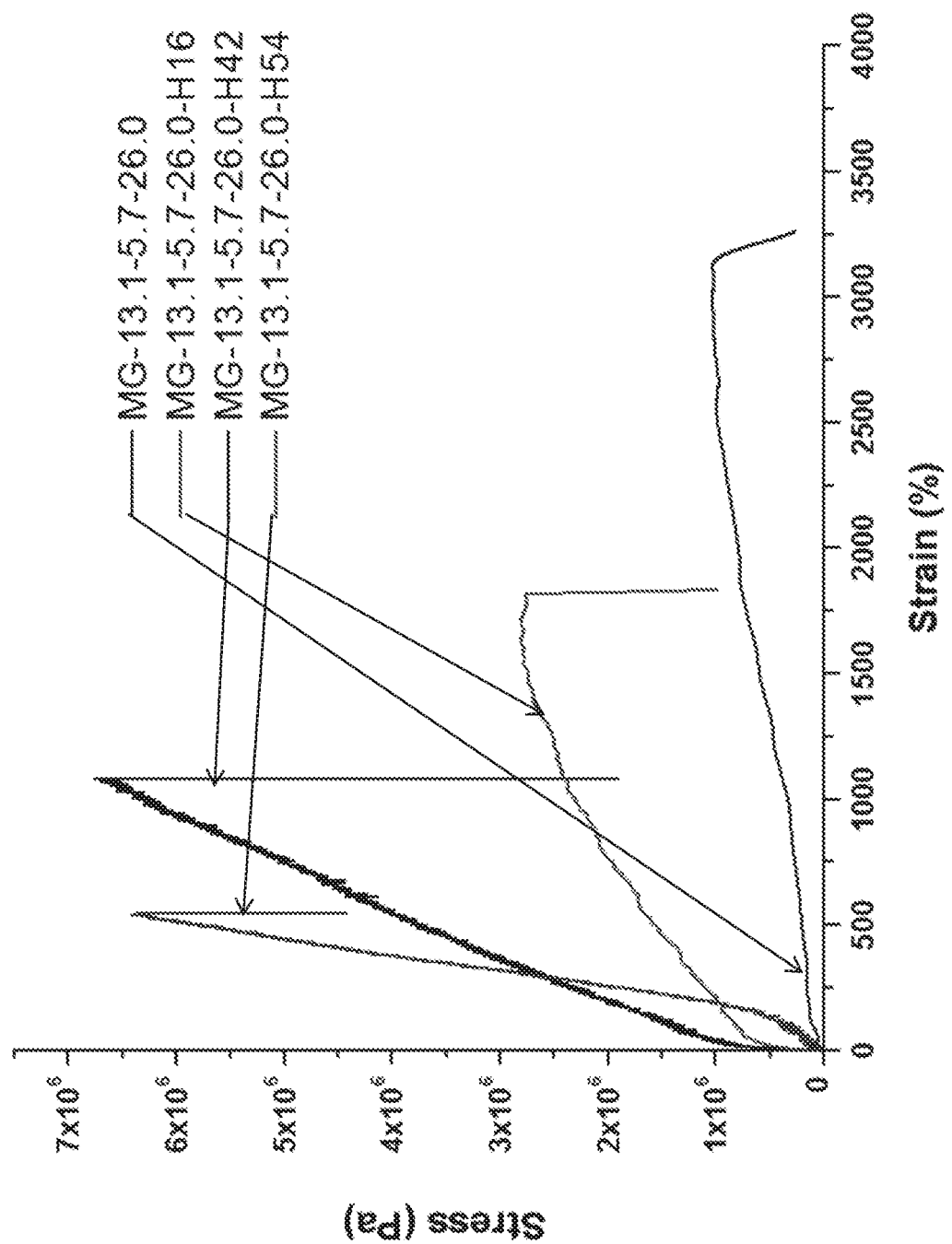
FIG. 12 is a graph showing the stress-strain curves of a poly(n-butyl acrylate)-graft-poly(tert-butyl methacrylate) (PBA-g-PtBMA) copolymer prepared from a PtBMA copolymer having a number-average molecular weight ($M_n$) of 13.1 kilograms per mole (kg/mol), an average of 5.7 branch points, and a 26.0 volume percentage (vol %) of PtBMA (i.e., MG-13.1-5.7-26.0) as well as partially hydrolyzed versions thereof, i.e., a 16% hydrolyzed copolymer (MG-13.1-5.7-26.0-H16), a 42% hydrolyzed copolymer (MG-13.1-5.7-26.0-H42) and a 54% hydrolyzed copolymer (MG-13.1-5.7-26.0-H54). Stress is measured in pascal (Pa) and strain in percentage (%).

The stress-strain curves of the unhydrolyzed and partially hydrolyzed copolymers are shown in FIG. 12. The effects of hydrolysis on mechanical behaviors are summarized in Table 4, below.

TABLE 4

Effects of Partial Hydrolysis on the Mechanical Behavior of PBA-g-PtBMA copolymers.

| Sample (% hydrolysis) | σB (MPa) | εB (%) | σB at 500% (MPa) | improvement |
|---|---|---|---|---|
| Before hydrolysis | 1.0 | 3127 | 0.2 | n/a |
| 16.2 | 2.8 | 1816 | 1.6 | 8 times |
| 42.3 | 6.8 | 1080 | 3.8 | 19 times |
| 54.0 | 6.4 | 542 | 5.9 | 29.5 times |

Similar to the mechanical performance of the PBA-g-PMMA graft copolymers described herein, the PBA-g-PtBMA graft copolymer exhibited stress of at least about 1

MPa, which is higher than that of commercial acrylic-based TPEs. Further, the elongation at break was very high, at 3127%. Partial hydrolysis of the copolymer enhanced the mechanical strength of the material. With a hydrolysis degree of about 42%, the stress at 500% strain was around 19 times higher than for the unmodified copolymer; while with a hydrolysis degree of about 54%, the stress at 500% strain was around 29.5 times higher than for the unmodified copolymer. Although the elongation appears to decrease with increasing degree of hydrolysis, the elongations still compared favorably to conventional all acrylic TPEs.

Figure 13:
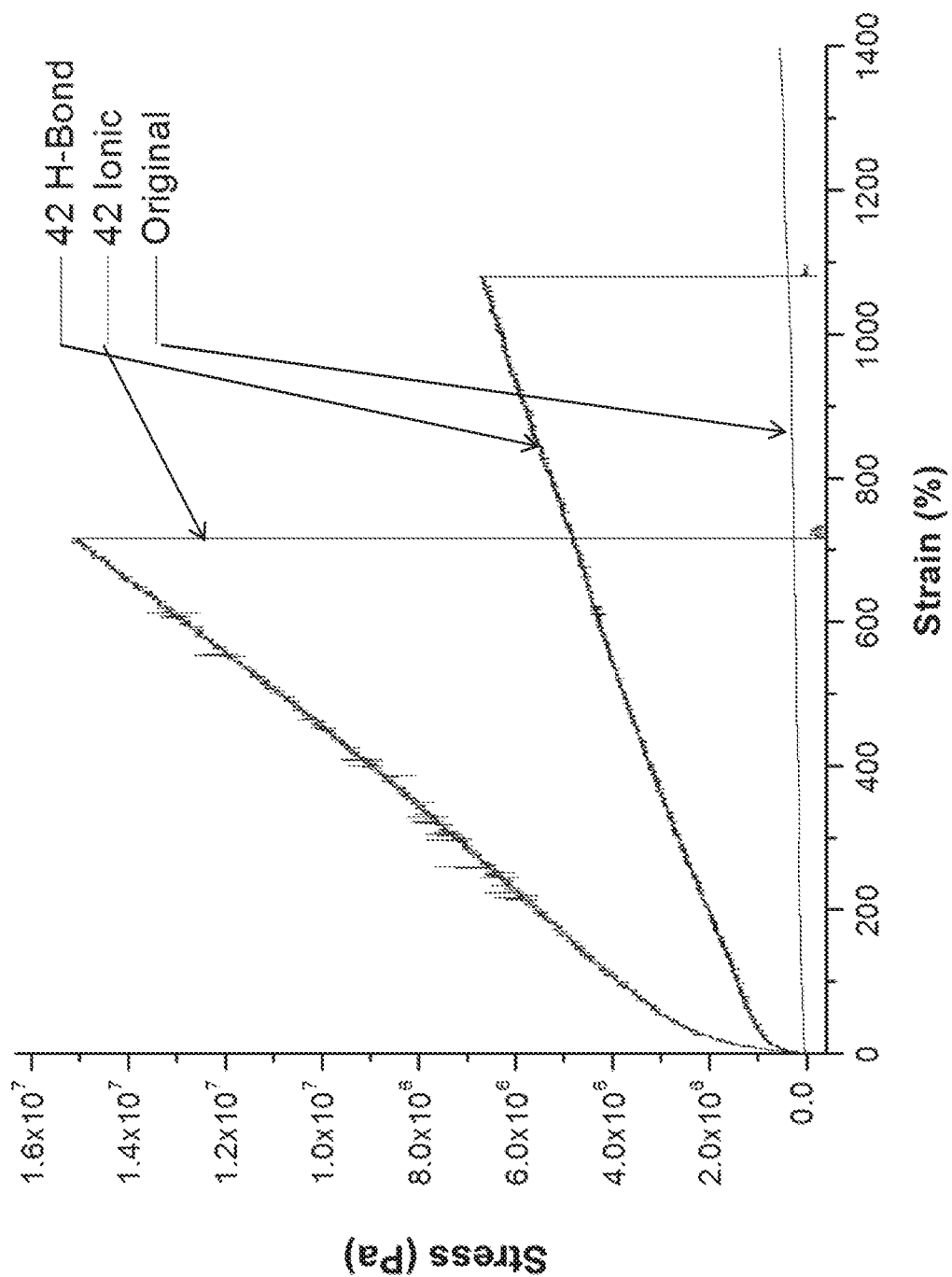
FIG. 13 is a graph showing the stress-strain curves of a poly(n-butyl acrylate)-graft-poly(tert-butyl methacrylate) (PBA-g-PtBMA) copolymer (Original), the same copolymer after about 42% of the tert-butyl esters in the PtBMA chains are hydrolyzed to form carboxylic acid groups (42-H-Bond), and the hydrolyzed copolymer after ionization of the carboxylic acid groups to form carboxylate-sodium salts (42 Ionic). Stress is measured in pascal (Pa) and strain in percentage (%).
Figure 14:
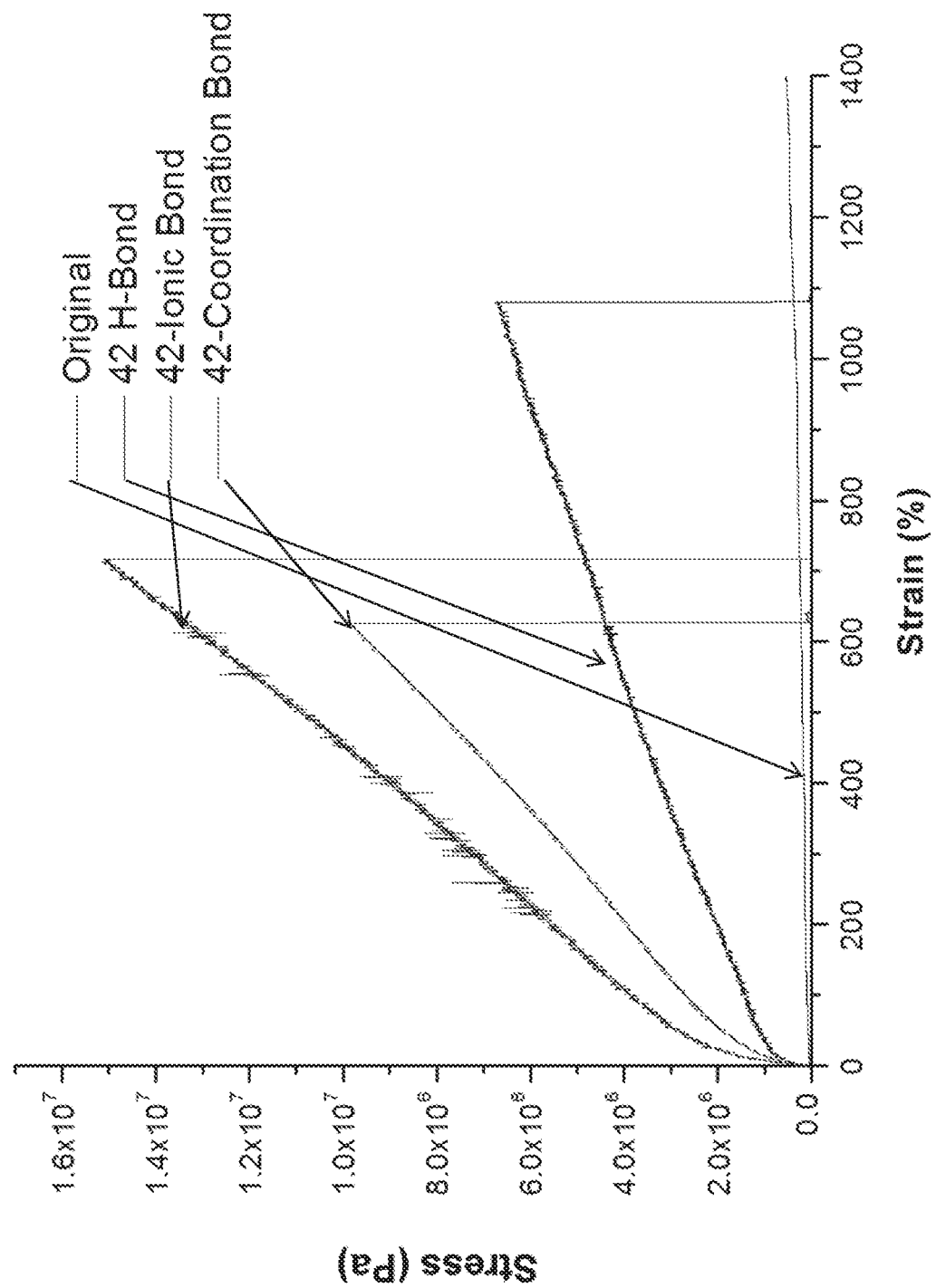
FIG. 14 is a graph showing the stress-strain curves of a poly(n-butyl acrylate)-graft-poly(tert-butyl methacrylate) (PBA-g-PtBMA) copolymer (Original), the same copolymer after about 42% of the tert-butyl esters in the PtBMA chains are hydrolyzed to form carboxylic acid groups (42-H-Bond), the hydrolyzed copolymer after ionization of the carboxylic acid groups to form carboxylate-sodium salts (42 Ionic), and the hydrolyzed copolymer after reaction of the carboxylic acid groups with zinc dichloride to form a coordination bond (42 Coordination Bond). Stress is measured in pascal (Pa) and strain in percentage (%).

The hydrolyzed graft copolymers were treated with NaOH to ionize the carboxyl groups of the hydrolyzed PtBMA in order to introduce ionic bonding. More particularly, the polymer was dissolved in a toluene/dioxane mixture, and NaOH with a concentration of about 0.1 M was added, with the same molar ratio to polymer acid group. The resulting solution was directly poured into an evaporation dish to make a film. Alternatively, the hydrolyzed copolymers were treated with $ZnCl_2$ to provide a coordination bond between the carboxyl groups of the hydrolyzed PtBMA and $Zn^{2+}$. The polymer was dissolved in water. ZnCl2 with a concentration of about 0.1 M was added with stirring with the same ratio as the ionic group. The polymer precipitated immediately and was dried in vacuo at 60° C. overnight. A film was prepared by melt-press casting. Cations of large size and with multiple charges, such as $Zn^{2+}$ or $Ca^{2+}$ can also be added to the system to form coordination bonds with the anionic groups. Based on prior work with block copolymers, it is believed that coordination bonds can improve mechanical strength and provide TPEs with a self-healing property due to strong coordination interations. See Tobolsky et al. (1968) Macromolecules, 1(6), 515-519. FIGS. 13 and 14 show the effects of ionization and coordination on the copolymer stress-strain curve. The effects of ionization and coordination are also summarized below in Table 5.

TABLE 5

Effects of Ionization on the Mechanical Behavior of PBA-g-PtBMA copolymers.

| Sample | σB (MPa) | εB (%) | σB at 500% (MPa) | improvement |
|---|---|---|---|---|
| Before hydrolysis | 1.0 | 3127 | 0.2 | n/a |
| 42.3% hydrolysis | 6.8 | 1080 | 3.8 | 19 times |
| 42.3% ionic bond | 15.1 | 714 | 11.0 | 55 times |
| 42.3% coordination Bond | 9.9 | 626 | 8.0 | 40 times |

As seen in FIG. 13 and Table 5, introduction of ionic or coordination bonding significantly enhanced mechanical strength. While these types of bonding both led to a decrease in elongation, the combined properties of the modified copolymers were still significantly better than conventional all acrylic TPEs.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A thermoplastic elastomer comprising an acrylic multigraft copolymer comprising:
   a rubbery polymeric backbone comprising a plurality of randomly spaced branch points, wherein the rubbery polymeric backbone comprises a poly(alkyl acrylate); and
   a plurality of glassy polymeric grafts, wherein each of the glassy polymeric grafts comprises a poly(alkyl methacrylate), a poly(cycloalkyl methacrylate), a poly(aralkyl methacrylate), a poly(aryl methacrylate), a copolymer thereof, or a copolymer of a poly(alkyl methacrylate), a poly(cycloalkyl methacrylate), a poly(aralkyl methacrylate) or a poly(aryl methacrylate) and poly(methacrylic acid) or a salt or coordination complex thereof, and wherein each of the plurality of glassy grafts is attached to the rubbery polymeric backbone at one of the plurality of randomly spaced branch points;
   wherein the acrylic multigraft copolymer is substantially free of free glassy acrylic polymeric chains and/or has a number-average molecular weight ($M_n$) of at least about 200 kilograms per mole (kg/mol) and/or has a stress at break ($σ_B$) of at least about 1 megapascals (MPa); and
   wherein each of the plurality of glassy polymeric grafts has a structure of the formula:

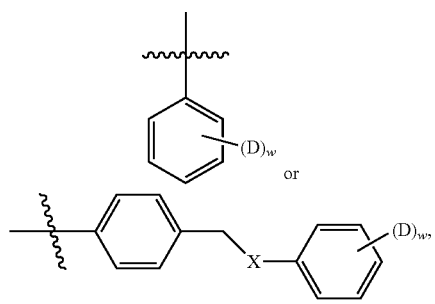

wherein:
   w is 1 or 2;
   X is O, S, or NR', wherein R' is alkyl, aralkyl, or aryl; and
   each D is a group having the structure formula —$CH_2$—$NR_1$—[$CH_2$—$C(CH_3)(C(=O)R_2)$]$_n$—$CH_3$ or —$X_1$-L-$NR_1$—[$CH_2$—$C(CH_3)(C(=O)R_2)$]$_n$—$CH_3$ wherein each n is independently an integer of about 10 or greater; $X_1$ is O, S or NR'; L is a bivalent linker: $R_1$ is selected from alkyl, aralkyl, and aryl; and each $R_2$ is independently selected from hydroxyl, alkoxy, cycloalkoxy, aralkoxy, aryloxy and an oxyanion, wherein when $R_2$ is an oxyanion, it can be bonded to a cation of an alkali metal via an ionic bond or to a metal compound via a coordination bond.

2. The thermoplastic elastomer of claim 1, wherein each of the plurality of glassy polymeric rafts has a structure of the formula:

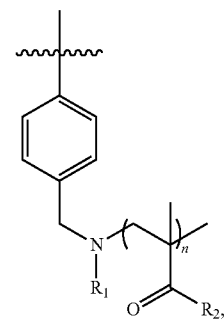

wherein:
   n is an integer of about 10 or greater;
   $R_1$ is selected from the group consisting of alkyl, aralkyl, and aryl; and each R$_2$ is independently selected from hydroxyl, alkoxy, cycloalkoxy, aralkoxy, aryloxy and an oxyanion, wherein when R$_2$ is an oxyanion, it can be bonded to a cation of an alkali metal via an ionic bond or to a metal compound via a coordination bond.

3. The thermoplastic elastomer of claim 2, wherein R$_2$ is —OR$_3$, wherein R$_3$ is selected from the group consisting of methyl, ethyl, propyl, butyl, isobornyl, 1-adamantyl, cyclohexyl, menthyl, phenyl, naphthyl, benzyl, diphenylmethyl, and trityl.

4. The thermoplastic elastomer of claim 2, wherein R$_1$ is isopropyl.

5. The thermoplastic elastomer of claim 1, wherein the poly(alkyl acrylate) is selected from poly(methyl acrylate), poly(ethyl acrylate), poly(n-propyl acrylate), poly(n-butyl acrylate), poly(n-pentyl acrylate), poly(n-hexyl acrylate), and copolymers thereof.

6. The thermoplastic elastomer of claim 1, wherein the acrylic multigraft copolymer has a volume fraction of glassy polymeric grafts of between about 8% and about 35%.

7. The thermoplastic elastomer of claim 1, where each glassy polymeric graft has a number-average molecular weight (M$_n$) of at least about 7.5 kilograms per mole (kg/mol).

8. The thermoplastic elastomer of claim 1, wherein the acrylic multigraft copolymer has a M$_n$ of at least about 245 kilograms per mole (kg/mol).

9. The thermoplastic elastomer of claim 1, wherein the acrylic multigraft copolymer has a σ$_B$ of at least about 1.9 MPa.

10. The thermoplastic elastomer of claim 1, wherein the acrylic multigraft copolymer has an elongation at break (ε$_B$) of 490% or more.

11. The thermoplastic elastomer of claim 1, wherein the acrylic multigraft copolymer has a residual strain of about 15% or less at an applied strain of about 1460%.

12. The thermoplastic elastomer of claim 1, wherein the acrylic multigraft copolymer comprises a poly(n-butyl acrylate) (PBA) main chain and a plurality of poly(methyl methacrylate) (PMMA) grafts.

13. The thermoplastic elastomer of claim 12, wherein the acrylic multigraft copolymer has a volume fraction of PMMA of between about 8% and about 34%.

14. The thermoplastic elastomer of claim 12, wherein the acrylic multigraft copolymer has a stress at break of at least about 1.9 MPa and/or an elongation at break of about 1700% or more.

15. The thermoplastic elastomer of claim 1, wherein the acrylic multigraft copolymer comprises a poly(n-butyl acrylate) (PBA) main chain and a plurality of grafts comprising poly(tert-butyl methacrylate) (PtBMA) or a copolymer of PtBMA and poly(methacrylic acid) or a salt or coordination complex thereof.

16. The thermoplastic elastomer of claim 15, wherein the acrylic multigraft copolymer has a volume fraction of PtBMA or copolymer of PtBMA and poly(methacrylic acid) or salt or coordination complex thereof of about 26%.

17. The thermoplastic elastomer of claim 15, wherein the acrylic multigraft copolymer has an average number of grafts of about 5.7.

18. The thermoplastic elastomer of claim 15, wherein the acrylic multigraft copolymer has a M$_n$ of about 300 kg/mol.

19. The thermoplastic elastomer of claim 15, wherein the acrylic multigraft copolymer comprises a PBA main chain and a plurality of PtBMA grafts.

20. The thermoplastic elastomer of claim 19, wherein the acrylic multigraft copolymer has an elongation at break of about 3000% or more.

21. The thermoplastic elastomer of claim 15, wherein the acrylic multigraft copolymer comprises a PBA main chain and a plurality of grafts comprising a copolymer of PtBMA and poly(methacrylic acid) or a salt or coordination complex thereof.

22. The thermoplastic elastomer of claim 21, wherein each of the plurality of grafts has a structure of the formula:

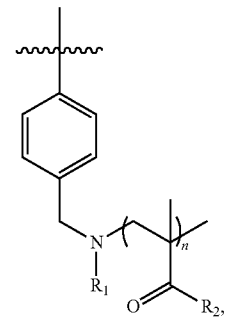

wherein
n is an integer of 10 or greater;
R$_1$ is selected from the group consisting of alkyl, aralkyl, and aryl; and
each R$_2$ is independently selected from tert-butoxy and hydroxyl, wherein between about 15% and about 55% of R$_2$ groups are hydroxyl.

23. The thermoplastic elastomer of claim 22, wherein the acrylic multigraft copolymer has a stress at break of about 2 MPa or more.

24. The thermoplastic elastomer of claim 22, wherein the acrylic multigraft copolymer has an elongation at break of 1700% or more.

25. The thermoplastic elastomer of claim 22, wherein the acrylic multigraft copolymer has a stress at 500% elongation of about 1.6 MPa or more.

26. The thermoplastic elastomer of claim 21, wherein each of the plurality of grafts has a structure of the formula:

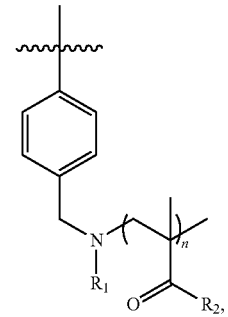

wherein
n is an integer of 10 or greater;
R$_1$ is selected from the group consisting of alkyl, aralkyl, and aryl; and
each R$_2$ is independently selected from tert-butoxy and an oxyanion.

27. The thermoplastic elastomer of claim 26, wherein about 42% of R$_2$ are an oxyanion, and wherein the multigraft copolymer has a stress at break of about 15.1 MPa, an elongation of about 714%, and a stress at 500% elongation of about 11 MPa.

28. A fabricated article comprising the thermoplastic elastomer composition of claim 1.

29. The fabricated article of claim 28, wherein the fabricated article is selected from an elastic band, a shoe sole or other shoe part, an elastic waistband, an automotive interior or exterior part, a diaper backing or attachment, an adhesive tape, a membrane, a balloon, a bag, ribbing, a roofing tile, a surgical or other glove, a medical device, and a condom.

30. An adhesive comprising the thermoplastic elastomer composition of claim 1 and a tackifier.

31. The adhesive of claim 30, wherein the tackifier is selected from the group consisting of rosins and derivatives thereof, terpenes, modified terpenes, an aliphatic resin, a cycloaliphatic resin, an aromatic resin, a hydrogenated hydrocarbon resin, a terpene-phenol resin, and mixtures thereof.

32. The adhesive of claim 30, further comprising one or more additives selected from the group consisting of waxes, plasticizers, anti-oxidants, stabilizers, decorative agents, biocides, flame retardants, antistatic agents, and fillers.

33. A method of preparing an acrylic multigraft copolymer, the method comprising:
    (a) providing a macromonomer having a structure of the formula:

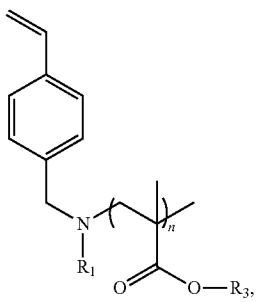

wherein:
    n is an integer of about 10 or greater;
    $R_1$ is selected from the group consisting of alkyl, aralkyl, and aryl; and
    each $R_3$ is independently alkyl, cycloalkyl, aralkyl, or aryl; and
    (b) copolymerizing the macromonomer and a second monomer, wherein the second monomer is an alkyl acrylate or a mixture thereof, thereby forming a poly(alkyl acrylate)-graft-poly(alkyl methacrylate) copolymer, a poly(alkyl acrylate)-graft-poly(cycloalkyl methacrylate) copolymer, a poly(alkyl acrylate)-graft-poly(aralkyl methacrylate) copolymer, or a poly(alkyl acrylate)-graft-poly(aryl methacrylate) copolymer.

34. The method of claim 33, wherein providing the macromonomer comprises polymerizing a first monomer via anionic polymerization in the presence of an alkyl lithium reagent, optionally sec-butyl lithium; a lithium salt; and a vinylbenzylamine.

35. The method of claim 34, wherein the first monomer is selected from the group consisting of methyl methacrylate and tert-butyl methacrylate.

36. The method of claim 33, wherein the copolymerizing is performed via reversible addition fragmentation chain-transfer (RAFT) polymerization.

37. The method of claim 36, wherein the RAFT polymerization is performed using a radical initiator, optionally azobisisobutyronitrile (AIBN), and a chain transfer agent (CTA), optionally S-1-dodecyl-S"-($\alpha,\alpha$'-dimethyl-$\alpha$'acetic acid) trithiocarbonate.

38. The method of claim 37, wherein the RAFT polymerization is performed in an aromatic solvent at a temperature of at least about 40° C.

39. The method of claim 33, wherein the method further comprises: (c) collecting the copolymer formed in step (b); and (d) contacting the copolymer with a solution comprising a strong acid for a period of time, thereby providing a partially hydrolyzed copolymer.

40. The method of claim 39, wherein the method further comprises: (e) contacting the partially hydrolyzed copolymer with a solution comprising an alkali metal hydroxide or a metal coordination complex to form a graft copolymer comprising one or more alkali metal salt groups or one or more metal coordination complexes.

* * * * *